Sept. 15, 1964 S. MICHAELS 3,148,783
APPARATUS FOR SORTING ARTICLES
Filed Nov. 20, 1961 31 Sheets-Sheet 13
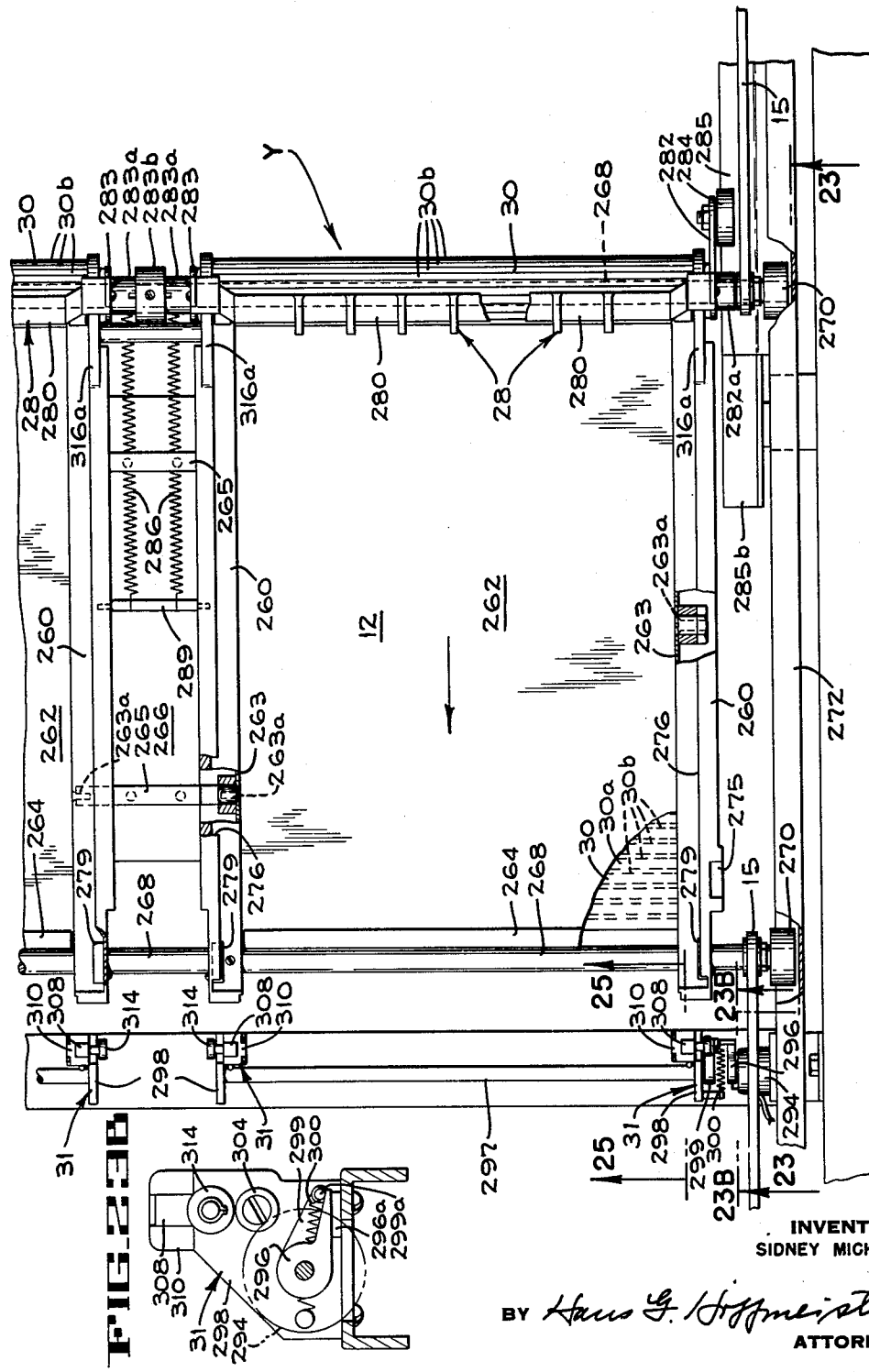
INVENTOR
SIDNEY MICHAELS
BY Hans G. Hoffmeister
ATTORNEY

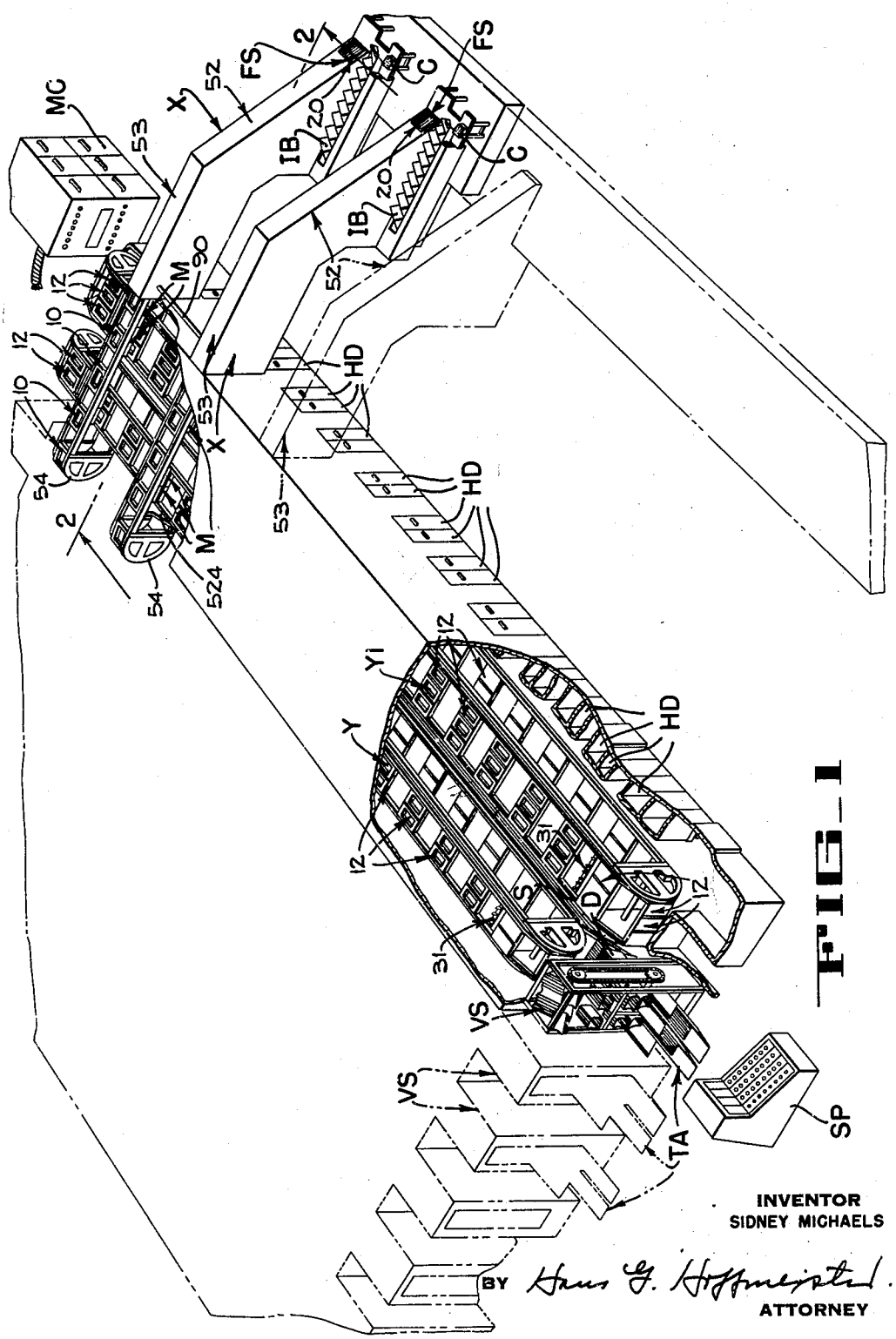

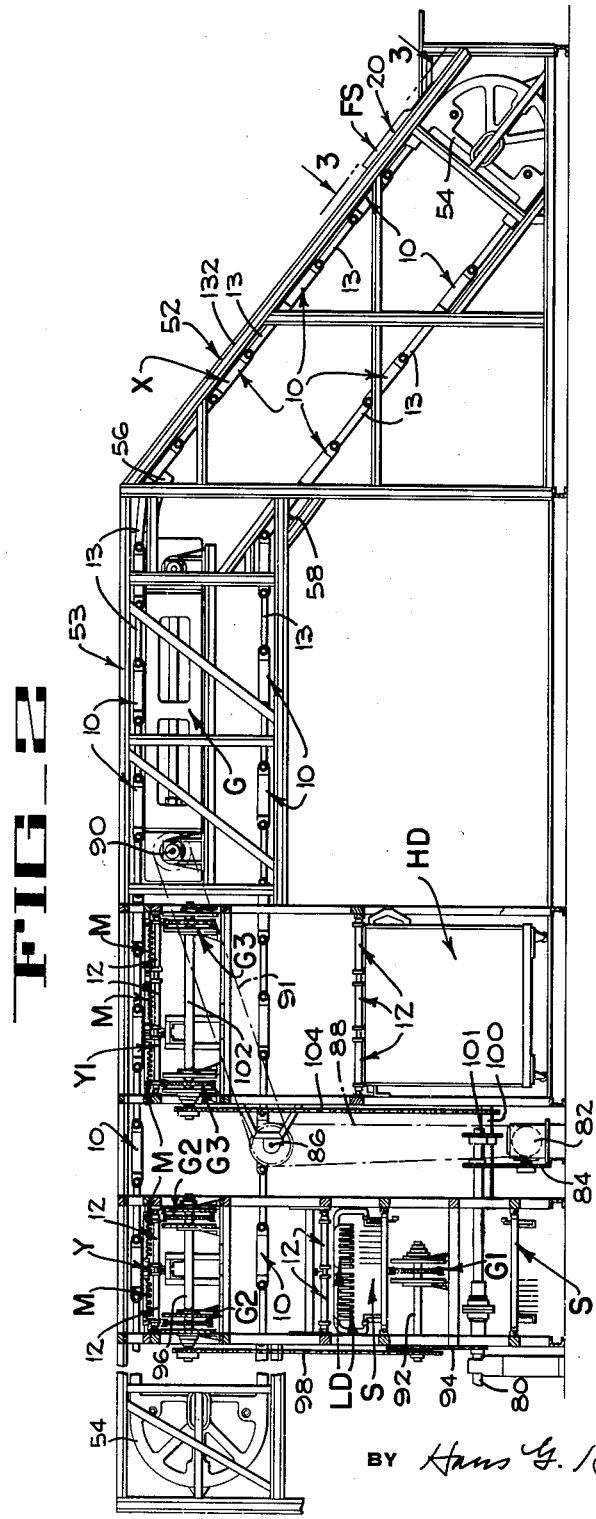

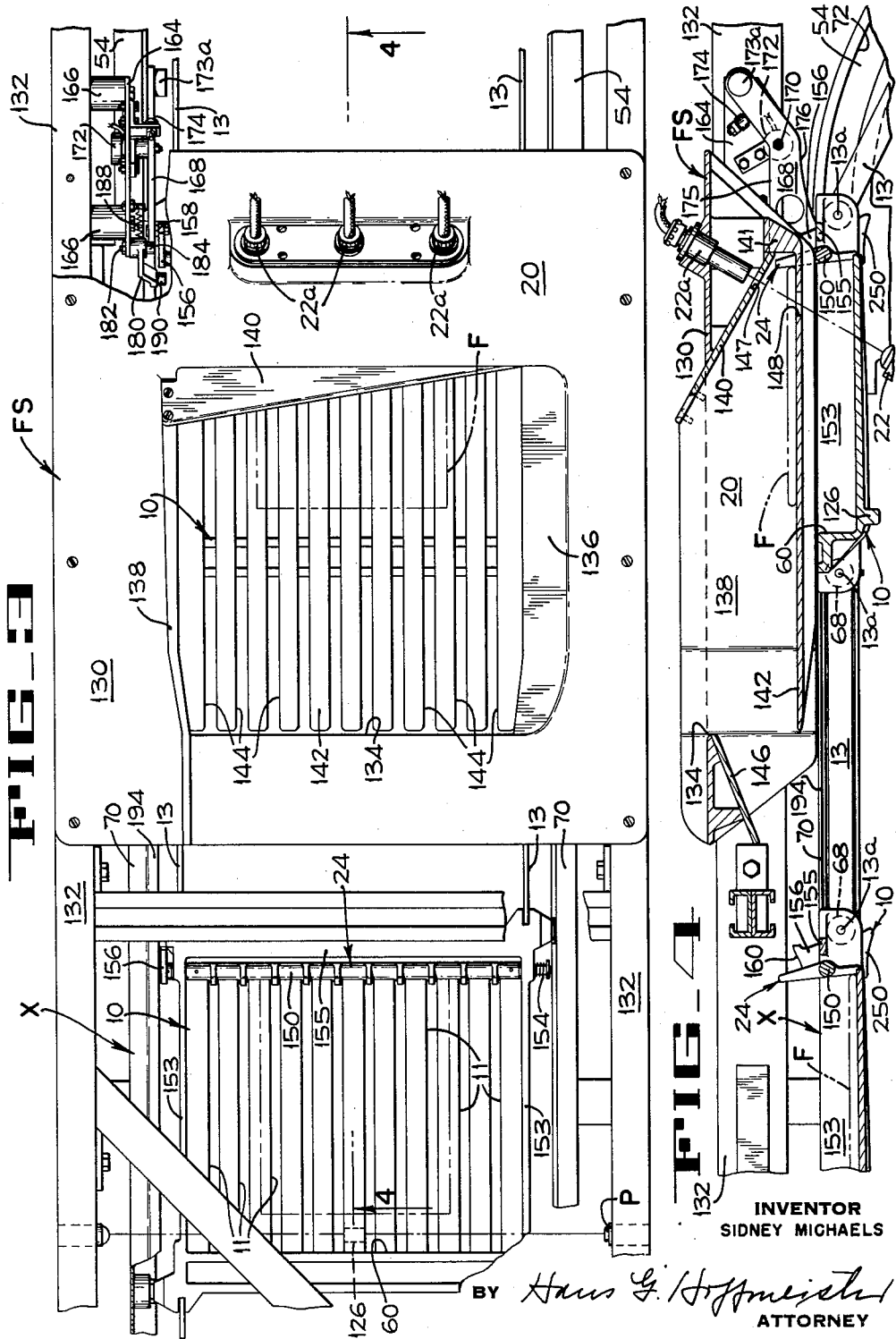

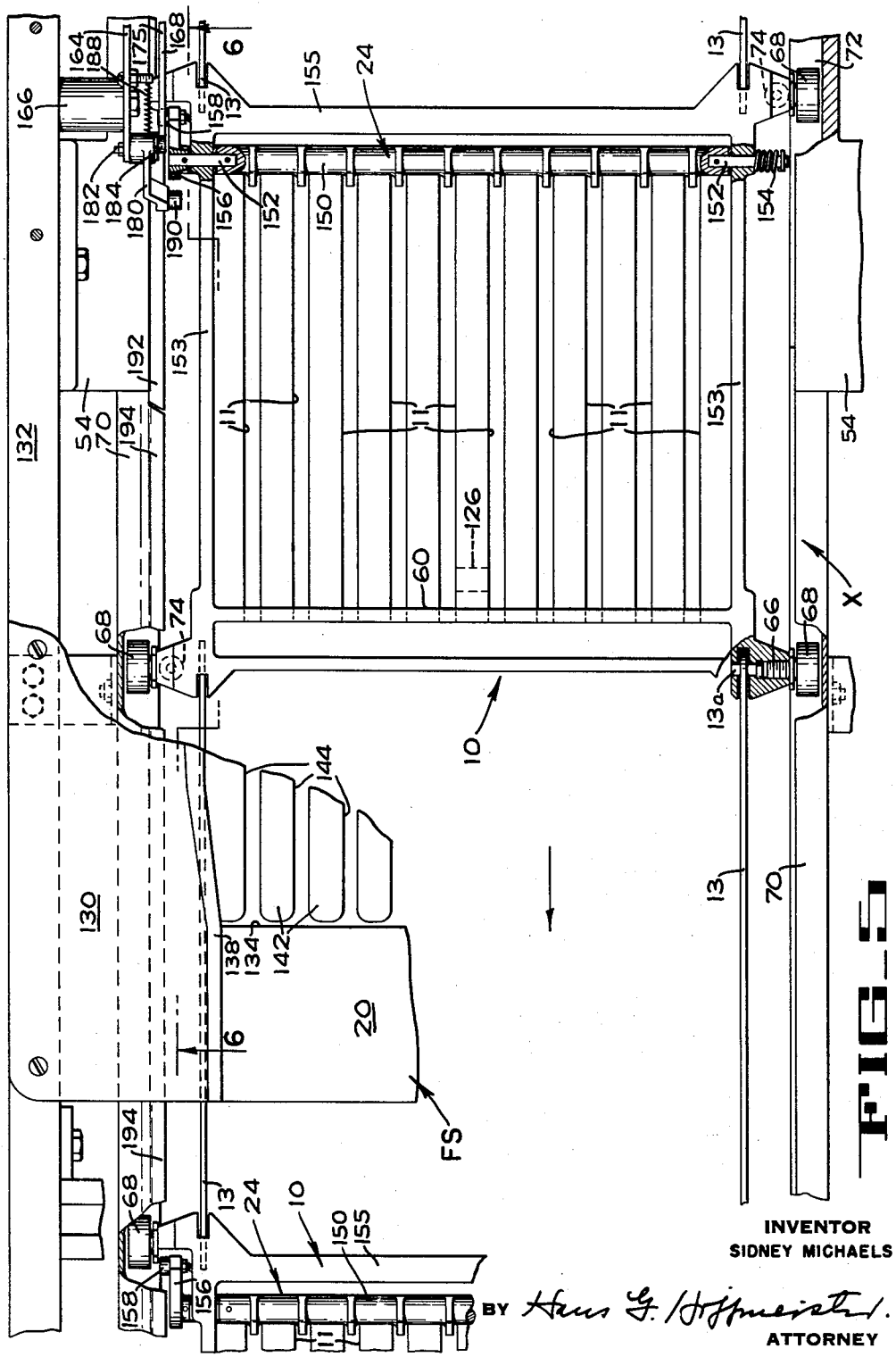

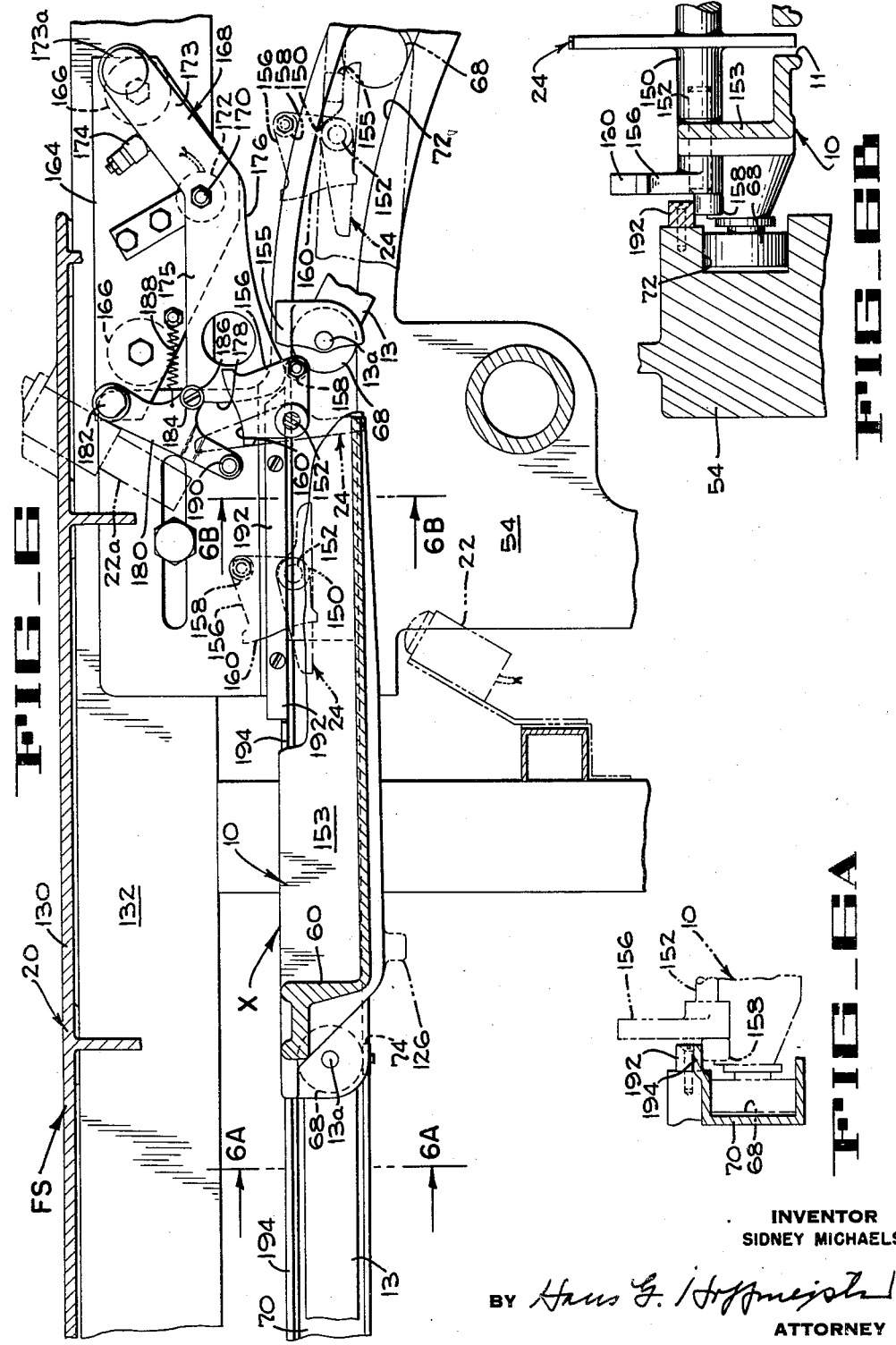

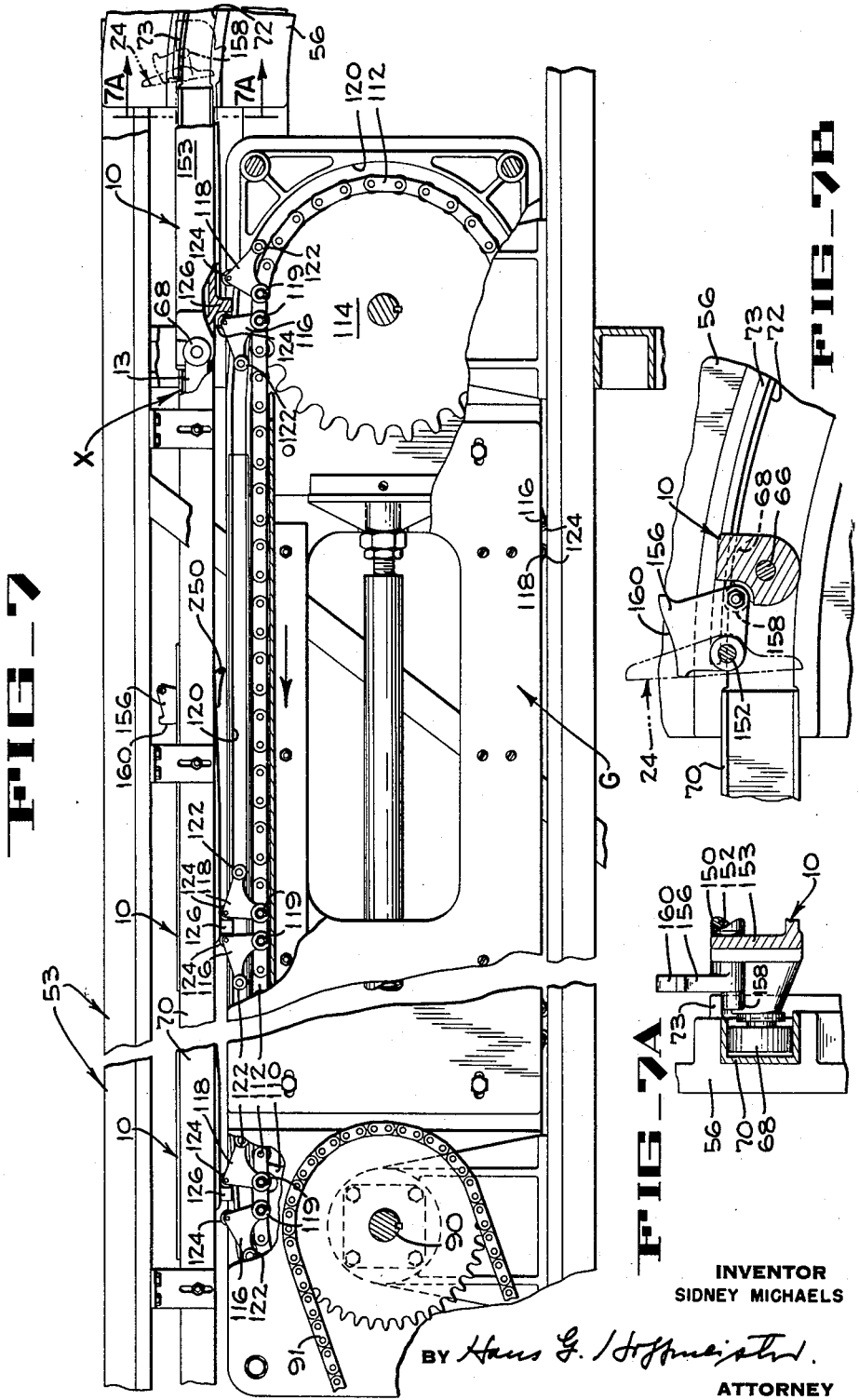

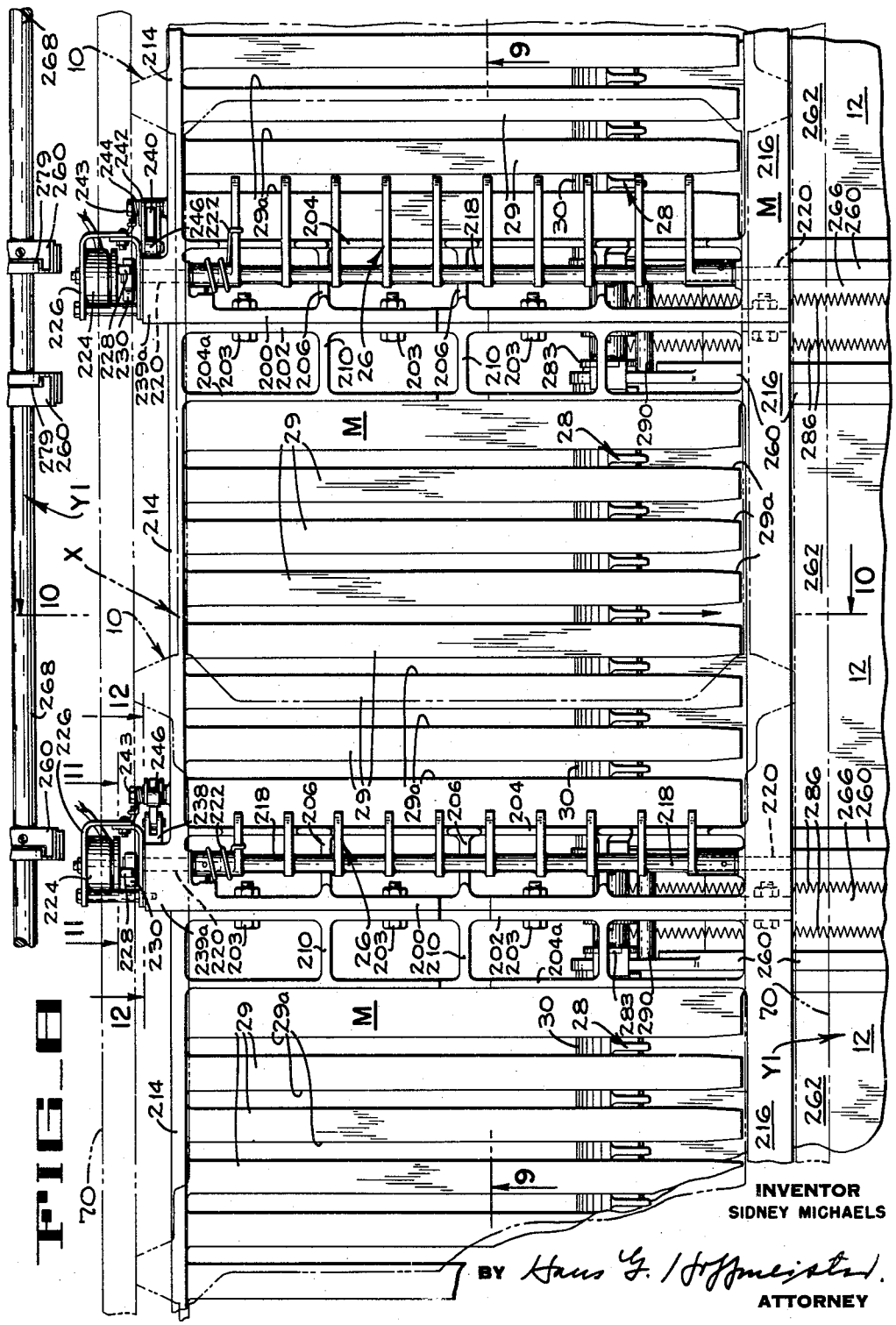

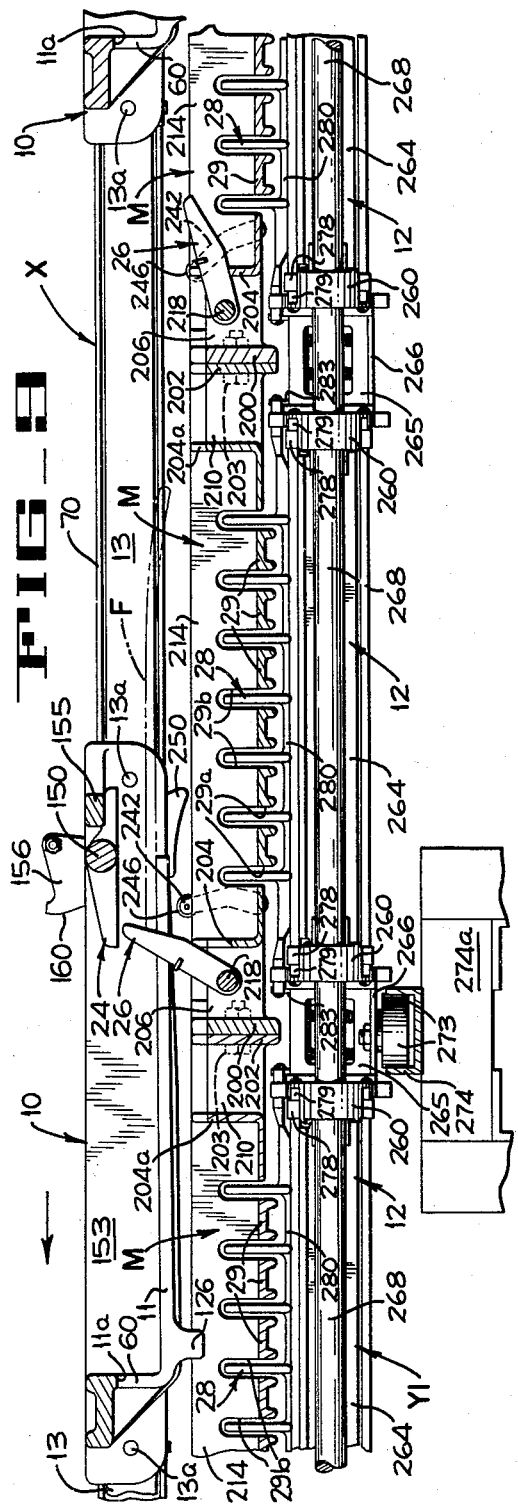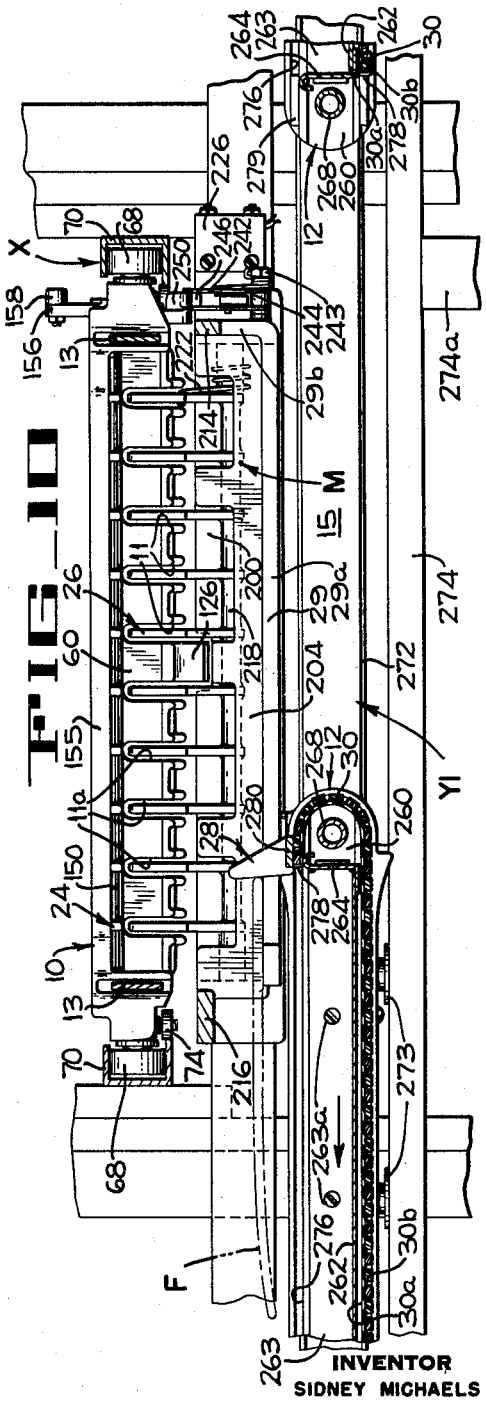

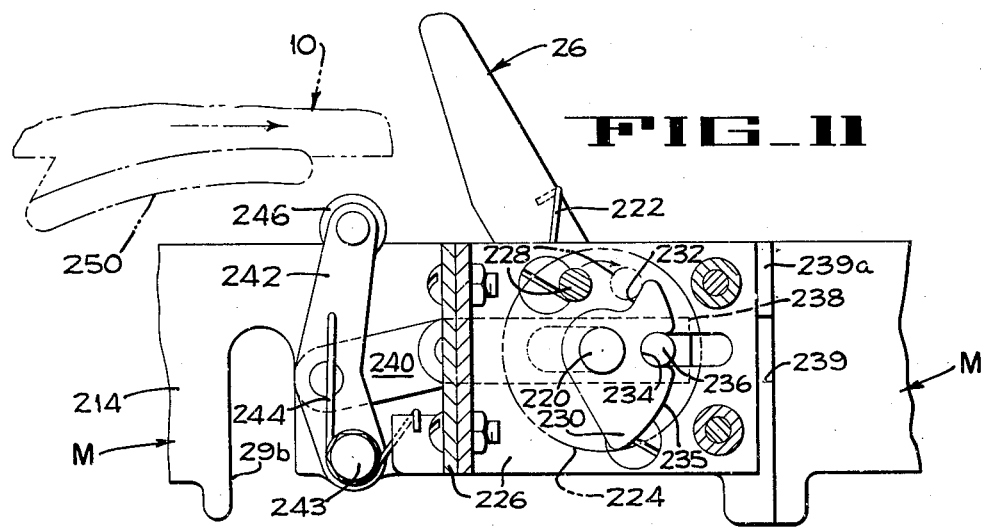
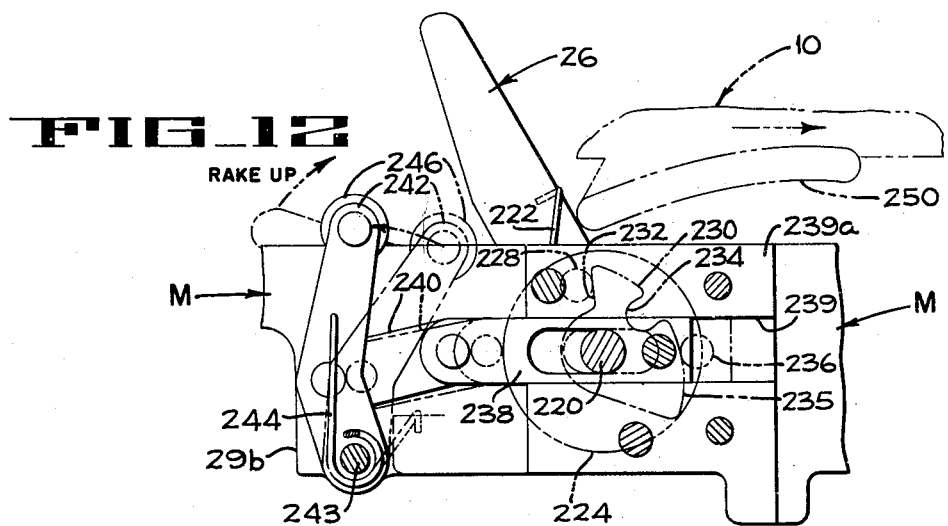

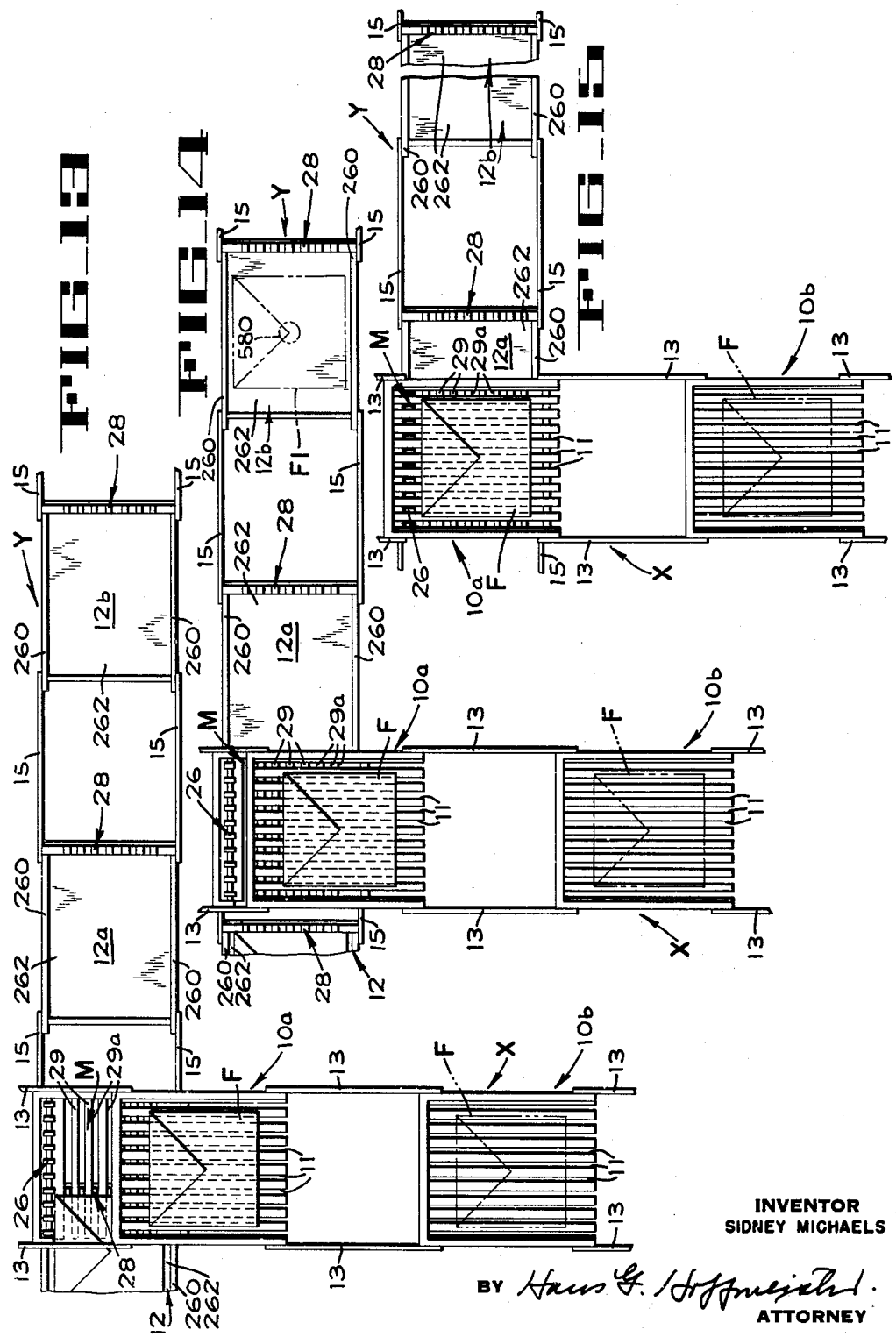

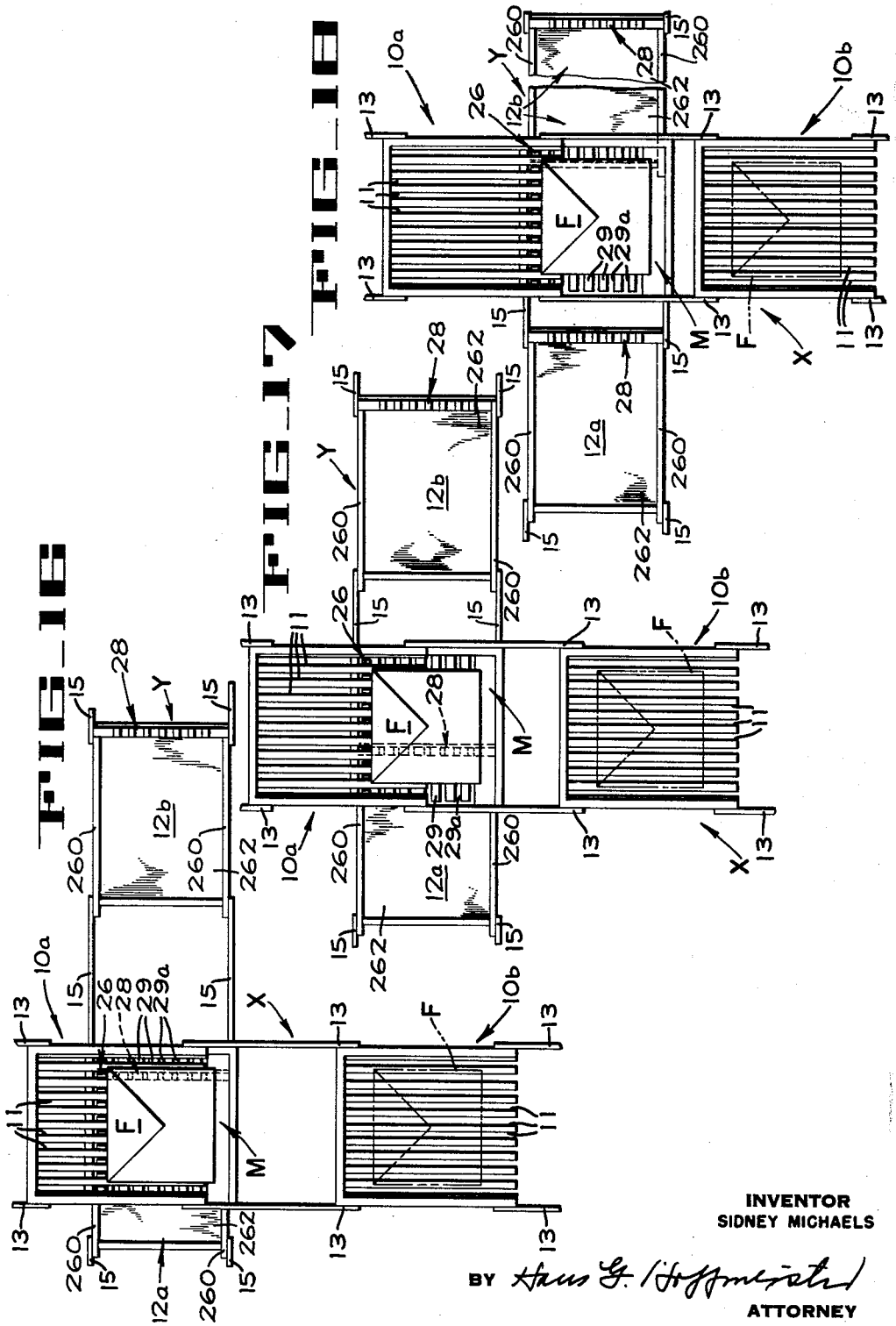

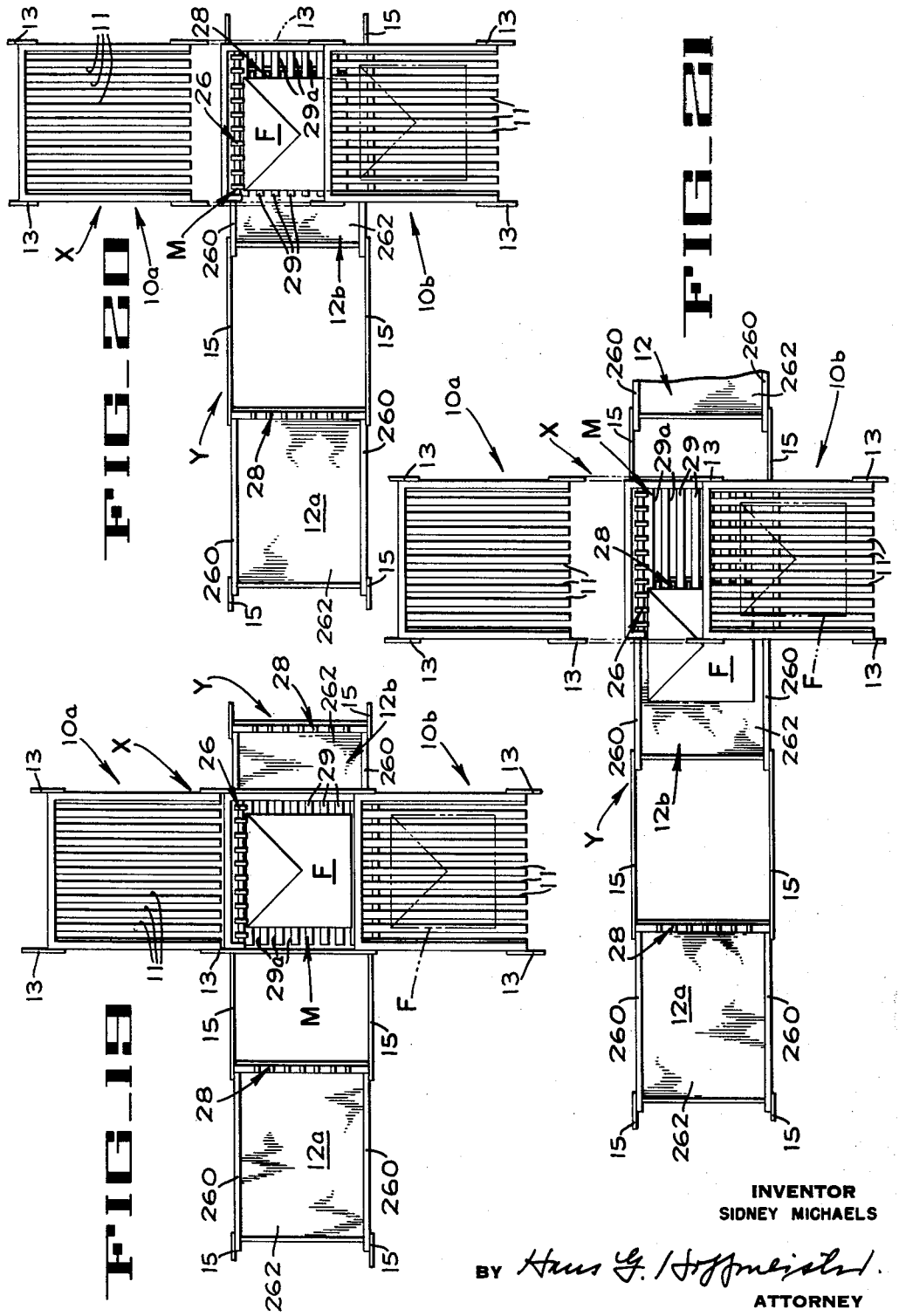

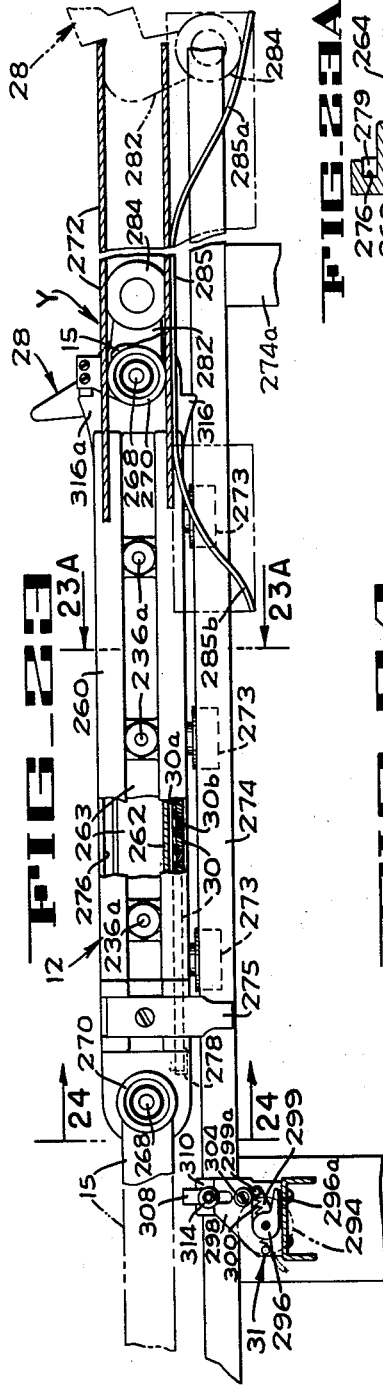
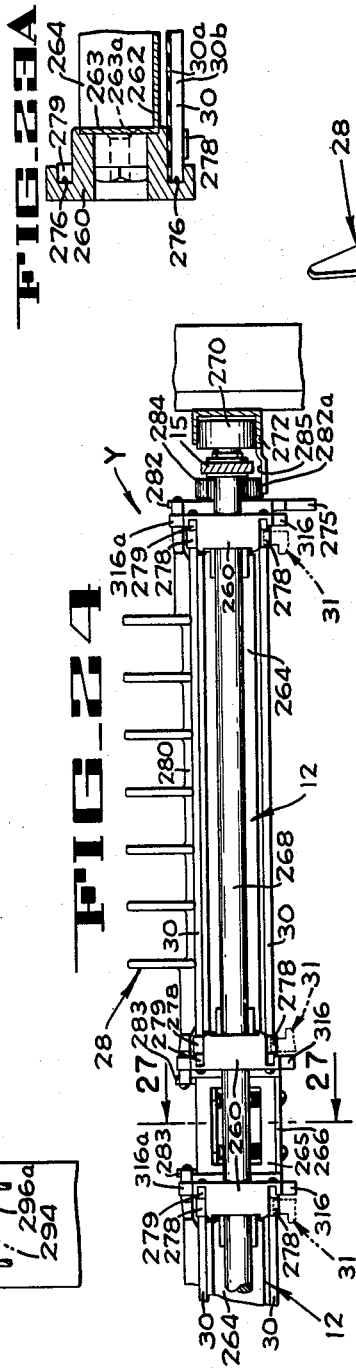
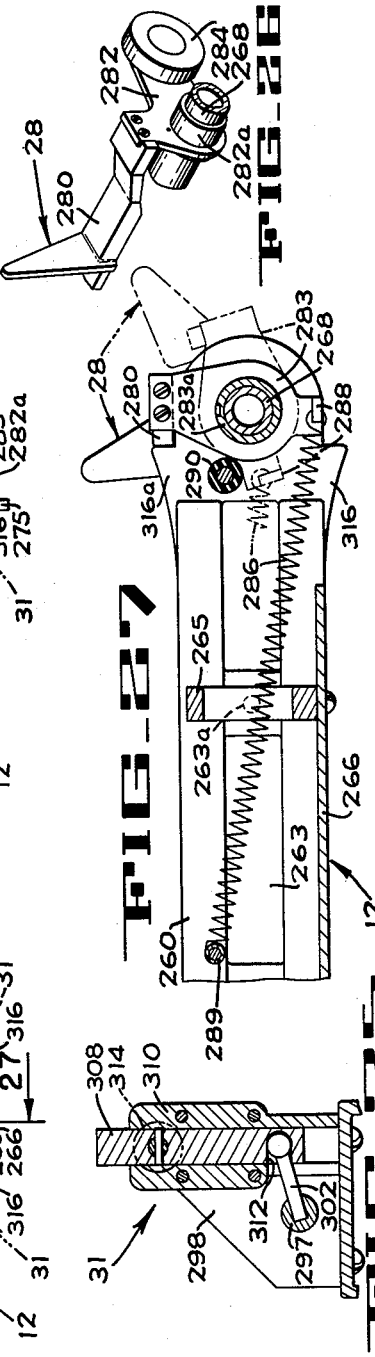
INVENTOR
SIDNEY MICHAELS
BY Hans G. Hoffmeister
ATTORNEY

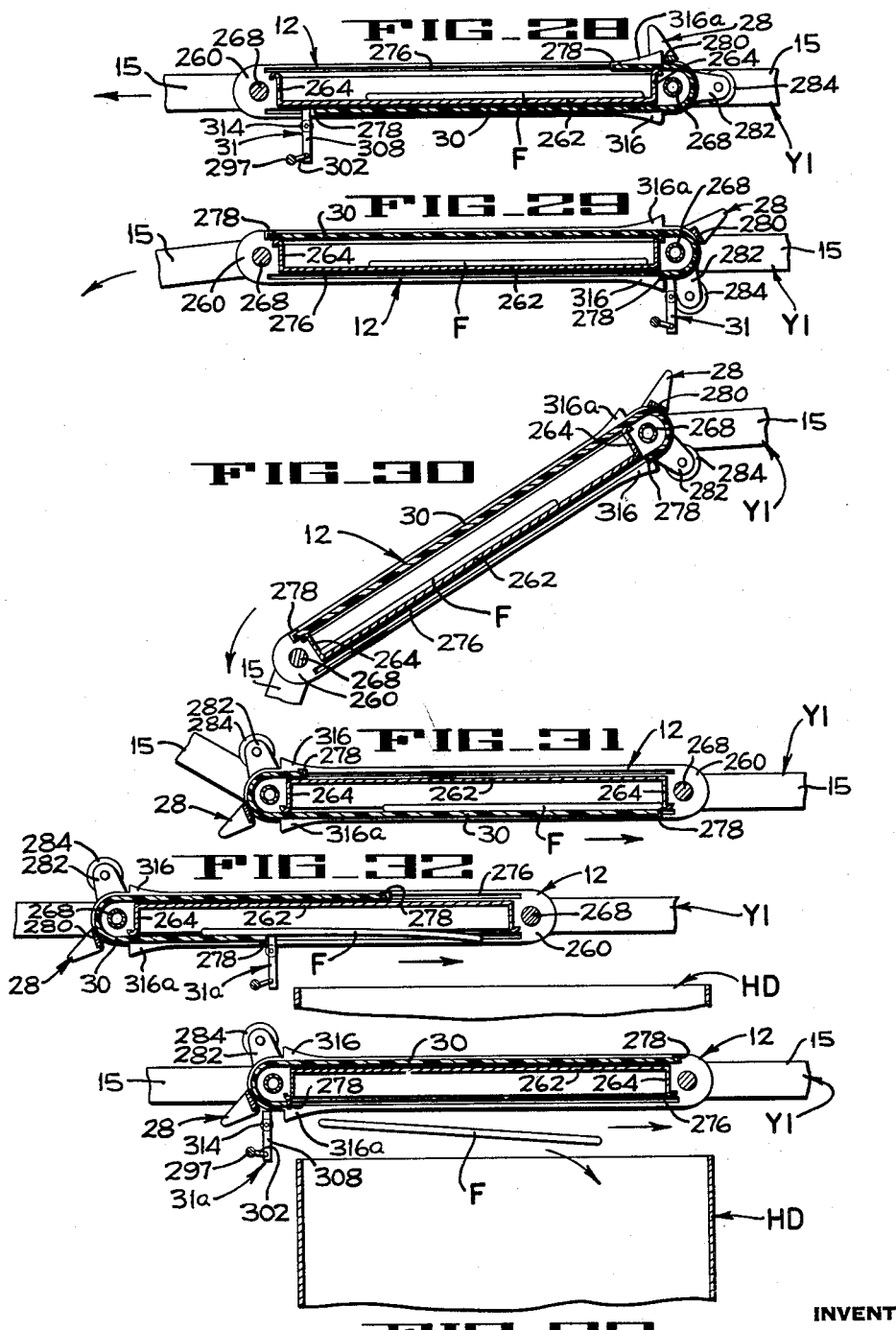

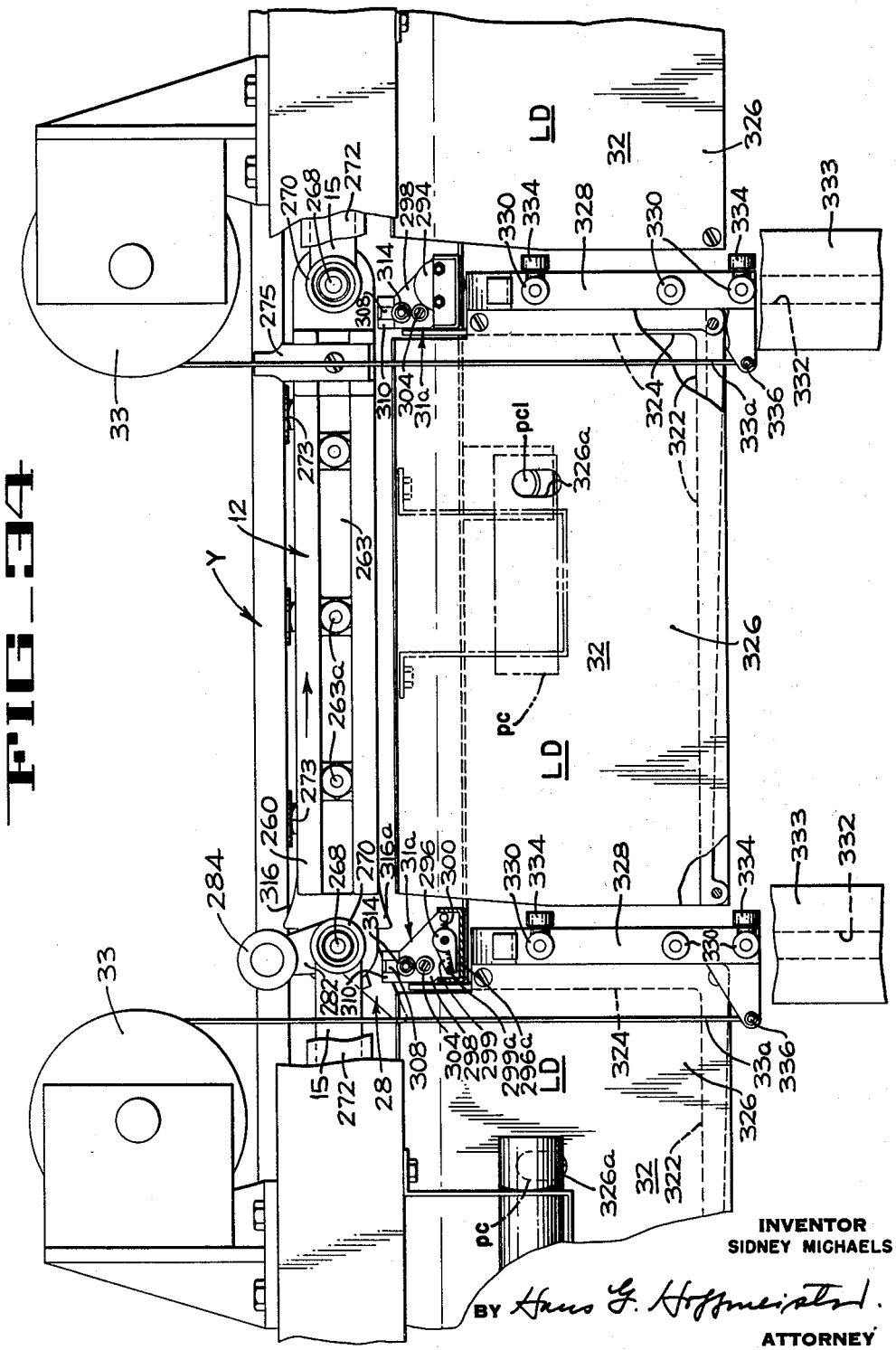

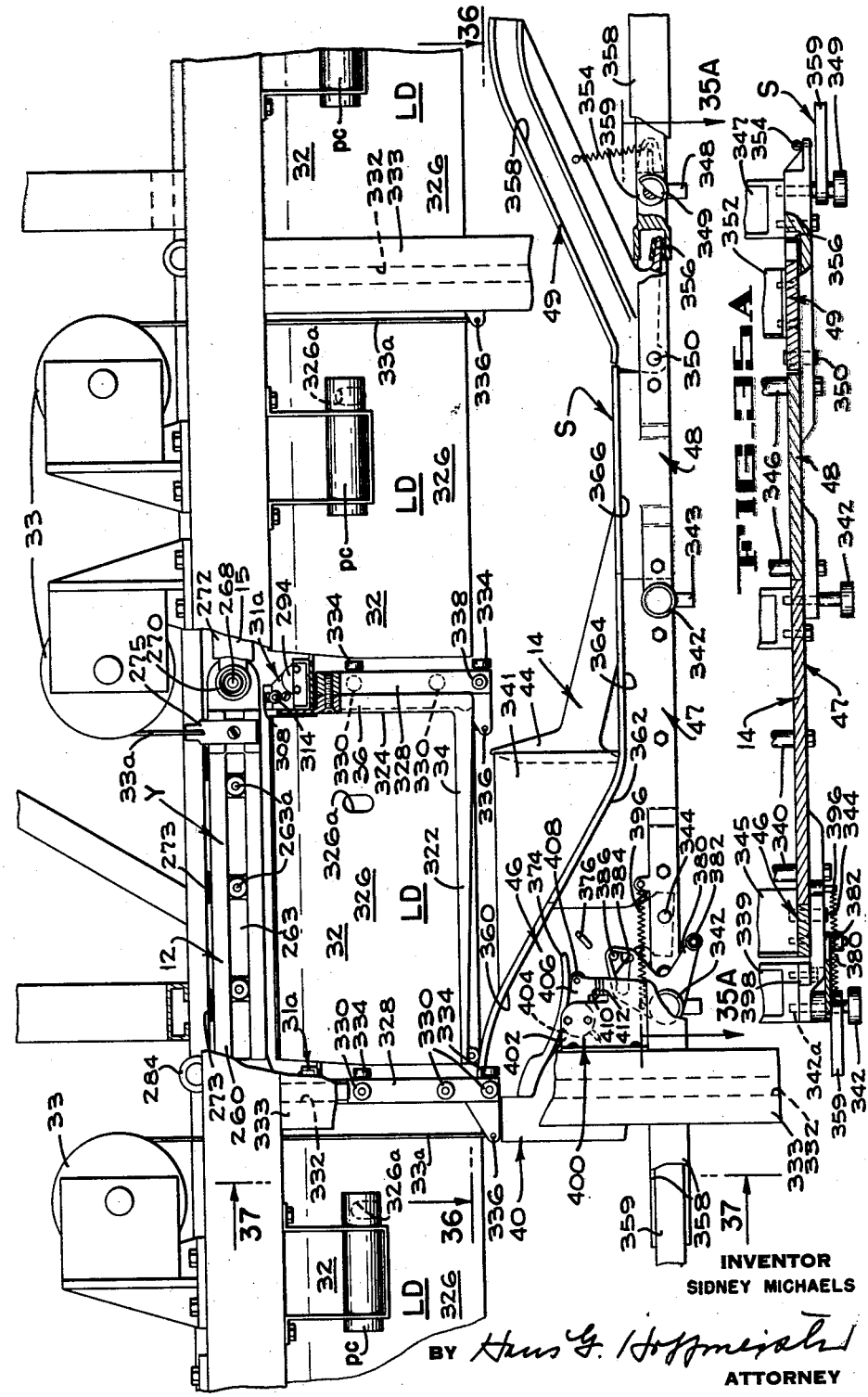

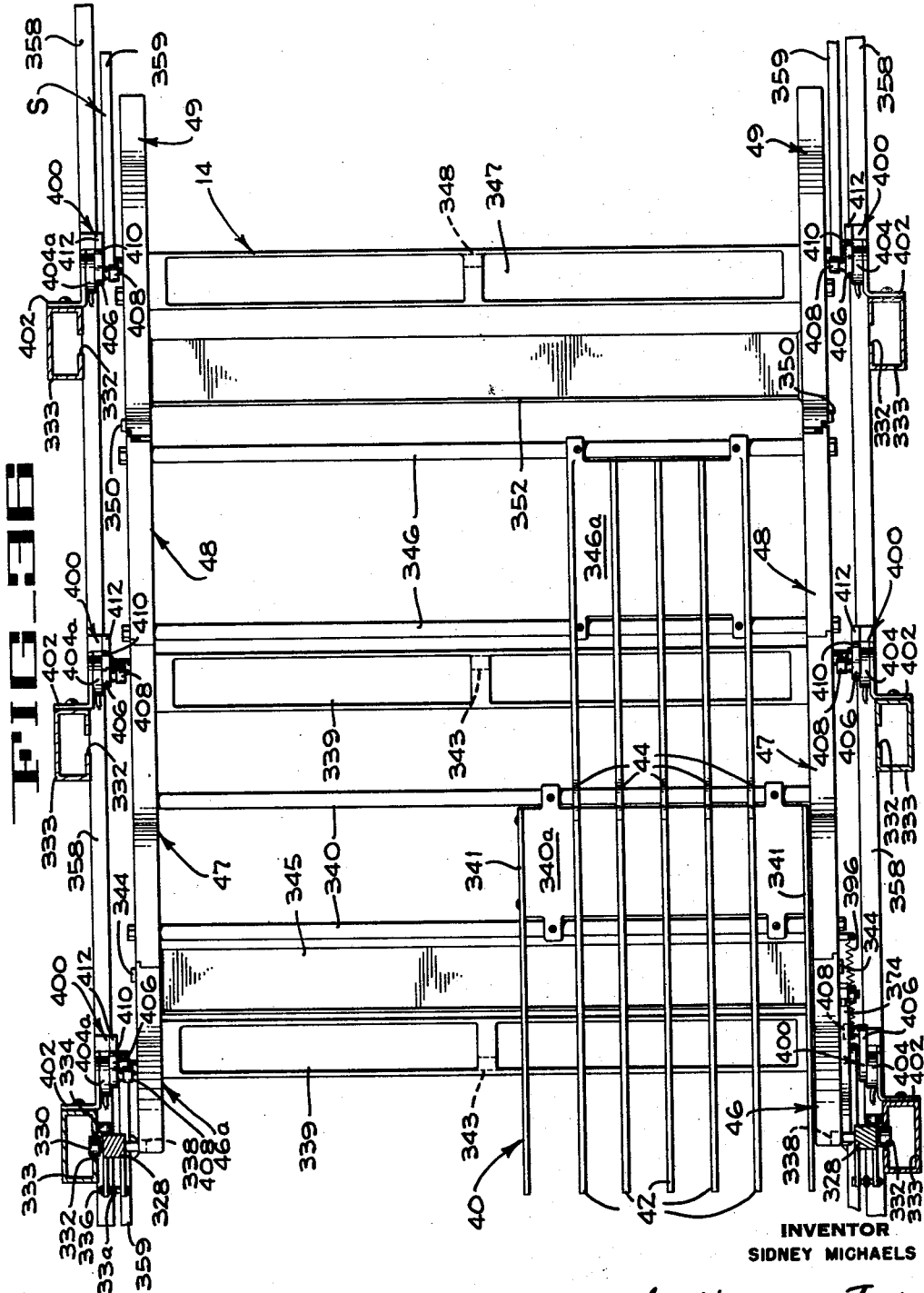

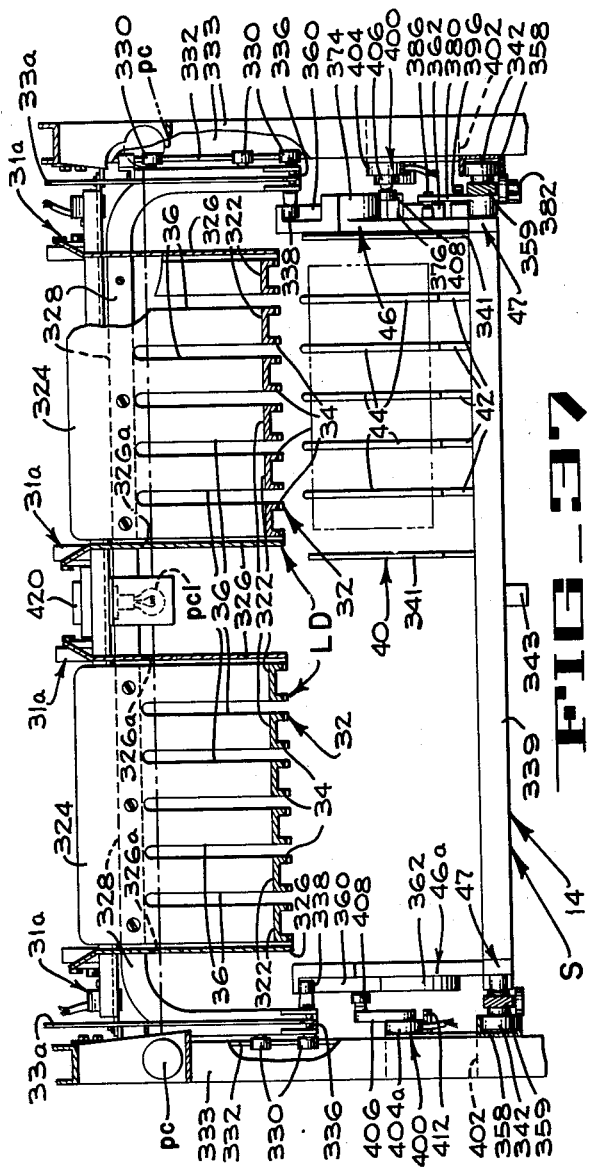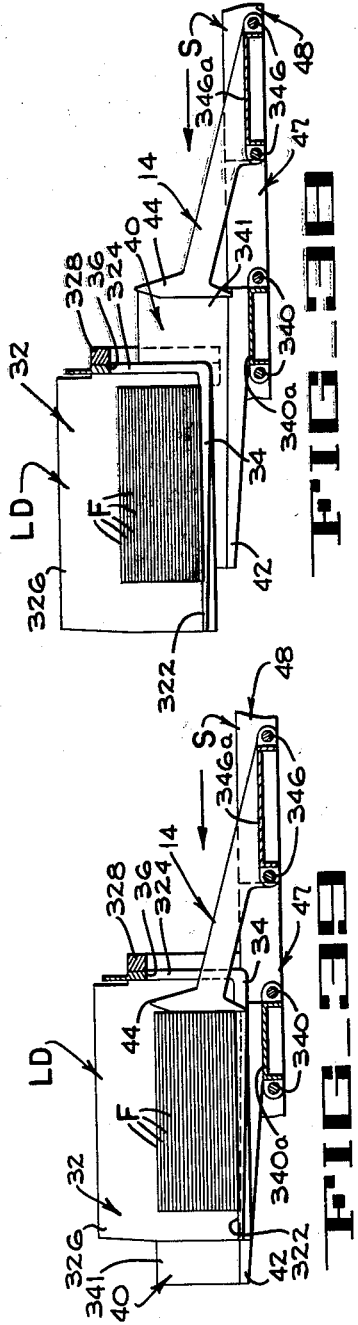

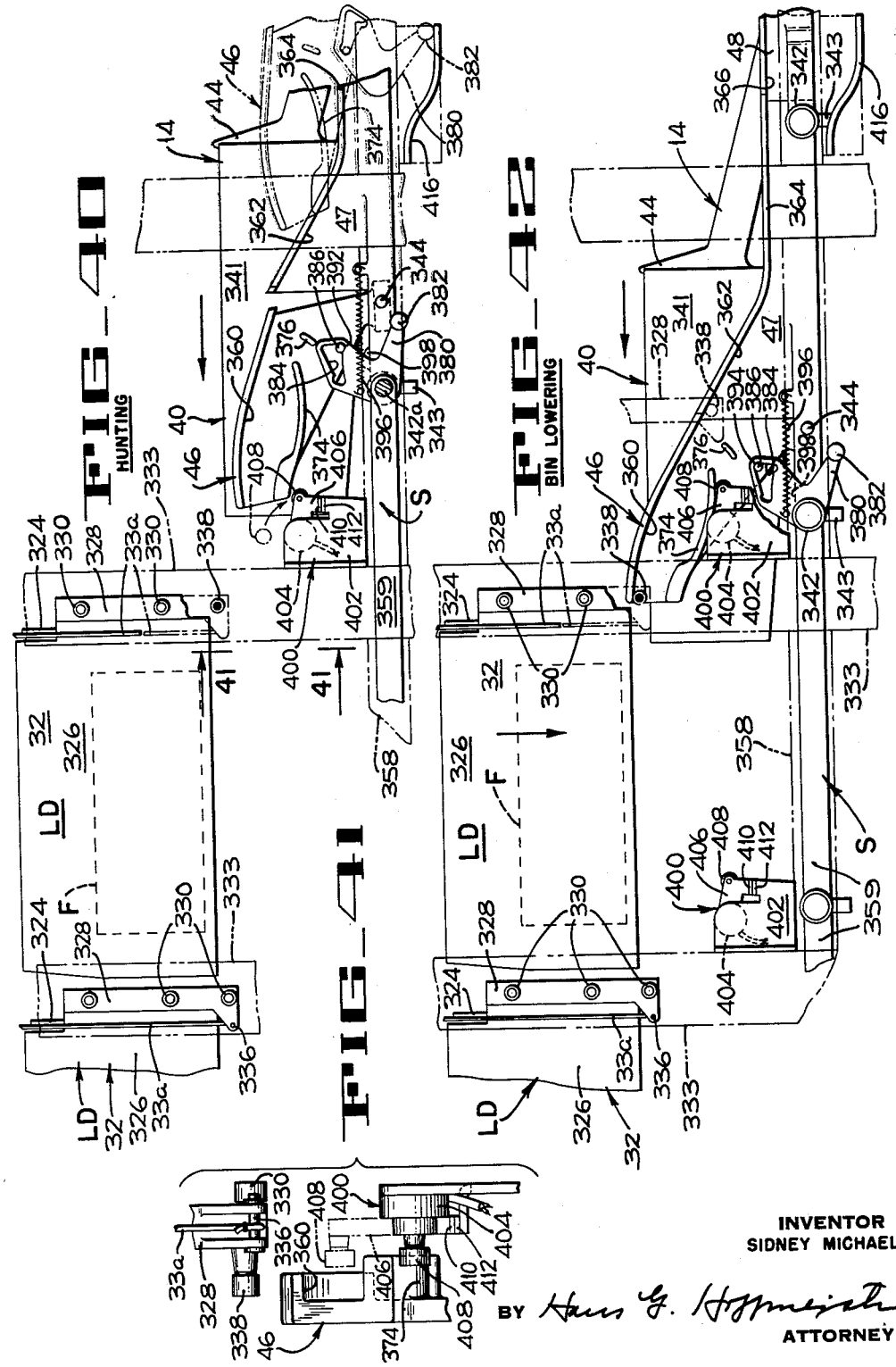

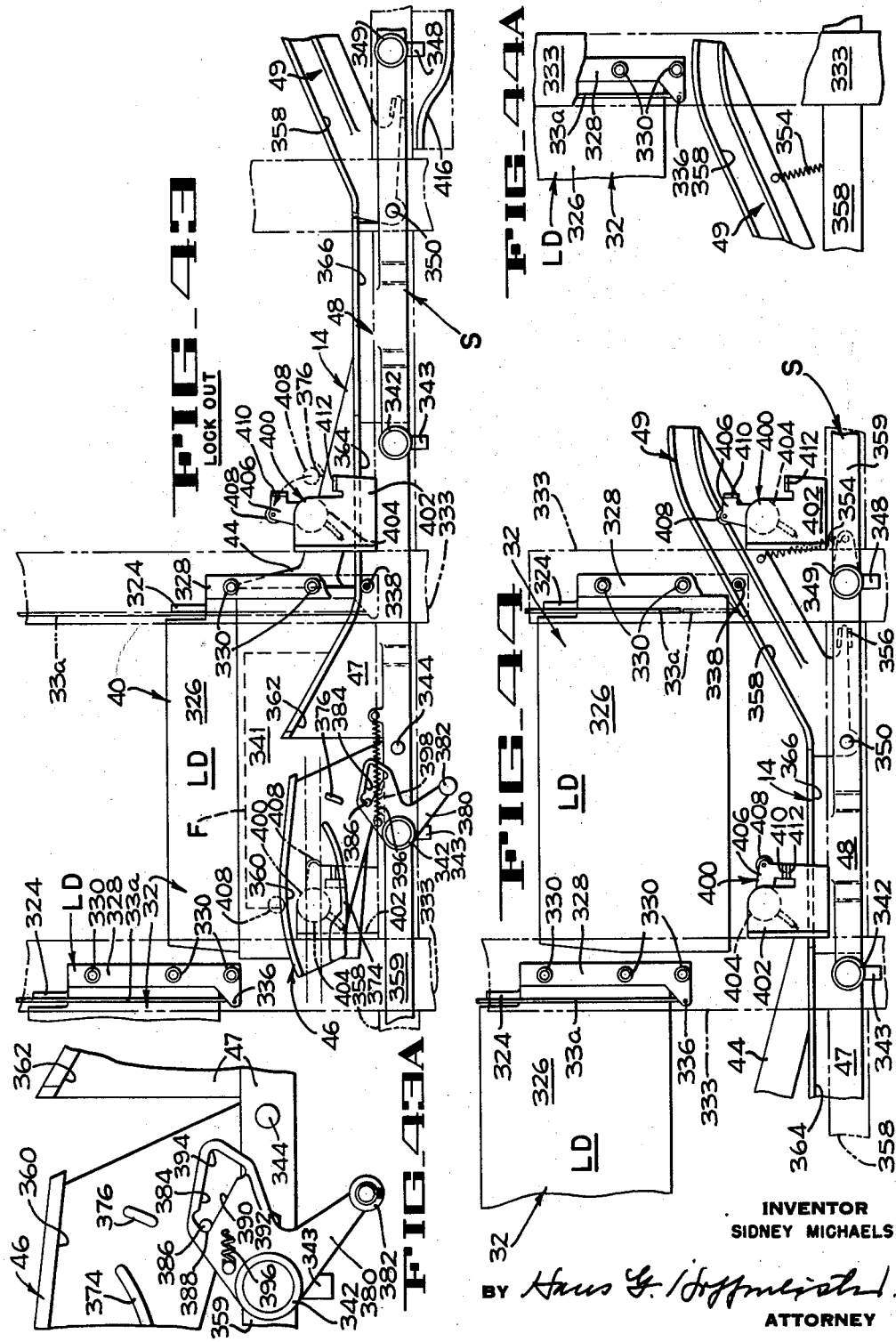

Sept. 15, 1964  S. MICHAELS  3,148,783
APPARATUS FOR SORTING ARTICLES
Filed Nov. 20, 1961  31 Sheets-Sheet 22

INVENTOR
SIDNEY MICHAELS
BY Hans G. Hoffmeister
ATTORNEY

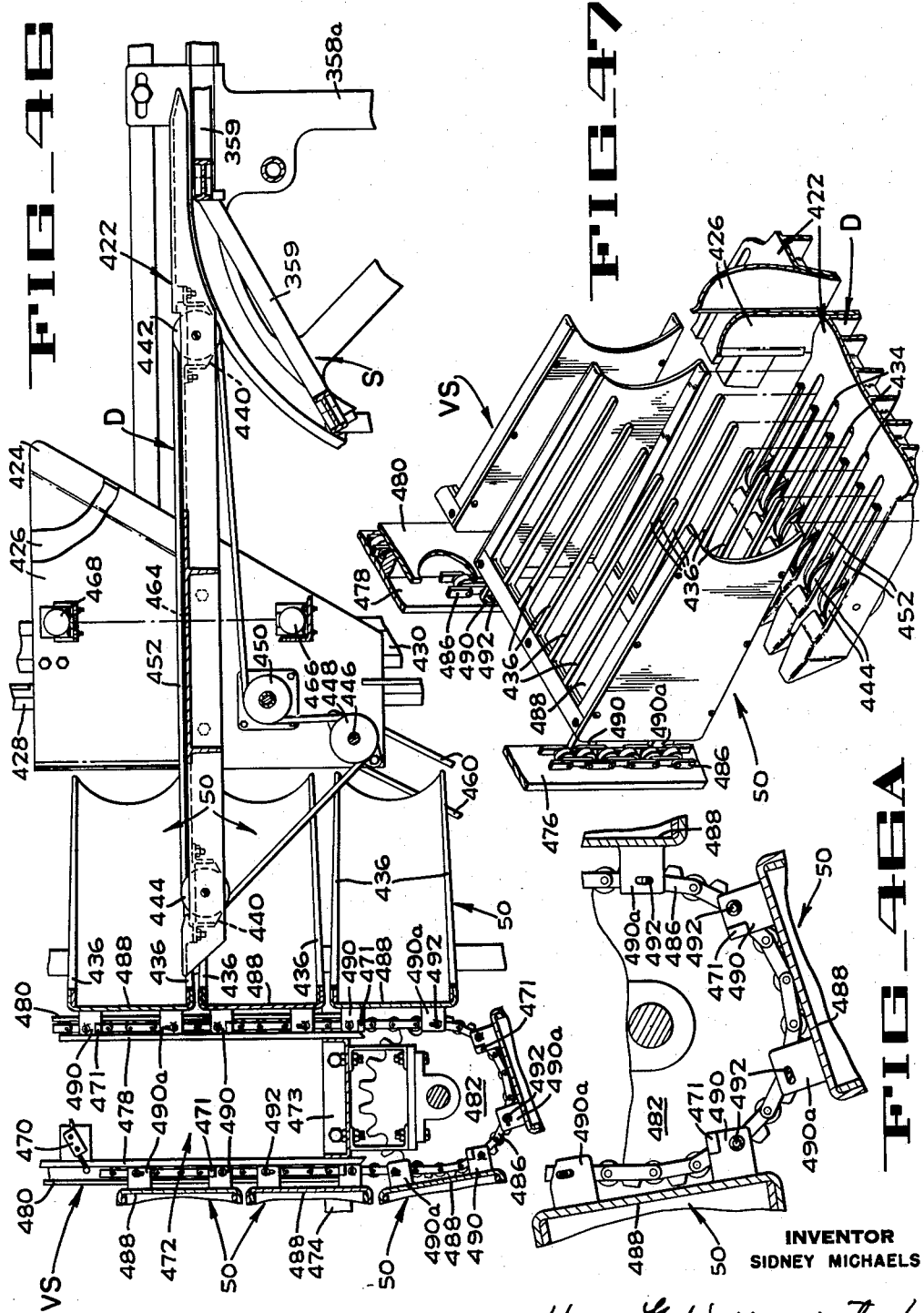

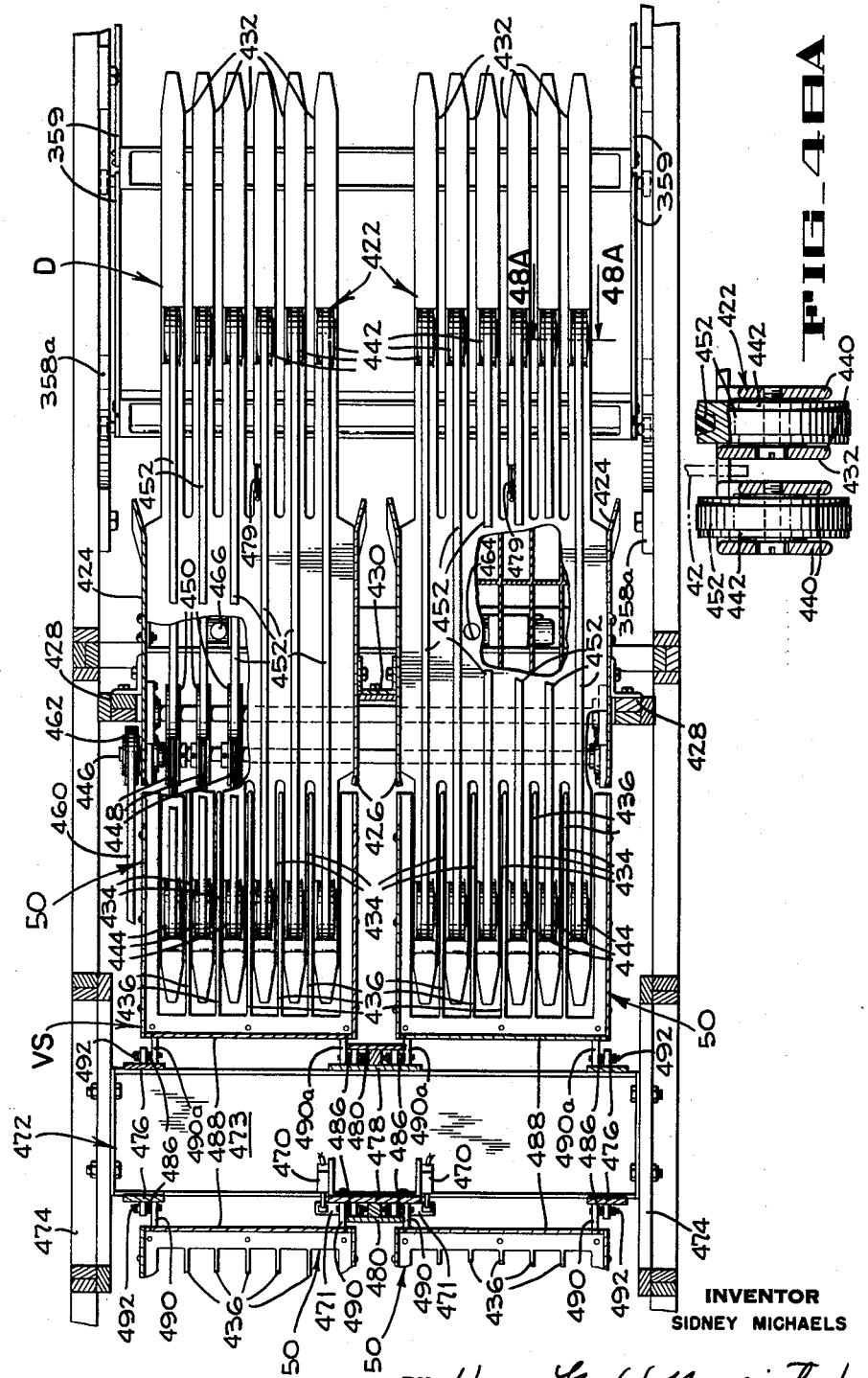

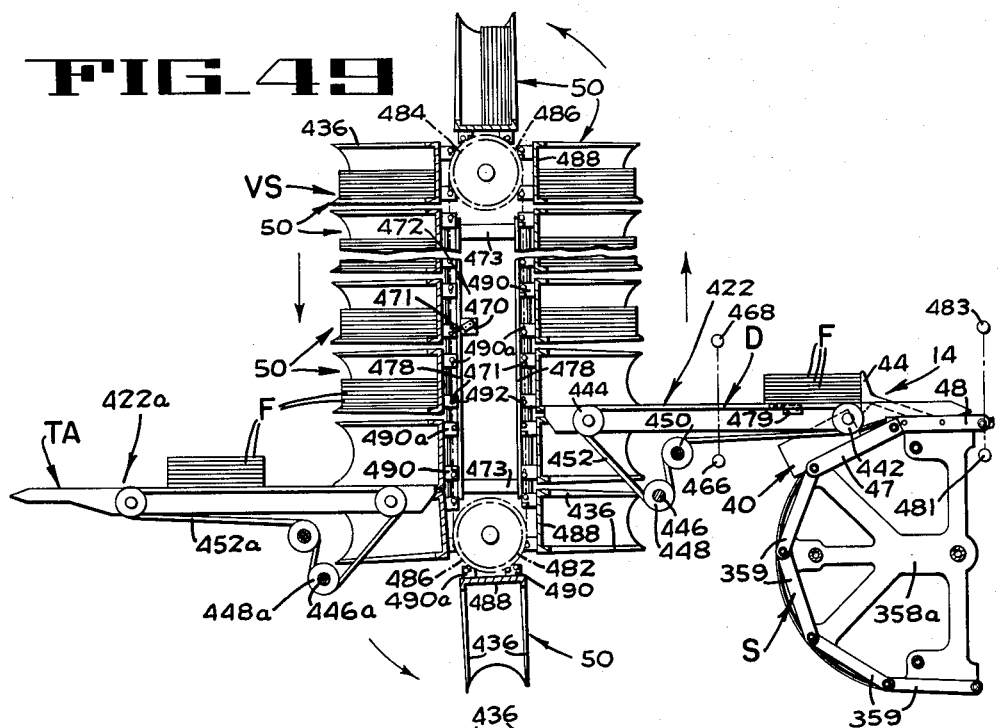
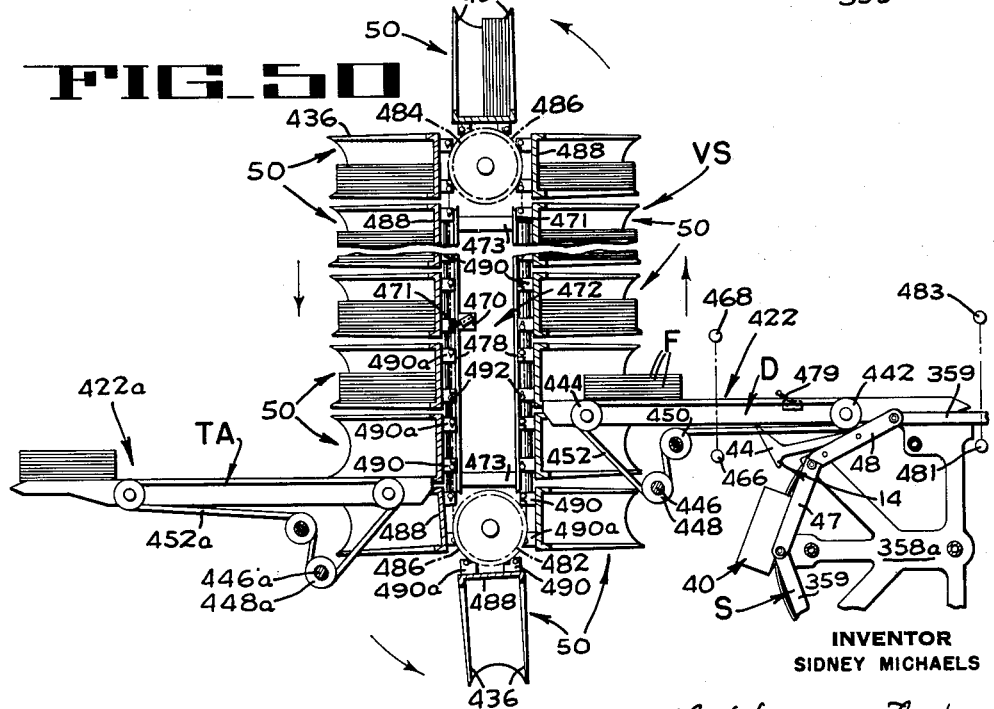

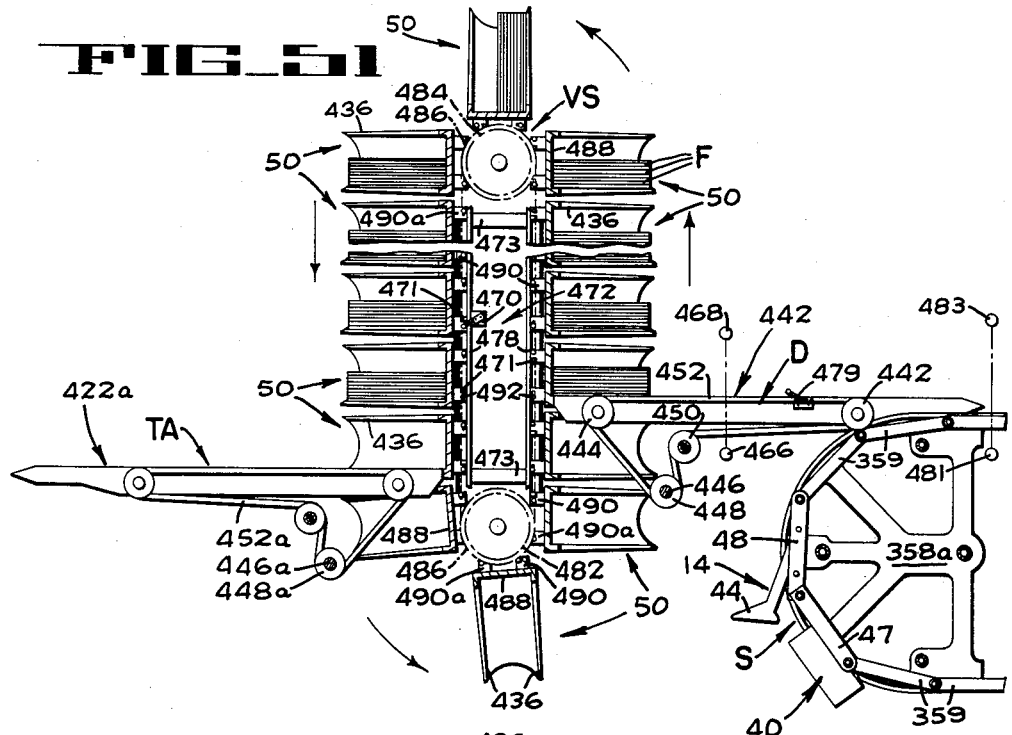
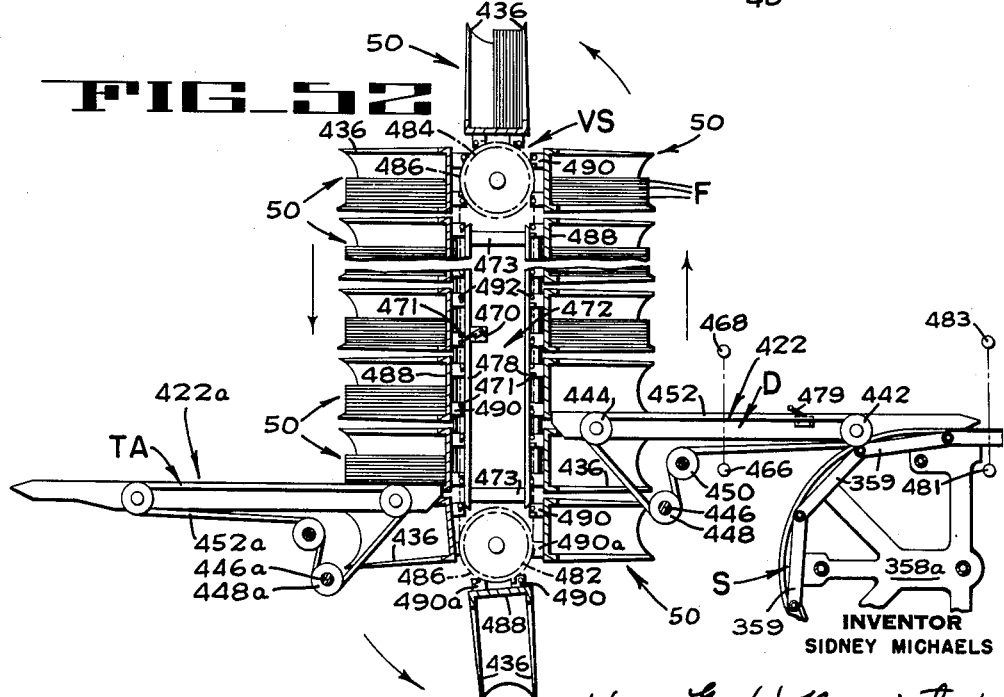

Sept. 15, 1964  S. MICHAELS  3,148,783
APPARATUS FOR SORTING ARTICLES
Filed Nov. 20, 1961  31 Sheets-Sheet 27
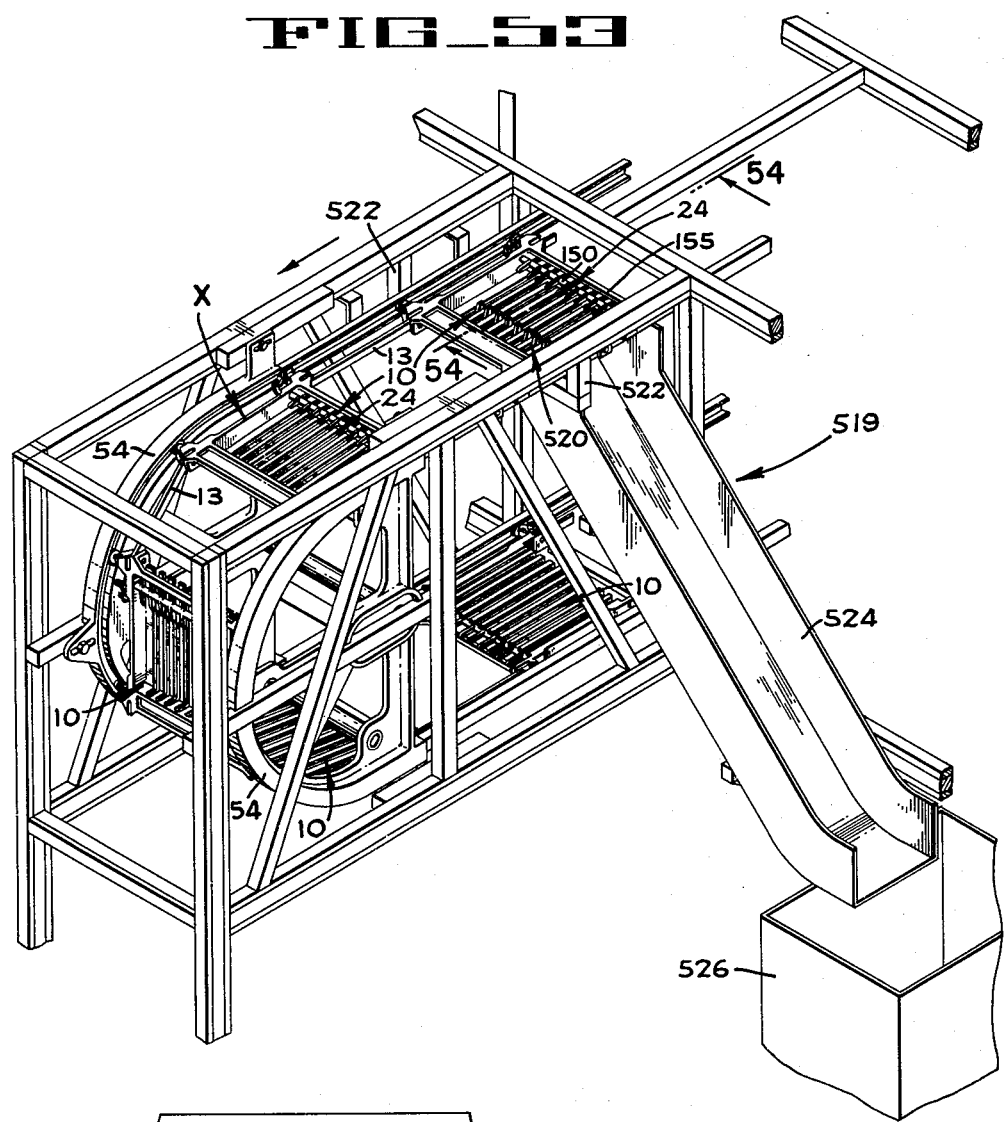
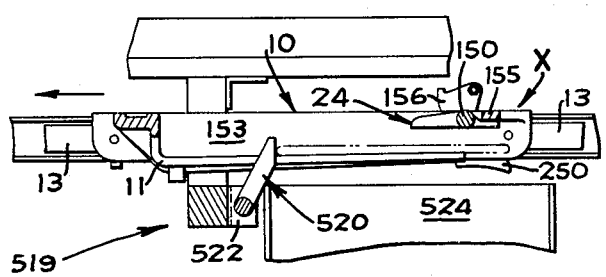
INVENTOR
SIDNEY MICHAELS
BY *Hans G. Hoffmeister*
ATTORNEY

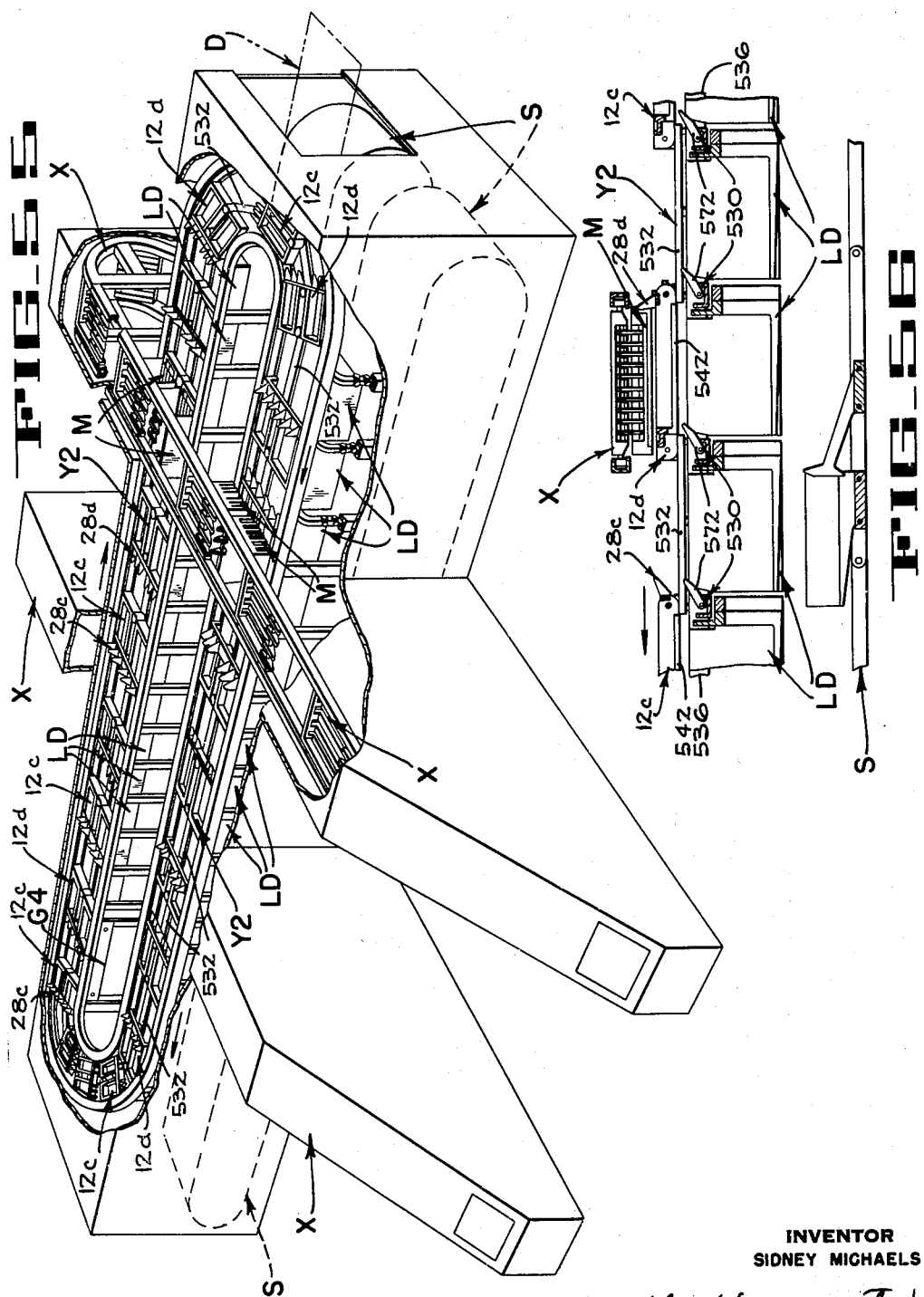

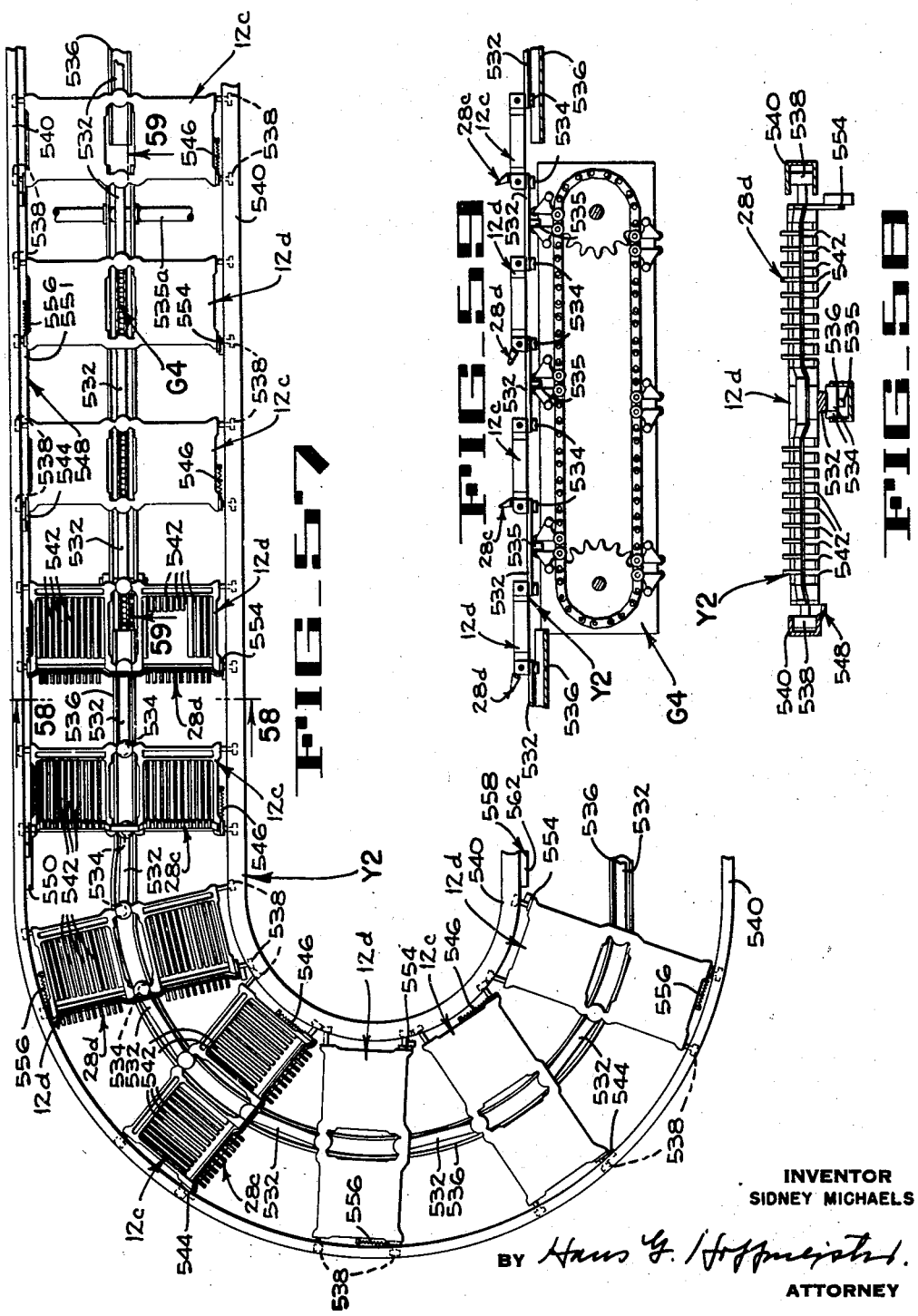

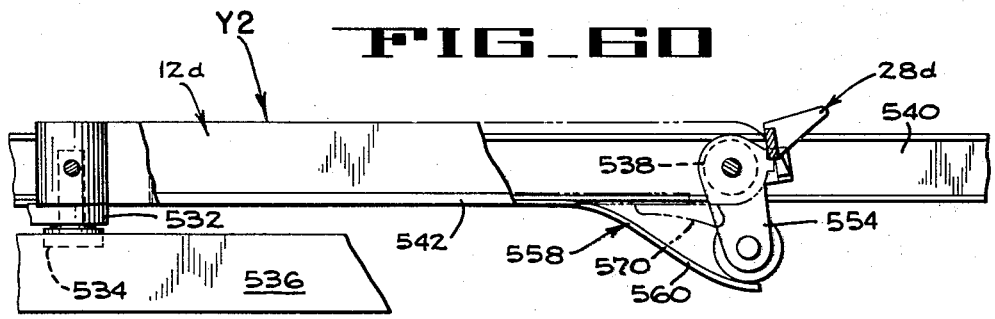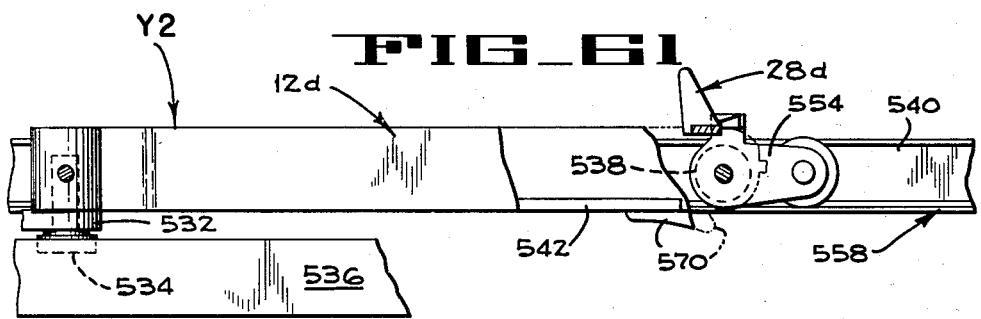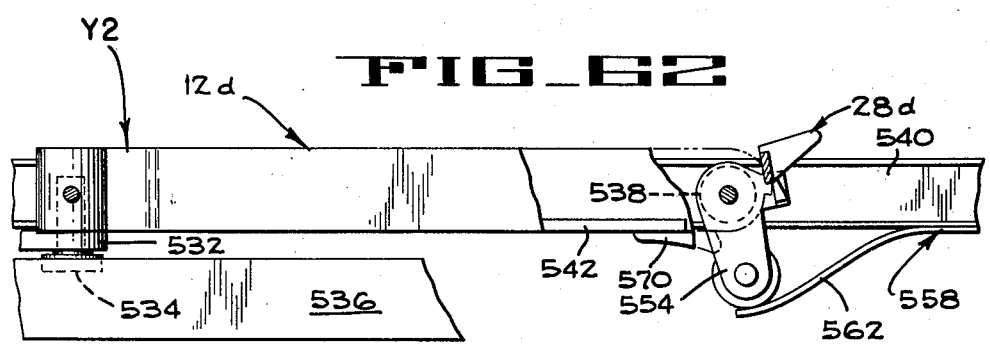

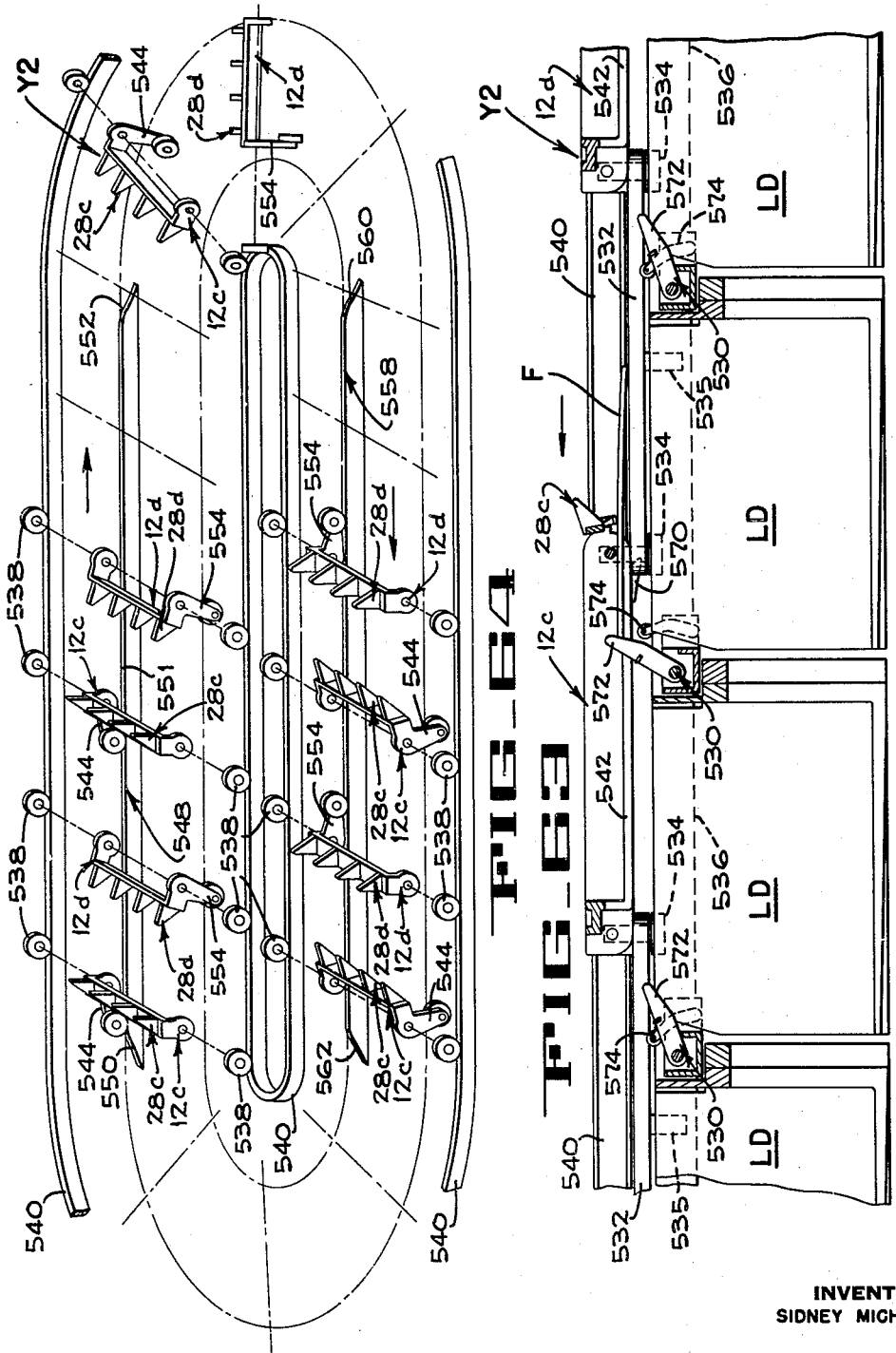

United States Patent Office 3,148,783
Patented Sept. 15, 1964

3,148,783
APPARATUS FOR SORTING ARTICLES
Sidney Michaels, Santa Clara, Calif., assignor to FMC Corporation, San Jose, Calif., a corporation of Delaware
Filed Nov. 20, 1961, Ser. No. 153,652
16 Claims. (Cl. 214—11)

This invention relates to a method of sorting articles, and apparatus for carrying out the method. More particularly, the invention concerns an apparatus that is adapted for sorting fragile articles such as articles of mail, referred to by the Post Office as "flats." Flats are pieces of flat mail such as large envelopes, magazines, and the like, the dimensions of which are too great for them to be handled in ordinary letter sorting and handling equipment. These articles of mail, which are relatively long and wide, and yet thin, present difficult handling problems and are readily damaged in ordinary high speed sorting apparatus. Although the embodiment of the invention to be described is especially suitable for the sorting of flats, packages and similar articles can also be sorted if certain vertical dimensions of the machine are increased.

It is an object of the present invention to provide a method of and apparatus for sorting articles.

Another object of the invention is to provide a flats sorting apparatus that lends itself to automatic operation and control from a memory device or directory in response to code signals introduced by the operator upon reading of the address or destination of the article. It is to be understood that the term "destination" is a special term that applies to the sorting of mail or to the sorting of similar articles, and in the broader sense, merely indicates a selected classification.

Still another object of the present invention is to provide apparatus for the rapid sorting of flats, which apparatus does not fold, curl, catch, drag or otherwise damage the mail.

Briefly, the system of the present invention that accomplishes these results is what will be termed a matrix system since it, in general, is made up of several operating elements disposed in rows, each of which has a predetermined number of operating units, and the matrix system of the invention effects all handling and transfer of the flats, or other articles, while the latter are in a substantially horizontal position. The transfer of the flats from element to element of the matrix is effected entirely by a free gravity drop of the flats while in their horizontal position through a relatively short distance, coupled with a gentle raking action.

The matrix system of the present invention can be considered to include groups of four basic cooperating types of groups of major elements. The first elements are a number of parallel, spaced, primary conveyors which for convenience will be designated as "X" conveyors. The X conveyor flights are in the form of spaced, individual flat mail or article transporting pans, to be referred to as "X jackets."

Crossing the X conveyors at 90° are the second major elements of the system. These elements are a plurality of secondary flat mail distributing conveyors to be referred to as "Y" conveyors. The flights of these conveyors are individual flat mail transporting jackets, to be referred to as "Y jackets." The flats are transferred from the jackets of each X conveyor to those of a predetermined Y conveyor by means of an intermediate stationary transfer pan to be referred to as a "matrix pan." The matrix pans rake the flats out of the X conveyor jackets, and the Y conveyor jackets rake the flats out of the matrix pans.

The third group of major elements in the system of the present invention is a series of bins disposed beneath the Y conveyors, which represent the destination (or article classification) for the individual pieces of mail or articles. The flats are dropped by gravity into the bins.

The fourth group of major elements includes what will be termed "sweep conveyors," that run beneath certain of the destination bins and clear such bins either automatically or as desired, while maintaining the flats in their horizontal position during the clearing process.

Another object of the present invention is to provide a destination bin system that makes possible both high density (such as populous areas or large cities in the case of mail) and low density destination sorts.

Another object is to provide a low density bin system that is flexible and can be readily programmed to carry out various sorting patterns, including patterns that may vary during a given day's operation. A further feature of the low density bin system of the present invention is that the sweep conveyor low density bin elements cooperate to eliminate what is called by the Post Office "stacked deck" problems that occur from time to time on certain types of flat mail. In addition, the apparatus of the present invention also provides for clearing the bins of any one sort or destination, or for clearing all of the bins in the machine.

A further object of the invention is to provide a bin sweeping mechanism that makes possible close spacing of the bins, yet eliminates interference between the moving parts during the bin sweeping action.

Still another object is the provision of an input feed mechanism for the X conveyor wherein the operator reads the address of a flat, codes the address, and introduces the flat into an input feed mechanism at the loading end of the X conveyor. The feed mechanism is designed to be coupled to a memory device for providing an interlock control. This interlock prevents interference that might occur because of the presence of a flat previously loaded in a Y jacket from a downstream X conveyor, which Y jacket happens to coincide with a designated Y jacket from an upstream X conveyor.

A further object of the invention is to provide means at the end of each sweep conveyor to be referred to as vertical stackers, that act as temporary storage facilities for the stacks of letters that are swept from the low density destination bins by the sweep conveyors, which at the same time turn the stacks of mail over to facilitate reading the addresses of the mail.

Another object of the invention is to provide flat receiving and emptying Y jackets for the Y conveyors that operate smoothly, without danger of damaging or tearing the mail, and which will have a long life.

An object of a modified form of the invention is to provide an apparatus of the type described which has a lower overall height and fewer parts.

The manner in which these and other objects of the invention are accomplished will be apparent from the following description of the invention as applied to the sorting of flats. It will be understood that in the broad aspects of the invention, relatively flat articles other than items of mail can be also sorted with the apparatus.

In the drawings:
FIG. 1 is a perspective diagram of the system.
FIG. 2 is a vertical section taken on lines 2—2 of FIG. 1.
FIG. 3 is an enlarged fragmentary plan of one of the input feed stations of the machine taken on lines 3—3 of FIG. 2.
FIG. 4 is a section at the input feed station taken on lines 4—4 of FIG. 3.
FIG. 5 is a fragmentary plan, similar to FIG. 3, showing an X jacket of the X conveyor at the input feed station, with the feed pan partially broken away.

FIG. 6 is a section taken on lines 6—6 of FIG. 5 showing the rake control mechanism for the X jackets.

FIGS. 6A and 6B are sections of the track for the X jackets taken on lines 6A—6A and 6B—6B, respectively, of FIG. 6.

FIG. 7 is a side elevation of the drive mechanism for the X conveyors.

FIG. 7A is a section taken on lines 7A—7A of FIG. 7.

FIG. 7B is a fragmentary elevation of the track adjacent the section of FIG. 7A.

FIG. 8 is a plan of the matrix pans for a three lane Y conveyor for the high density bins. The X conveyor is indicated above the pans in phantom.

FIG. 9 is a fragmentary section through the matrix pans taken on lines 9—9 of FIG. 8, with the X conveyor shown in solid lines.

FIG. 10 is a section taken on lines 10—10 of FIG. 8 showing the X conveyor in section, a matrix pan in section, and a portion of the three lane Y conveyor in longitudinal section.

Figure 45:
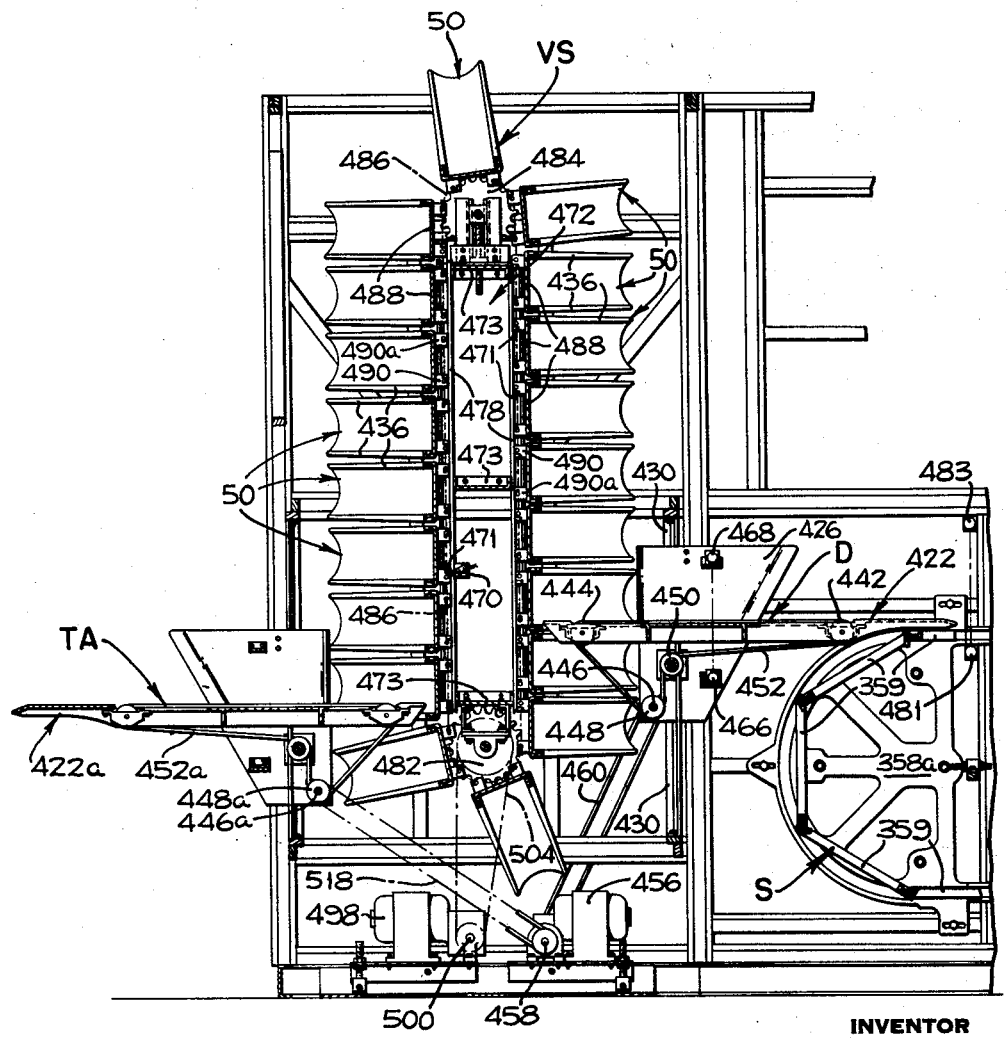

FIGS. 11 and 12 are sections taken on lines 11—11 and 12—12 of FIG. 8, showing details of the operating mechanism for the rakes on the matrix pans.

FIGS. 13 to 21 are plan operational diagrams showing the principles of transferring a flat from an X jacket to a matrix pan, and from the matrix pan to a Y jacket of the Y conveyor.

FIG. 22 is a plan of a Y jacket of the Y conveyor. The Y jacket shutter closing mechanism also appears to the left of this figure.

FIG. 23 is a section taken on lines 23—23 of FIG. 22 showing a Y jacket in side elevation with parts broken away.

FIG. 23A is a fragmentary section taken on lines 23A—23A of FIG. 23 showing the mounting of the shutter and the bottom pan of a Y jacket.

FIG. 23B is an enlarged section of the shutter closing mechanism taken on lines 23B—23B of FIG. 22.

FIG. 24 is a section taken on lines 24—24 of FIG. 23 transversely of the Y conveyor showing a Y jacket in end elevation.

FIG. 25 is a section taken on lines 25—25 of FIG. 22 showing a portion of the shutter closing mechanism for the Y jackets.

FIG. 26 is a fragmentary perspective showing the construction of the rake mechanism for the Y jackets.

FIG. 27 is a section taken on lines 27—27 of FIG. 24 showing the spring mechanism for lowering the rakes on the Y jackets.

FIGS. 28 to 33 are operational diagrams showing the operation of the shutters on the Y jackets.

FIG. 34 is a side elevation of a Y conveyor and a line of sweep pins showing a Y jacket disposed over one of the bins. Parts are broken away.

FIG. 35 is a side elevation of the low density bins for the two lane Y conveyor, with a sweep conveyor and one sweep basket shown below the low density bins.

FIG. 35A is a section taken on lines 35A—35A of FIG. 35.

FIG. 36 is a fragmentary plan of a two lane sweep conveyor taken on lines 36—36 of FIG. 35.

FIG. 37 is an end elevation of the two lane sweep conveyor viewed along lines 37—37 of FIG. 35.

FIGS. 38 and 39 are operational views showing how the sweep conveyor rakes a stack of flats from a low density bin.

FIGS. 40, 42, 43 and 44 form a series of semidiagrammatic operation views showing the operation of the cam mechanism of the sweep conveyor as the sweep lowers and sweeps a low density bin.

FIG. 41 is a view taken on lines 41—41 of FIG. 40.

FIG. 43A is an enlarged side elevation of the gate readying lever shown in the position of FIG. 43.

FIG. 44A is a fragmentary view showing a sweep cam clearing a shutter opening mechanism.

FIG. 45 is a side elevation showing the termination of a sweep conveyor, with a vertical stacking conveyor and a delivery and take-away conveyor for the latter.

FIG. 46 is a fragmentary side elevation resembling FIG. 45 but on a larger scale, showing details of the delivery conveyor that transfers a stack of flats from the sweep conveyor to the vertical stacking conveyor.

FIG. 46A is a fragmentary elevation of the vertical stacker at a larger scale.

FIG. 47 is a perspective showing the principles of rake operation between the vertical stacking conveyor and the delivery conveyor.

FIG. 48 is a plan of the delivery conveyor that extends between the sweep conveyor (not shown) and the vertical stacker (in partial section). Parts of the delivery conveyor are broken away.

FIG. 48A is a section taken on lines 48A—48A of FIG. 48.

FIGS. 49 to 52 form a series of operational diagrammatic views showing the operation of the vertical stacker.

FIG. 53 is a fragmentary perspective showing a recirculation chute at the end of one X conveyor for receiving mail that could not be received by the Y conveyors due to interference, or for other reasons.

FIG. 54 is an enlarged vertical section taken on line 54—54 of FIG. 53 and showing the recirculation chute rake.

FIG. 55 is a perspective, partly broken away, of a modified form of the invention employing a Y conveyor that operates in the horizontal plane.

FIG. 56 is a fragmentary longitudinal section of a portion of the modified form of the invention.

FIG. 57 is a plan of a portion of the Y conveyor of the modified form of the invention.

FIG. 58 is a transverse section of the modified Y conveyor taken on lines 58—58 of FIG. 57.

FIG. 59 is a longitudinal section taken on line 59—59 of FIG. 57 showing the gripper drive for the modified Y conveyor.

FIGS. 60–62 are fragmentary diagrammatic side elevations illustrating the operation of the rake setting mechanism for the Y conveyor.

FIG. 63 is a longitudinal section showing the Y conveyor and low density bin rakes.

FIG. 64 is a diagrammatic perspective showing the principle of alternately raised and lowered rakes on the Y conveyor.

Before describing the various elements of the apparatus of the present invention in detail, a general description of the major components or elements of the apparatus, coupled with a brief explanation of their principles of operation will be presented. As previously mentioned, the apparatus of the present invention to be described has been proportioned for the sorting of thin articles, such as mail flats.

GENERAL DESCRIPTION OF THE APPARATUS

*Major elements of the system.*—Referring to FIG. 1, two primary conveyors (to be referred to as X conveyors) are illustrated. These conveyors are single lane conveyors and carry jackets 10 that receive and introduce the unsorted flat mail into the machine matrix. As indicated in phantom, one or more additional X conveyors can and probably would be added, because the system is inherently modular in concept and design. The secondary or Y conveyors intercept the X conveyors, and carry jackets 12 for the flats. Two types of secondry conveyors appear in FIG. 1. Secondary conveyor Y is a two lane device and is arranged to feed a row of low density sort bins, LD. These bins are hidden in FIG. 1, but several of such bins appear in FIG. 35. The other type of secondary conveyor Y1 is a three lane conveyor, and it is arranged to distribute the flats to rows of high density bins HD.

Disposed between each of the individual X conveyors and each lane of the Y conveyors, are the fixed matrix pans M. These matrix pans act as intermediate flat transfer agents. The matrix pans do not appear clearly in FIG. 1, but they can be seen in plan in FIG. 8, and in elevation in FIGS. 9 and 10, which Figures also show their relation to the associated X conveyor above, and the associated Y conveyor below.

Disposed beneath the low density bins LD of the two lane Y conveyor is a sweep conveyor S (FIG. 35) for clearing the bins and delivering them to a vertical stacker VS (FIGS. 1 and 49). FIGS. 1 and 45 also show delivery conveyors D, for transferring the stacks of flats from the sweep conveyor S to the vertical stacker VS, and a takeaway conveyor TA for removing the stacks of flats from the vertical stacker, for manual distribution. Referring again to FIG. 1, a sweep programmer SP, the electrical details of which do not form a part of the invention, is provided in order to control the sweep conveyor S, for automatically or selectively sweeping various low density bins.

At each operator's station at the input or feed end of the X conveyors is an input buffer IB, which progressively feeds properly oriented flats to the operator. The nature of the input buffer or feeder forms no part of the present invention. An input feed station FS, manned by the operator, is provided at the input end of each X conveyor. The flats are placed in the input feed station FS by the operator after they have been coded on a manual coder C, in accordance with the addresses thereon.

A master control unit MC, which includes a memory device synchronized with the apparatus, is provided for automatically controlling the matrix sorting system in response to the coding signals. The unit MC may also contain an address storage unit to serve as a directory that translates the coded address inputs to the unit into instructions for operation of the sorting portions of the apparatus. Details of the directory or master control unit MC do not form part of this invention.

Although provision of a directory is necessary for fully automatic operation, the apparatus of the present invention is not dependent upon the nature of the directory or other type of master control, because the apparatus itself acts on signals. For example, an electro-mechanical directory could be replaced by a table on which machine instructions are listed that correspond to the various address codes. In this case, the operator would consult the table opposite the address codes (which he has memorized) and would find the corresponding machine instructions in the table of instructions. He could then press buttons which correspond to the table indicated machine instruction and the machine would sort the mail. A timer or pulser would operate a conventional memory device, which would keep track of the movement of the conveyors and the flats in the jackets, and signal the sorting instructions to the apparatus at the proper times. This explanation is given merely to illustrate that operation of the sorting apparatus does not depend upon a specific information storage system and control, memory device or "directory," because being a signal controlled device its utility is independent of the nature and details of its controller.

*The matrix principle with rake transfer.*—As mentioned, there is a primary or X conveyor (FIG. 1) for each operator. The conveyor is made up of X jackets 10 for introducing the flats into the matrix. The X jackets are spaced by one jacket length along the conveyor by open connecting links 13, and the jacket bottoms are slotted at 11, as seen in FIG. 5. The X conveyors all cross the secondary conveyors Y and Y1 at an angle of 90°.

The stationary matrix or transfer pans M are fixedly mounted between the X and Y conveyors, at each of their intersections. These pans have directory controlled rakes 26 (FIG. 9) for raking the flats (when raised by the directory) from the X jackets 10 into the matrix pans. Each Y conveyor has shuttered jackets 12, and in the present example the Y jackets 12 (FIG. 10) are also spaced by open links 15. The upper reach of each Y conveyor runs beneath the matrix pans M, and the Y jackets carry rakes 28 (FIG. 10). The bottoms of the matrix pans are slotted along the extent of the Y conveyors to receive the rakes 28 of the Y jackets for transferring the flats to the Y jackets. The rakes 28 of the Y jackets are not directory controlled, rather these rakes rake through every matrix pan that they cross. It would appear that "interference" would result, but this is prevented by directory control of the flats before they are permitted to drop into a matrix pan. Because of the memory unit of the directory, the raking of a flat into a Y jacket must have been accomplished because the directory track found that such Y jacket will intercept the designation bin, and in fact is a certain number of units away from the bin. Thus this Y jacket is "being kept track of," and when this previously loaded Y jacket happens to cross a second matrix pan that would ordinarily contain a flat, the directory countermands its distribution orders and prevents transfer of the interfering flat to the second matrix pan. The lower reach of each Y conveyor runs over a row of bins, there being at least one bin for each destination. For example, and as previously explained, the secondary conveyor Y is a two lane conveyor that serves low density bins LD (FIG. 35), whereas the secondary conveyor Y1 is a three lane conveyor that serves the high density bins HD, (FIG. 1). The flats are automatically transferred from the Y conveyor jackets (when the latter are on the lower reach) to the designated destination bin. As in the transfer of the flats from the X conveyors to the matrix pans, this transfer from the Y jackets to the distination bins is also directory controlled, so that the Y jacket shutters are opened when over the proper bins. The flats remain substantially horizontal during the entire transfer process, and undergo a gentle combined dropping and releasing action as they are transferred from the input feed basket to the destination bin. The modularity of this system will be apparent, in that there is no inherent limit to the number of X and Y conveyors that can be assembled into a matrix sorting system.

*Input feeding mechanism.*—Continuing this general description, special means are provided for introduction of flats into the machine. At the input feed station FS, the operator reads the address of the flat, codes the address on keyboard C, and places the flat in an input basket 20 (FIGS. 3 and 4). The flat eclipses the beam of electric eye unit 22, 22a. The operator also pushes an "operate" button on the keyboard of coder keyboard C. When the electric eye beam is eclipsed (FIG. 4), rakes 24 on the X jacket 10 approaching the basket 20 are raised by mechanism to be described, and rake the flat from the input basket 20 into the X jacket. Simultaneously, the coded address signal goes to the memory and control unit or directory MC, which now takes control of the apparatus for distributing the coded flat in the matrix to its assigned destination bin. A pulser P (FIG. 3), which is illustrated as an electric eye unit, sends timing signals, representing a series of one jacket length (pitches) to the directory, for synchronizing the memory device. As mentioned, the first instruction from the directory to the matrix is that of selecting the one matrix pan M, that lies above the Y conveyor lane, which will eventually pass over the desired destination bin.

*Transfer from the X conveyor to a matrix pan.*—This operation has been briefly described, but additional major elements will be mentioned before proceeding with the detailed description. When the X jacket 10, containing the flat in question, reaches the stationary matrix pan M located at the intersection of the X conveyor and the directory designated Y conveyor (the designated Y conveyor is the conveyor that crosses the row of bins that includes the proper destination bin), the directory provides a signal that causes lifting of the rake 26 (FIG. 9) on the far side of the stationary matrix pan M. The bottom of the X jacket has slots 11 (FIGS. 3, 9 and 10) that extend in the direction of X conveyor motion. The leading end wall of the X jacket is also slotted at 11a, (FIG. 9). As seen in FIG. 9, the rake 26 on the matrix pan, when lifted, is above the bottom of the X jacket. Thus as the flat-bearing X jacket overlies and then moves past the matrix pan, the slotted bottom and trailing end wall of the X jacket moves through the rake 26 on the matrix pan (lifted by directory signal) so that the rake 26 first stops the flat F (shown in phantom in FIG. 9), and as the X jacket moves out from under the flat, the support of the flat by the X jacket 10 is progressively removed. The flat falls through the gap between links 13 that join the X jackets, and into the stationary matrix pan M lying beneath it. The flat is now in a matrix pan M that overlies the designated Y conveyor.

This transfer operation from the X jacket to a matrix pan is diagrammed in FIGS. 13–19, and the step by step timing will be explained in the more detailed description to follow. The rakes 24 on the X jackets, which, after having raked a flat out of the input basket, serve to carry the flats up the initial inclined portion 52 of the X conveyor, (FIGS. 1 and 2), are omitted in these diagrams of FIGS. 13–19 for clarity. It is again pointed out that in these diagrams the Y conveyor is moving twice the speed of the X conveyor, in terms of jacket lengths.

*Transfer from the matrix pan to a Y jacket.*—At the time the coded flat was loaded in the X conveyor, the directory not only determined the proper Y conveyor in terms of X jacket lengths (pitches) from the input basket 20 to a matrix pan M overlying the designated Y conveyor, but it also determined the distance in terms of Y jacket lengths (pitches) from the matrix pan to the proper destination bin under the lower, or return reach, of the designated Y conveyor. In the form of the invention being described, the Y conveyor moves two jacket lengths for one jacket length motion of the X conveyor, but so long as the conveyors are synchronized, their relative speed is not critical. As mentioned, in the form of the invention illustrated the Y jackets are connected by links 15, which construction coupled with the double speed operation of the Y conveyor, reduces statistically the occurrence of interference (previously referred to) between X conveyors caused by the presence of flats in the downstream Y conveyor jackets.

As mentioned in the explanation of the matrix principle, each Y jacket is formed with a rake 28 at its trailing edge (FIG. 10), but unlike the selectively projectible rakes 26 for the matrix pans, the rakes on the Y jackets are all in their rake position when the Y jackets are on the upper reaches of the Y conveyors, so that the rake on each Y jacket sweeps through the entire row of matrix pans above. This obviates the need for direct control of the Y jacket rakes. It is only necessary to provide means in the memory control that takes special action in case of incipient interference to prevent the Y jackets from raking in a flat from more than one matrix pan. The bottoms of the stationary matrix pans M are actually formed of projecting bars 29 (FIG. 8) that provide slots 29a between the bars, the bars 29 and slots 29a extending in the direction of the extent of the Y conveyor (FIG. 10). Thus, the rakes 28 on the Y jackets all pass through the slots 29a in each matrix pan, and if there is a flat F in a matrix pan (FIG. 9) the flat will be raked out into the Y jacket. As seen in the diagram of FIG. 19, when the flat F is fully deposited in the matrix pan, a Y jacket 12b will be partially underneath the matrix pan, and the rake 28 on the trailing edge of the Y jacket 12b, is about to engage the edge of the flat and push it off the matrix pan. As seen in FIGS. 20 and 21, as the rake 28 on the Y jacket 12b passes through the slots 29a formed by bars 29 of the matrix pan, the flat is gradually pushed off the matrix pan, to be deposited in the aforesaid Y jacket 12b.

*Transfer from the Y jacket to a destination bin.*—The directory memory includes a countdown system that is synchronized with the X and Y conveyors by the pulser P. From the coded signal input to the directory, the directory "knows" the number of Y jacket lengths from the matrix pan under consideration that was just emptied, to the destination bin that corresponds with the coded address or destination signal originally fed into the directory.

As previously mentioned, there is a "roll top" shutter 30 on each Y jacket (FIG. 10) that closes the top of the jackets that contain a flat, after the jackets have passed beneath all of the matrix pans at the various X conveyors (FIG. 29), but while they are still on the upper reach of the Y conveyor. When the Y jacket shutters 30 are closed, they keep the flats from falling out of the Y jackets on the lower or return reach of the Y conveyor. The shutters 30 are closed by a signal from the directory, that operates a shutter closing mechanism 31 when the Y jacket contains a flat (seen to the left of FIG. 23 and in diagram FIGS. 28 and 29). As the lower reach of the Y conveyor runs over a series of bins, such as low density bins LD (FIGS. 32 and 33), the Y jackets are now upside down with the shutters 30 supporting the flats, ready to drop their flats into the selected bin when their shutters are opened.

For example, referring to the diagrams of FIGS. 32 and 33, the directory operates a solenoid for a shutter opening mechanism 31a at the assigned low density sweep bin LD, there being one such shutter opening mechanism 31a at each bin. As the Y jacket passes over the assigned bin, the solenoid operated mechanism 31a, when fired, moves into the path of the shutter, restrains, and hence opens the shutter 30 of the Y jacket, to drop the flat from the Y jacket into the low density bin.

*Clearing the low density bins and stacking.*—As mentioned, there are two types of bins, high density bins HD for heavy volume destinations, and low density bins LD for lighter volume destinations. The high density bins HD receive a large number of flats and are manually wheeled out for emptying. The low density bins are automatically emptied, or cleared, when the stack of flats reach a certain height, such as 5″, as detected by a photocell lamp *pcl* and photoelectric device *pc* (FIG. 37). This automatic clearing does not prevent selected clearing of the various bins.

The low density bins LD are actually relatively shallow baskets 32 (FIGS. 34–44) mounted in tracks for limited vertical motion. They are spring urged to their normal, upper position, by wire wind up reels 33. There is a row of such bins directly under each Y conveyor. The bottoms of the baskets 32 are slotted at 34 (FIG. 35). One end of the basket is open, and the other end is slotted at 36. Running beneath each of the two lane rows of low density bins, and parallel to the associated Y conveyors, is a two lane sweep conveyor S, having spaced and staggered sweeps 14 provided for emptying the baskets 32 of a given row of low density bins before they are overfilled. Each lane of the sweep conveyor is provided with a series of open ended rake pans 40 having stack supporting bars 42 that are aligned with the slots 34, 36 in the low density bins disposed above the sweeps (FIGS. 36 and 37). When the low density bins are lowered, the bars 42 on the sweep rake pans nest in the slots 34 of the low density bins. Each sweep unit 14 has a rake 44 at its trailing edge. The rake bars are also aligned with slots 34, 36 in the low density bins (FIG. 37). When the stack of flats in any low density bin becomes 5″ high, the photocell beam of the electric eye unit *pcl*, *pc* is interrupted, and the resultant signal readies a bin lowering mechanism mounted on the frame at the low density bin in question. There is one bin lowering mechanism for each bin. When the next sweep 14 reaches the fully loaded bin, a gate cam 46 on the sweep lowers the low density bin in front of the rake 44 on the sweep (FIGS. 38 and 42–44) and the sweep rake pushes the stack of flats from the basket 32 of the low density bin onto the sweep pan bars 42, as can be seen in the diagram of FIG. 39. The bars forming rake 44 on the sweep pass through the slots 34, 36 in the low density bin and the sweep rake empties the low density bin through the latter's open end. The loaded sweep 14 of the sweep conveyor S continues on, and carries the classified stack (all pieces in the stack have the same destination) to the delivery conveyor D (FIG. 1), which loads the stack into the vertical stacking conveyor VS mounted at the end of the sweep conveyor. Intermediate transfer belts of the delivery conveyor D transfer the stack from the end of the sweep conveyor to baskets 50 of the vertical stacking conveyor VS (FIGS. 49–51). The vertical stacking conveyor VS is an endless vertical conveyor that intermittently and successively presents slotted pockets 50 (FIGS. 45 and 47) to matching delivery elements of the delivery conveyor D for receiving individual stacks of flats. The vertical stacker VS turns the inverted stacks of flats over and deposits them one by one, at each indexing, to the take-away conveyor TA (FIGS. 45 and 49–52) for examination, manual removal, and distribution. This completes the general description of the major units of the apparatus of the present invention. Various details of the construction of these units and their operating mechanisms will now be described.

DETAILED DESCRIPTION OF THE UNITS

*X conveyor construction.*—Details of the construction of the X conveyor appear in FIGS. 2–6B, 9 and 10. Referring to FIG. 2, it can be seen that the X conveyor has an inclined section 52 and a straight section 53. The inclined section 52 leads up from the operator at the input feed station FS to the straight section 53, which is elevated sufficiently so that the upper reach of the X conveyor is above the upper reach of the Y conveyor. The Y conveyor in turn must be elevated so that its lower reach is above the row of low density bins LD, and these in turn must be above the upper reach of the sweep conveyor S. The straight tracks of sections 52 and 53 of the X conveyor, which are mounted in the frame of the apparatus, connect to generally semi-circular castings 54 at each end of the conveyor, which serve to reverse the direction of the upper and lower reaches. The inclined section 52 of the X conveyor is joined to the straight section 53 by upper and lower arcuate straight track connecting portions 56 and 58.

The major elements of the X jackets have been mentioned and the construction of these jackets will now be described in somewhat more detail. Referring to FIGS. 5, 6, 6A, 6B, 9 and 10, the X jacket is in the form of an aluminum casting. The slots 11 in the bottom of the casting and slots 11a in the leading wall 60 (FIGS. 9 and 10) for receiving the rakes 26 on the matrix pans (when the rakes are lifted) have been described. Referring to FIG. 5, at each corner of the X jacket is mounted a stub shaft 66, and the frame of the jacket is broken away in FIG. 5 to show one shaft. Each stub shaft 66 carries rollers 68 that support the jacket in the straight tracks 70 for straight sections 52 and 53 of the X conveyor. The end castings 54 have curved track sections 72 for the rollers 68, as seen in FIG. 6 and 6B. The arcuate straight track connecting portions 56 and 58 (FIG. 2) are also formed with tracks 72 for the rollers 68 of the X jackets.

The tracks 72 in the semi-circular castings 54 are not exactly semi-circular. Since the links 13 and the X jackets 10 are relatively long as compared to the circumference of the tracks 72, the polygonal form assumed by the X conveyor parts 10 and 13 has a circumference that is less than that of the semicircle in which these parts are inscribed. To maintain uniform linear speed of all parts of the conveyor, and to avoid the necessity for providing lost motion in the pivots of the conveyor links and jackets, the tracks 72 in end castings 54 are semi-elliptical to provide the necessary extra pivot to pivot distance of the inscribed circumference of the tracks. As seen in FIGS. 7, 7A and 7B, an auxiliary track section 73 is also formed in the arcuate castings 56 which functions in connection with rollers of the rake lifting mechanisms to hold the X jacket rakes 24 up, as will be described presently.

As seen in FIG. 5, in order to assist in guiding the X jackets laterally, side rollers 74 are provided at each corner of the X jacket, and these rollers bear against the edge of the bottom flange of the channel-like tracks 70 (FIG. 10). As is also seen in FIG. 5, links 13 pivot on pins 13a that are in axial alignment with the stub shafts 66 that mount the rollers 68. The general construction details of the X conveyor has now been described. Before explaining the operation of the X conveyor rakes 24, the drive train for all of the conveyors in the apparatus, X, Y and Sweep, will be explained briefly.

*Drive train for the conveyors.*—Details of the drive train for the conveyors do not form part of the invention, and only those necessary for an understanding of the operation of the apparatus appear in FIGS. 2 and 7. Seen at the lower left of FIG. 2, is a horizontal shaft 80, which is the master driveshaft for all of the conveyors. This shaft is connected to a drive motor which does not appear in the drawings. Between the two and three lane Y conveyor units, is an angle gear box 82, which is driven from the main driveshaft 80 by a chain and sprocket drive 84. The angle gear box 82 is provided to drive the X conveyors. To this end, an X conveyor countershaft 86 is provided just below the lower reach of the X conveyors. Countershaft 86 is driven by a chain and sprocket drive 88 from the angle gear box. A gripper drive countershaft 90 is mounted beneath the upper reach of the X conveyors, and is driven from the countershaft 86, just described, by a chain and sprocket drive 91. Countershaft 90 drives a gripper drive G, there being one such drive for every X conveyor in the system. The gripper drive G will be explained after the balance of the drive train of the apparatus has been described.

At the lower left of FIG. 2 appears a countershaft 92 which is driven from the main drive shaft 80 by a chain and sprocket drive 94. Countershaft 92 drives a gripper drive mechanism G1, which operates the sweep conveyor S. In order to operate the two lane conveyor Y, a shaft 96 is mounted below the upper reach of the Y conveyor and is driven by a chain and sprocket drive 98 from the countershaft 92 that drives the sweep conveyor. Shaft 96 operates a pair of gripper devices G2, which drive each side of the two lane Y conveyor.

The three lane conveyor Y1 is driven by a countershaft 100 that is just below the main drive shaft 80, and is driven from shaft 80 through a chain and sprocket drive 101. A shaft 102, that is disposed below the upper reach of the three lane conveyor Y1, is driven by a chain and sprocket drive 104 from countershaft 100. Shaft 102 drives two gripper drive devices G3 for the three lane conveyor Y1.

FIG. 7 shows the major elements of the gripper device G for driving the X conveyors. This device is the same as the gripper devices G1, G2 and G3 that drive the sweep and Y conveyors previously referred to. Countershaft 90, also previously referred to, and driven by chain 91, drives a large sprocket 110 for a gripper device drive chain 112. The chain is also trained around an idler sprocket 114. Opposed pairs of grippers 116, 118, in the form of bellcranks, are pivotally mounted at 119 on the gripper device drive chain 112. A gripper cam track 120 is formed around the periphery of drive chain 112 and gripper control rollers 122 ride in the cam track. The grippers also mount gripper drive rollers 124, for engaging with drive lugs 126 that depend from the X jackets. The drive lugs 126 for the X jackets also appear in FIGS. 3, 5 and 10. As the grippers 116, 118 pass from the curved section of the cam track 120 to the straight section, the camming section is such as to bring the grippers progressively but firmly into engagement with the driving lugs 126 on the X jackets, whereupon the X jackets are smoothly and positively advanced until the grippers are released by the curved cam track at the other end of the derive. There will always be at least two sets of grippers firmly driving the X conveyor. The details of the gripper device G do not form part of the present invention, such devices being known in the conveyor art.

*The input feed mechanism.*—As has been mentioned, when flats are placed in the input feed basket, an electric eye beam is eclipsed causing the rake 24 on the X jacket to be lifted as the jacket approaches the input feed basket, and rake the flat out of the basket into the X jacket. The lifted rake retains the flat in the X jacket as it climbs the inclined section 52 of the X conveyor, and as the X jackets reach the straight section 53 of the X conveyor, the rakes are automatically lowered. Their flat holding action is now no longer necessary, and they are lowered in order to permit the X jacket to pass through the lifted rakes 26 of whatever matrix pan is destined to rake the flat out of the X jacket.

Details of structure for accomplishing these results will now be described. The structure of the input feed basket 20 of the input feed station FS appears in FIGS. 3 and 4. A masking plate 130 is secured to frame rails 132 at the operator's feed station, and the masking plate is formed with an opening 134 for receiving the flats. On the operator's side of the unit, a flat guide ramp 136 projects downwardly toward the bottom of the basket 20. On the opposite side, a vertical side plate 138 is provided. At the lower end of the basket there is fitted an inclined flat deflector plate 140, which merges with the rear wall 141 of the feed basket. The bottom of the feed basket is formed by a flat support plate 142 which is slotted at 144, and these slots also extend through the rear wall 141 of the feed basket. As seen in FIG. 4, the slots are provided to permit the fingers of rake 24 of the X jackets to pass through the feed basket and push the flats out of the feed basket and into the X jacket at the upsteam end of the feed basket. An inclined throat plate 146 is mounted on the main casting of the basket at the upstream end thereof. Three photocell units 22a are also mounted in the feed basket casting, and the deflector plate 140 and the flat support bars 142 at the bottom of the basket are apertured at 147, 148, respectively, for passage of the electric eye beam from lamps 22 below.

*Rake operating mechanism.*— The rake operating mechanism is carried by each of the X jackets and cooperates with a rake raising cam and resetting mechanism that is mounted on the frame at the lower end of the input feed basket. Referring to FIGS. 3–6B, the fingers of the X jacket rakes 24 extend in opposite directions from a rake crossbar 150. In fact, the fingers and the rake crossbar are formed as a one-piece aluminum casting. In order to pivotally mount the rakes 24 on the trailing ends of the X jackets, the crossbar 150 mounts pivot pins 152 (FIG. 5) which extend through side plates 153 of the X jacket. A rake lowering spring 154 connects to one of the rake pivot pins 152 and to the X jacket, and urges the rakes 24 to their horizontal or lowered position. The rotation of the rakes in response to the force of the rake lowering spring 154 is limited by a stop bar 155 that extends across the X jacket. The position of an X jacket rake that has not been lifted at the feed basket, and hence is urged against the stop bar 155 by the rake lowering spring is illustrated in FIG. 9.

As seen in FIG. 5, in order to provide for lifting of the rake 24 to both sweep the flat out of the basket and keep the flat in the X jacket on the inclined section 52 of the X conveyor, a rake lifter crank 156 is fastened to the rake pivot 152 at one end of the rake mechanism. Referring to FIG. 6, the rake lifter crank 156 is provided with both an operating roller 158 and a latch reset cam surface 160, both of which cooperate with a rake raising cam and reset mechanism mounted on the frame of the apparatus.

*Rake raising cam and reset mechanism.*—Referring to FIGS. 3–6B, the mechanism is mounted on a mounting plate 164 which is secured to frame member 132, previously referred to, through spacers 166. An operating cam lever 168 for the rake lifter crank 156 is pivotally mounted on plate 164 by a pivot shaft 170. Pivot shaft 170 also forms a shaft for a rotary solenoid 172 which contains a spring for urging the rake operating cam lever 168 in the clockwise direction, as viewed in FIG. 6, to the non-camming position. The cam lever 168 is also biased clockwise by a counterweight 173a on an extension arm 173 of the lever. When the solenoid 172 is energized, it turns the lever 168 counterclockwise to its camming position, bringing the arm 173 of the lever into engagement with a stop 174 mounted on plate 164. The other arm 175 of the lever 168 is formed with a cam surface 176 on the underside thereof, for camming down the roller 158 on the rake lifter crank 156, as the latter moves along the cam surface 176 with the X jacket.

In order to hold the lever 168 in the down or camming position, as illustrated in FIG. 6, a pivoted latch lever 180 is provided. This lever is mounted on the plate 164 by a pivot 182 and carries a latch roller 184 for engaging a detent notch 186 formed in the upper corner of arm 175 of the lever 168. A bias spring 188 urges the latch lever 180 toward its position of latching engagement with the cam lever 168. The lower end of the latch lever 180 carries a roller 190 for resetting the latch 180 to permit the cam lever 168 to rotate in a clockwise direction, as viewed in FIG. 6, so that cam surface 176 on the lever will be restored to its non-camming position. In order to hold the rake 24 in its lifted position, as seen in FIGS. 6, 6A, and 6B, a hold-down bar 192 is bolted to the end of casting 54 and forms a prolongation of the cam surface 176 of the lever 168, when the lever is in its lowered or camming position. As seen in FIGS. 6 and 6A, the track section 70 on the straight section of the conveyor has an offset flange position 194 that forms a continuation of the hold-down bar 192 on casting 54. Thus when the roller 158 on the rake lifter crank 156 is cammed down by the cam surface 176 on the underside of lever 168, the roller 158 will first pass under the hold-down bar 192, and will then pass under the flange portion 194 of the track 70. With the roller under these track surfaces, the rake 24 of the X jacket is held in its raised or rake position against the force of the rake lowering spring 154, and the rake lifter crank 156 is in the position illustrated in solid lines in FIG. 6. The fingers of rake 24 are shown in phantom in this figure, because of the location of the section.

To review the operation of the mechanism, reference is made to FIGS. 6, 6A and 6B. When the beam of the electric eye unit 22, 22a of the input feed basket is interrupted by the introduction of a flat thereto, a signal is provided to rotary solenoid 172 which turns the cam lever 168 counterclockwise. This places the cam surface 176 of lever 168 in the path of the roller 158 on the rake operating crank 156 of the next approaching X jacket, the rake of which will have been previously lowered. This condition of the approaching X jacket rake and rake lifter crank 156 is shown in phantom to the right of FIG. 6. When the arm 175 of lever 168 is lowered by the rotary solenoid 172, the latch lever 180 springs to the right as viewed in FIG. 6 so that the roller 184 on the latch lever enters the detent notch 186 in the camming lever 168, and latches the camming lever in its down or camming position. As the roller 158 of the rake lifter crank 156 rides along the cam surface 176 of lever 168, the crank 156 is rotated in a clockwise direction, as viewed in FIG. 6, which lifts the X jacket rake 24, and as the roller 158 leaves the cam surface 176 on the lever, it rides under the track section 192 (FIG. 6B) which keeps the rake lifted. As the X jacket progresses, the roller 158 of the rake lifter crank rides under the track section 194 on the member 70 (FIG. 6A). Before this happens, however, the cam surface 160 on the rake lifter crank 156 is brought against the roller 190 on the latch lever 180, which pivots the latch lever against the force of spring 188 and releases the cam lever 168. The latter can now return to its upper, or non-camming position. After the X jacket passes the latch lever 180, the bias spring 188 for the lever 180 pulls the lever to the right, as viewed in FIG. 6, so that roller 186 on the latch lever is brought against the curved end 178 of cam lever 168, which end serves as a stop for further motion of the latch lever 180.

When the X jacket reaches the end of the inclined section 52 of the X conveyor, the rake 24 on the X jacket must be lowered to its horizontal position to accommodate passage of a rake 26 on one of the matrix pans, as the X jacket moves through such rake 26. This is automatically accomplished by termination of the track that holds the roller 158 and the rake lifter lever 156 in their rake lifting positions. Referring to FIGS. 7 and 7B, it can be seen that the arcuate track casting 56, which joins the inclined and straight sections 52, 53 of the X conveyor, is formed with an auxiliary track portion 73 which projects laterally inwardly of the track portion 72 that is provided for the main rollers 68 of the X conveyor. This auxiliary track portion 73 terminates just as the roller 158 on the rake lifter crank 156 reaches the straight section 53 of the X conveyor, so that as the roller 158 clears the track section 73, the X jacket rake 24 is released, and is returned to its horizontal position by means of the rake spring 154 (FIG. 5). This brings the rake 24 against the stop bar 155, and hence to its horizontal position, as illustrated in FIG. 9.

Referring again to FIG. 6, a rake assembly is shown in phantom to the left of the rake operating mechanism, and with the rake 24 in its horizontal position. This is the position of the rake when an X jacket passes the input feed basket, and no flat is introduced into the basket to interrupt the beam of the electric eye unit. In this case there is no signal to solenoid 172 to cause operation of the rake raising lever 168 mounted on the frame, and roller 158 passes above the various track elements with the rake in its retracted position.

MATRIX PAN AND RAKE DETAILS

As previously mentioned, a matrix pan is disposed between the intersection of each X conveyor and each Y conveyor lane. Each matrix pan has a projectable rake controlled by the directory for transferring a flat from the X conveyor that runs over the matrix pan to the Y conveyor that runs beneath it. A plan of three matrix pans that overlie the three main conveyors Y1 appears in FIG. 8. FIG. 9 is a section of the same assembly taken along the extent of the X conveyor which overlies the three pans, and shows the relationship of the matrix pan to the X and Y conveyors. As previously described, in this figure a flat F is in the process of being raked from an X jacket into the central matrix pan M by the rakes 26 of the matrix pan. FIG. 10 is a section through the same assembly taken in the direction of the extent of the Y conveyor beneath the matrix pan. This figure shows a flat F being raked from the matrix pan into the Y jacket by the rakes 28 of the Y jacket. FIGS. 8, 9, and 10 also show construction details of the matrix pans which will now be described.

As best seen in FIG. 8, the central matrix pan M has a mounting flange 200 at the left side thereof and a mounting flange 202 at the right side thereof. Flanges 200, 202 of adjacent matrix pans bolt together to form a 3 matrix pan assembly that extends along the X conveyor overhead, the X conveyor appearing only in phantom in FIG. 8. Bolts 203 connect the matrix pans together. Spaced from but parallel to flanges 200, 202 are side flanges 204, 204a for guiding the edges of the flats disposed in the matrix pans. Guide flange 204 is joined to the side flange 200 by webs 206. These webs and the guide flanges 204 are notched to receive the rake assembly 26. The other guide flange 204a for the flats is joined to the side flange 202 by webs 210. The matrix pan has an upstream end wall 214 which has slots 29b formed therein (FIG. 9) that form continuations of the slots 29a between the bars 29 that form the bottom of the pan, previously described. As seen in FIGS. 8 and 10, a stiffening bar 216 extends across the open or downstream end of the pan at the top portion of the pan.

The fingers of the matrix pan rake 26 are integral with a rake crossbar 218 which extends along the left side of the pan as viewed in FIGS. 8 and 9, the crossbar lying between the flanges 200 and 204. The fingers and crossbar forming the matrix pan rake 26, are a unitary aluminum casting. The rake 26 is pivotally mounted in the matrix pan by means of pivot pins 220 projecting from each end of the crossbar 218. The matrix pan rake is urged to its lowered position by a rake lowering spring 222 which, as seen in FIGS. 8 and 10, has one end connected to a rake finger and the other end bearing against the matrix pan. The notched portions of guide wall 204 form stops for the rake 26 of the matrix pan when the latter is lowered by the spring 222.

In order to lift the rakes for transferring a flat from the X jacket overhead into the matrix pan, a rotary rake lifting solenoid 224 is provided (FIG. 8). The solenoid is mounted on a bracket 226 attached to the matrix pan. The operating portion of the solenoid armature mounts an eccentric pin 228 for raising the rake. Cooperating with this pin is a combined rake lifting and latch cam 230 mounted on one end of one of the pivot pins 220 of the rake crossbar 218 (FIG. 8). Referring to FIGS. 11 and 12, rake lifting cam 230 is formed with an abutment shoulder 232 for engagement by the solenoid pin 228. Also formed in the cam 230 is a notch 234 which serves as a latching notch while the cam is hlding the rake in its raised position. A latch pin 236 that fits in notch 234 (FIG. 11) projects from a latch pin bar 238 that slides in a groove 239 formed in a boss 239a of the matrix pan, as seen in FIGS. 8 and 12. The latch pin bar 238 is confined in its grove by the brackets 226 that mounts the rotary solenoid. A link 240 is pivotally connected at one end to the latch pin bar 238 and at the other end to a latch bar operating lever 242, which lever is pivotally mounted on the end flanges 214 of the matrix pan by means of a bolt 243 (FIG. 11). A spring 244 connected between the latch operating lever 242 and the matrix pan causes counterclockwise rotation of the latch operating lever 242, as it is viewed in FIGS. 11 and 12. The free end of the lever 242 mounts a latch pin reset roller 246 for engagement by a cam 250 (FIGS. 9 and 11) that depends from each of the X jackets.

The operation of the matrix pan rake mechanism is as follows: Assume that the matrix pan rake 26 is in its lowered position, as seen at the right hand matrix pan M in FIG. 9 and in phantom at the left of FIG. 12. The rake lifting and latch cam 230 will now be in the position shown in phantom in FIG. 12 and will be urged against the pin 228 of the rotary solenoid 224 by the rake lowering spring 222. When the solenoid is energized by a signal from the directory, the rake lifting cam 230 is rotated by the solenoid in a clockwise direction as viewed in FIGS. 11 and 12, the solenoid pin 228 turning from the position shown in phantom in FIG. 12 to that shown in phantom in FIG. 11. The solenoid pin 228, therefore, presses against the shoulder 232 on the rake lifting cam 230, causing the cam to rotate in a clockwise direction from the position shown in phantom in FIG. 12 to the position shown in solid lines in FIG. 11. This lifts the rake 26 to its raised position shown in solid lines in both FIGS. 11 and 12. As the cam 230 is rotated in a clockwise direction as just described, the arcuate surface 235 of the cam moves under the latch pin 236, which pin is positioned as indicated in phantom in FIG. 12. Latch pin 236 is urged against surface 235 of the cam 230 by the latch lever spring 244, operating lever 242, link 240, and latch pin bar 238. When the rake reaches its raised position, as seen in FIG. 11, latch pin 236 snaps into the detent 234 formed in the cam 230, and retains the rake in its raised position against the force of the rake lowering spring 222. With this construction, energization of the rotary solenoid 224 by the directory need only be momentary, and as seen in FIG. 11, the rake 26 will remain in its raised position even though the solenoid pin 228 is returned to its normal position (shown in solid lines in FIG. 11) upon de-energization of the solenoid 224. The arrow leading from the solenoid pin 228 in FIG. 11 shows the motion of the pin when the solenoid is energized, to rotate the cam 230 and lift the matrix pan rake 26.

Referring to FIG. 9, the rake 26 on the central matrix pan M has been raised, and is in the process of raking a flat from the X jacket 10 (moving to the left in the figure) into the central matrix pan. Also appearing at the right of FIG. 9 is an approaching X jacket 10, which may carry a flat that is not designated for the central matrix pan of FIG. 9. Thus it is necessary immediately to reset the matrix pan rake 26 to avoid uncalled for clearing of the approaching X jacket, and this is the function of the rake resetting cams 250 mounted on the trailing end of each of the X jackets. In FIG. 11, which view is taken in a direction different from that of FIG. 9, so that the X jacket 10 is traveling to the right in FIG. 11, the matrix pan rake 26 has been raised and a reset cam 250 is approaching the roller 246 of the latch cover 242. When the X jacket cam 250 strikes the lever roller, the lever is moved to the right by the cam, as indicated in phantom in FIG. 12, which moves the latch pin 236 out of the detent 234 in the rake lifting cam 230. The X jacket 250 holds the latch lever 242 to the right long enough for the matrix pan rake 26 to return to its lowered position, as indicated in phantom in FIG. 12. The matrix pan rake is returned by the rake lowering spring 222 (FIG. 8). This simultaneously rotates the cam 230 to bring the cam shoulder 232 against the solenoid pin 228, as indicated in phantom in FIG. 12, and to bring the surface 235 of the cam 230 behind the latch pin 236, which pin was displaced to the right (as seen in phantom in FIG. 12) when the roller 246 on latch lever 242 was engaged by the X jacket cam 250. When the cam 250 on the X jacket clears the roller 246 on latch lever 242, the lever 242 is prevented from returning to its solid line position in FIG. 12 by engagement of the latch pin 236 with the surface 235 on the cam 230. Thus the matrix pan rake 26 is in its lowered position ready to be reset to its raised position in case the solenoid 224 is energized by the directory before the next or succeeding X jacket reaches a position wherein the leading edge of the jacket is at, or close to the position of the matrix pan rake 26.

Y JACKET AND RAKE MECHANISM

As previously described, the Y jackets do not have slotted bottoms as do the X jackets and the matrix pans, but have open pans that are closed by shutters 30. The Y jackets also have rakes 28 which sweep through the slots in all of the matrix pans, and so empty the first matrix pan that they encounter. Details of the construction of the Y jackets appear in FIGS. 9, 10, and 22–27. The Y jackets are formed of a pair of cast side rails 260 (FIG. 22) to which a pan is connected. The bottom 262 of the pan is best seen in FIGS. 10 and 22. The pan has sides 263 also seen in these figures. As seen in FIGS. 23 and 23A, the sides 263 of the pan are bolted to the side rails 260 by means of bolts 263a. The pan also has front and rear end walls 264, the rear wall appearing in section in FIG. 10.

The Y jackets are bolted together to form the two or three lane assemblies Y, Y1 previously referred to. For example, open spacer blocks 265 (FIGS. 9, 22, 24 and 27) are bolted to the side rails 260 of the pans, as indicated in FIG. 22, and a plate 266 is screwed to the bottom of the spacer blocks 265 to strengthen the structure. Passing through each end of the side rails 260 of the Y jackets are cross tubes 268 which mount the rollers 270 that support jackets in a track 272. This construction is best seen in FIGS. 22, 23, and 24. As has been previously described, links 15 pivotally connect the Y jackets, by means of the cross tubes 268. In order to guide the Y jackets laterally, lateral guide rollers 273, which are offset along the length of each jacket, ride in a track 274 (FIGS. 9 and 23), the track being mounted on frame structure 274a, as illustrated in FIG. 9. As seen in FIG. 9, side guide rollers 273 are mounted on the central plate 266. In order that the two gripper drives G3 (FIG. 2) may drive the Y jackets, gripper lugs 275 depend from the two outboard side rails 260, as seen in FIGS. 22 and 23.

The shutter 30 for closing the Y jackets has been previously mentioned. It is formed of a rubber belt member 30a to which is bonded a series of slats 30b, as seen in FIGS. 10 and 23A, this provides a laterally rigid, longitudinally flexible closure for the Y jackets. The shutters 30 ride in tracks 276 formed in side rails 260 (FIGS. 9, 10, and 23A) and at the ends of the shutters are striker clips 278 for engagement by the means 31 and 31a that opens and closes the shutters. As seen in FIG. 22, stop blocks 279 are mounted for engaging the upper ends of the shutters when the shutters are in their closed position.

Details of the Y jacket rake mechanism 28 will now be described. As best seen in the perspective of FIG. 26, the fingers of rake 28 are cast integrally with a crossbar 280, and as seen in FIG. 22, crossbar 280 extends from one side of each Y jacket to the other. As is also seen in FIG. 22, at the outboard end of the crossbar 280 for the rake that is adjacent the tracks 270, there is connected a rake control crank arm 282 having a collar 282a that is pivoted on the associated cross tube 268. This construction also appears in the perspective of FIG. 26. The construction is duplicated at the outboard end of the Y jacket that is adjacent the frame. The inboard ends of rake crossbars 280 mount cranks 283 (FIG. 27) which have collars 283a that are likewise rotatable on cross tube 268. As seen in FIG. 9, in the three lane Y1 conveyor assembly, the central Y jacket has cranks 283 on both ends of the crossbar 280 for the rake assembly. Adjacent cranks 283 have their collars 283a connected by a sleeve 283b (FIG. 22) so that all of the rakes rotate in unison.

The outboard rake control cranks 282 mount rollers 284 which function to hold the rakes up in their raised position. These rollers ride in tracks 285 (FIGS. 23 and 24) which tracks have an entrance ramp 285a for lifting the rollers (and hence raising the rakes, and exit ramps 285b (FIG. 23) for allowing the rollers and rakes to gradually become lowered, as the Y jackets reach the end of the upper reach of the Y conveyor. As best seen in FIGS. 22 and 27, rake lowering springs 286 are connected between an arm 288 on the cranks 283 and a spring post 289 that extends between the side rails 260 of the Y jackets. Stops 290 are provided for determining the lowered position of the rakes, as indicated in phantom in FIG. 27. Referring to the right of FIG. 23, as the Y jacket starts its travel on the upper reach of the Y conveyor, as seen in phantom at the right of the figure, the rollers 284 ride up the ramp section 285a of the track so that the rakes 28 are soon brought to their raised position, as shown in solid lines in the figure. The rakes 28 now pass through all of the matrix pans, as previously described, and when the Y jacket reaches the end of the upper reach of the Y conveyor, the rollers 284 ride down the exit ramps 285b with which the rake lowering springs 286 gradually lower the rakes 28 to the position shown in phantom in FIG. 27.

Y JACKET SHUTTER OPERATING MECHANISM

The shutters 30 of the Y jackets are all open as they traverse the upper reach of the Y conveyor and pass beneath the matrix pans. If a Y jacket does not receive a flat there is no need to close the shutter as it turns over and traverses the lower reach of the Y conveyor. On the contrary, if the Y jacket does receive a flat, the shutter closing mechanism 31 controlled by the directory, is provided to close the shutters 30 of those jackets that receive flats. The shutter closing mechanism 31 is mounted near the end of the upper reach of the Y conveyor, just before the Y conveyors are turned over. Such a mechanism appears to the left of FIG. 23, and duplicates 31a of this mechanism are provided for opening the shutters over each designated high or low density bin. The shutter opening mechanisms 31a are also remotely controlled, but on a different basis, in that there is one shutter opening mechanism for every bin, and the directory only operates that mechanism which is associated with the bin that is designated to receive a flat from the approaching Y jacket.

Referring to FIGS. 22, 23, 23B, 25, 34 and 35, a rotary solenoid 294, controlled by the directory, is provided for each of the shutter controlling mechanisms 31 and 31a. Since these mechanisms are substantially identical, only the shutter closing mechanism 31 will be described in detail. Attached to the rotary solenoid shaft is a flipper arm 296 for operating the mechanism. A cross shaft 297 mounted in bearing plates 298 (FIG. 22) is mounted on the frame, and at the end of the cross shaft adjacent the solenoid flipper arm 296 is an overcenter crank arm 299. The axis of the cross shaft 297, and that of the rotary solenoid 294 are in alignment. Projecting outwardly from the overcenter crank arm 299 on the cross shaft 297 is a pin 299a for engagement by the solenoid flipper arm 296. The overcenter crank arm 299 on the cross shaft is held in its extreme positions by an overcenter spring 300. An upper stop 304 is provided for the overcenter crank arm for limiting the upper position of the overcenter crank arm 299, as seen in FIG. 23B. The solenoid flipper arm 296 and a rubber pad 296a limits the lower position of overcenter crank arm 299 as is also seen in FIG. 23B. The elements that actually open the shutter are right and left lugs 308 that are vertically slidable in the housings 310 secured to plates 298. As seen in FIG. 25, notches 312 are formed at the lower end of lugs 308 to receive balls formed on the ends of crank pins 302, which crank pins extend from the cross shaft 297. Each of the vertically slidably shutter opening lugs 308 mounts a reset roller 314. A reset cam 316 (FIG. 23) projects downwardly from each of the side rails of the Y jackets when the latter are on their upper reach, for engaging the rollers 314 on the shutter closing lugs 308.

The shutter opening mechanisms 31a (FIG. 34) are like the shutter mechanisms 31 just described except that they are at the lower reach of the Y conveyor. As previously mentioned, there is one of these shutter mechanisms 31a at each bin, and the solenoids thereof are controlled by the directory on a different basis from that on which the shutter closing mechanisms are controlled. Cams 316a (FIG. 23) which are directly above cams 316 when the Y jackets are on the upper reach of the Y conveyor, are provided for resetting the shutter opening mechanisms 31a as the Y jackets, the shutters of which have been opened by such mechanisms pass over the mechanisms on the lower reach of the Y conveyor.

FIG. 23B shows a shutter closing mechanism 31 in its retracted position, with the solenoid flipper arm 296 and the overcenter crank arm 299 in their lowered positions, causing the crank arm 302 (not seen in FIG. 23B but appearing in FIG. 25) to lower the shutter opening lugs 308. When the directory supplies a shutter closing signal to the solenoid 294, the solenoid flipper arm 296 is momentarily turned counterclockwise (as viewed in FIG. 23B) which lifts the overcenter crank arm 299 and brings it against the stop 304. When the solenoid 294 returns to its de-energized position, as shown in FIG. 23B, the overcenter crank arm 299 will be in its upper position, as seen in FIG. 23, which also corresponds to the position of the parts in FIG. 25. When this action occurs, the crank pins 302 on cross shaft 297 (FIG. 25) will lift the shutter opening lugs 308 to their shutter engaging positions, shown in FIGS. 23 and 25. As a Y jacket containing a flat progresses towards lugs 308, the shutter closing clips 278, shown in dotted lines in FIG. 23, approach the lifted lugs 308 and engagement of these parts begins the closing motion of the shutter. As the Y jacket continues on past the mechanism 31 the shutter is closed, and just before the shutter is fully closed, the reset cams 316, seen at the right of FIG. 23 and mounted on the lower portions of the Y jacket, engage rollers 314 of the shutter opening lugs 308 and lower the lugs so that they clear the clips 278 just as the shutters are fully closed. The shutter opening mechanisms 31a (FIG. 34) operate in the same manner except that they are reset by cams 316a mounted on the opposite side of the Y jackets (the upper side in FIG. 23).

SUMMARY OF Y JACKET OPERATION

Operational views 28–33 summarize the operation on the Y jacket shutter mechanism. In FIG. 28, a Y jacket 12 bearing a flat F, and with the shutter 30 in its opened condition, has just reached the end of the upper reach of the Y1 conveyor associated with the jacket. The clips 278 on the ends of the shutter are shown in engagement with lugs 308 of the shutter closing mechanism 31, which lugs are in their raised or projected position in response to a signal from the directory as previously described. Continued motion of the Y jacket to the left as seen in FIG. 28 causes the shutter 30 to approach its fully closed position, until the cams 316 reach the shutter closing mechanism. When this occurs, the cams 316 engage the rollers 314 on the lugs 308 and cams the lugs 308 down. The shutter 30 will be now fully closed as seen in FIG. 29, so that the Y jacket can be turned upside down and the flat will not fall out of the jacket. FIG. 30 shows the shutter in its closed position with the Y jacket in the process of being turned around at the downstream end of the Y1 conveyor. FIG. 31 shows the jacket on the lower reach of the Y1 conveyor with a flat F resting on the shutter 30. In FIG. 32, the jacket has reached a designated high density bin at which one of the shutter opening mechanisms 31a is provided. The clips 278 on the other end of the shutter 30 have been carried into engagement with the previously projected lugs 308 of shutter opening mechanism 31a, and as seen in FIG. 32, the shutter is partially opened and the flat F is partially ready to drop into the high density bin HD. In FIG. 33, the shutter is fully opened and the flat F is in the clear and dropping into the high density bin HD. The cams 316a on the Y jacket 12 have reset the shutter opening lugs 308, in order that they will not open the shutter on the succeeding Y jacket unless or until the succeeding Y jacket bears a flat destined for the same high density bin.

LOW DENSITY BIN CONSTRUCTION

The construction of the low density bins is illustrated in FIGS. 34, 35 and 37. The basket or bin 32 for receiving flats is in the form of an L-shaped casting having slots 34 in the bottom thereof as previously mentioned. The flats are actually supported on ribbed supporting bars 322, as seen in FIG. 37, and the low density bin is supported by its rear end plate 324. As mentioned, the rear plate 324 is slotted at 36 to clear the rakes of the sweep unit. The low density bins have side plates 326 fastened to the L-shaped casting, and the end plate 324 of the low density bin is mounted on a U-shaped saddle 328 best seen in FIG. 37. In order that the saddle can be guided for vertical reciprocation, rollers 330 are mounted thereon and as seen in FIG. 36, the rollers 330 ride in a track 332 formed in vertically extending frame elements 333, also best seen in FIG. 36. The saddle 328 mounts side guide rollers 334 for engaging frame elements 333 and guiding the low density bins in a lateral direction. The bins are spring urged to their upper position, which is the position wherein they receive the flats from the Y jackets, by reels 33 previously mentioned. The wires 33a for the reels connect to pins 336 mounted on ears at the lower ends of saddles 328, and this construction is best seen at the left of FIG. 35. Projecting laterally inwardly from the lower ends of saddles 328 are bin lowering rollers 338. As seen in FIGS. 35 and 37, these rollers function in connection with the gate cams 46 and 46a (FIG. 37) as will be described in detail presently. As seen in FIG. 35, the side plates 326 of the low density bins are apertured at 326a to provide a path for the beam of light between a photocell lamp pcl and the photocell pc that senses the height of the stacks of flats in the low density bins.

SWEEP UNIT AND BIN LOWERING MECHANISM

The construction and operation of the sweep units and the bin lowering mechanisms appear in FIGS. 35 to 44A. As has been previously described, each sweep unit 14 carries a rake 40 mounting horizontally extending flat supporting bars 42. Bars 42 are in alignment with the slots 34 and 36 in the low density bins, and this alignment is best seen in FIG. 37. The sweep units 14 also include rake bars 44, which are in alignment with the flat supporting bars 42 just described. This alignment is best seen in FIGS. 36 and 37. The gate cam 46, which carries out the initial phase of the bin lowering action, has been previously mentioned. However, gate cam 46 forms only a part of the bin lowering and raising mechanism of the sweep unit. Referring to FIGS. 35, 35A and 36, just behind gate cam 46 is a fixed cam or track section 47 which forms one integral articulated unit, and downstream of track section 47 is another track section 48 which forms another articulated unit. Pivotally mounted on the trailing end of track section 48 is a pivoted track section 49 that controls the raising or release of the bin after a stack of flats have been swept out of the bin by the rakes 44 of the sweep unit.

As seen in FIG. 36, there are two gate cams, the gate cam 46 being that shown in side elevation in FIG. 35. On the other side of the sweep unit is a gate cam 46a the construction of which is modified somewhat from that of gate cam 46 as will be described presently. As is also seen in FIG. 36, there are two track sections 47, and these are connected by rigid cross bars 339 and by cross rods 340. The cross rods 340 mount plates 340a which are the plates that carry the flat supporting bars 42. The rake pan or basket 40 has side plates 341 that are bolted to the ends of plates 340a. The track sections 47 mount guide rollers 342 which rotate on pins 342a (FIGS. 35A and 40) that project from the cam track sections. Drive lugs 343 project from cross bars 339 for engagement by the gripper drive unit G1 shown in FIG. 2. The gate cams 46, 46a are pivoted to the track section 47 by means of pivots 344, as best seen in FIG. 35. The gate cams 46 and 46a are connected for simultaneously pivotal motion by a cross bar 345 (FIG. 36). The two cam track sections 48 downstream of sections 47 are connected by cross rods 346 (FIG. 36) which mount plates 346a. These plates support the rake fingers 44. At the trailing end of the articulated track section 48 is a cross bar 347 (FIG. 36) and a drive lug 348 depends from the cross bar 347. As seen in FIG. 35A, another set of guide rollers 349 are mounted at the trailing ends of the track sections 48.

The trailing cam track section 49 is pivotally mounted on the articulated track section 48 by means of pivots 350, seen in FIGS. 35 and 35A. The trailing cam track sections 49 are connected by a cross bar 352 (FIG. 36) and the sections 49 are urged to a lowered position by springs 354 (FIG. 35). Padded bumper arms 356, integral with cam track sections 49, limit the pivotal motion of these cam track sections. This pivotal mounting of cam track section 49 is provided in order to provide the necessary clearance during operation of the unit, as will be described presently. The guide rollers 342 on the articulated track section 47 and the guide rollers 349 on the articulated section 48 run in tracks 358, FIGS. 35 and 36. The trailing end of articulated section 48 is connected to a link 359 (FIG. 36) and a number of these links are pivotally connected to form dead spaces along the sweep conveyor. The last of the links 359 connects to the leading end of the articulated track section 47, as also seen in FIG. 36. If the length of the links 359 and the length of the articulated track sections 47 or 48 are referred to as "pitches," in the small two X-conveyor installation there will be 82 pitches in the sweep conveyor, there being four sweep units 14 in each lane of the sweep conveyors. At the ends of the sweep conveyor, the tracks 358 merge with curved castings 358a (FIG. 45) and these castings have a special curvature as previously described in the description of the X conveyor.

The sets of four sweep units for each lane of the sweep conveyor are staggered, and only a sweep unit for one lane is illustrated in FIG. 36. The sweep units are staggered because the low density bins in both lanes are lowered simultaneously for the sweeping operation. These bins are connected together, as previously explained, by means of saddles 328 but only one of the low density bins wil lbe cleared by the sweep conveyor. Individual sweeping of each lane is necessary because the two low density bins that are connected together by a saddle 328 probably will not be given the same assigned destination and therefore should not be cleared by the sweep unit simultaneously. The spacing of the sweeping units 14 in the two lanes between the unit of one lane and the nearest unit of another lane is such that the first sweep unit to reach a given pair of low density bins will lower the pair of bins, sweep the one bin in its lane, and permit the pair of bins to rise to their normal position underneath the Y conveyor, before the next approaching sweep unit of the other lane reaches the same pair of bins.

The position of the pivoted gate cams 46 and 46a determines whether or not they will be effective to lower a bin into the sweeping position. The bin lowering function of the gate cams is determined by signals from the height sensing photocell unit or the sweep programmer. Referring to the gate control mechanism that is mounted on and moves with the sweep units 14, each gate cam 46 is formed with a gate raising cam track 374, best seen in FIG. 35. The presence of this cam track 374 on gate cam 46 marks the difference between gate cam 46 and gate cam 46a on the other side of the sweep unit, the latter gate cam lacking the track 374. Pivotally mounted on the articulated track section 47 is a gate readying lever 380 (FIGS. 35 and 43a), which lever has a hub mounted on the pin 342a that also supports the sweep guide rollers 342 (FIG. 35A) for each gate cam assembly 46. The gate cam readying levers 380 are associated only with the cams 46. The gate readying lever 380 is actually in the form of a bellcrank, and at the lower end thereof (when the sweep unit on its upper reach) is a cocking roller 382, best seen in FIG. 35. The other arm of the bellcrank forming gate readying lever 380 is formed with a triangular aperture 384, which is provided for receiving a pin 386 projecting laterally outwardly from the gate cam 46. Referring to FIG. 43A, the aperture 384 in the gate readying lever 380 is shaped to provide a lock-out corner 388 which receives the pin 386 of the gate cam 46 in one position of the apparatus. This position appears in phantom at the right of FIG. 40 and also appears in FIG. 43. Returning to FIG. 43A, aperture 384 in the gate readying lever also provides a gate readying cam surface 390 that extends from the lock-out corner 388 to a gate cam ready or hunting detent 392. The pin 386 of the gate cam 46 is shown in the hunting detent in FIG. 40. Returning again to FIG. 43A, the other corner 394 of the triangular aperture 384 of the gate readying lever, is a pin receiving corner in which the pin 386 of the gate cam 46 rests while the sweep units is in the process of lowering a low density bin. FIG. 42 shows the pin 386 in the aforesaid corner.

The gate readying lever 380 is biased for clockwise rotation as viewed in FIGS. 35 and 43 for example by a spring 396.

As is also seen in FIG. 43, a bumper pad 398 is provided to limit the downward pivoting of the cam gate 46, and another buffer is provided for the cam gate 46a on the other side of the sweep unit. The control mechanisms for the determining operation of the sweep unit are mounted on the frame at the upstream end of each of the low density bins. These control mechanisms are in the form of a directory controlled gate lifting mechanism 400. One of the control mechanisms 400 is shown mounted on a vertical column 333 of the frame in FIG. 35, and FIGS. 36 and 42 best show how the mechanisms 400 are mounted on the columns 333 by means of brackets 402. Each of the brackets carries an externally controlled rotary solenoid 404, as seen in FIG. 36, and gate lifting mechanisms 400 are also mounted on the other side of the sweep unit, which is the side opposite that seen in side elevation in FIG. 35. These control mechanisms on the other side of the lane also carry directory controlled solenoids 404a, which operate in conjunction with another series of gate cams 46 associated with the sweep units in said other lane of the sweep conveyor. There are only four of such sweep units in each lane and because of the spacing, and since they are staggered, none of the sweep units for the other lane appear in FIG. 36. Thus, it is to be understood that the directory controlled gate cam operating mechanisms 400, shown on the lower portion of FIG. 36, control the sweeping of the low density bins in the lane of the sweep conveyor with which they are associated. The directory controlled units 400, shown at the upper portion of FIG. 36, are provided for controlling the sweeping of the low density bins in that lane. Except for the fact that the solenoids 404 and 404a are connected to the directory in association with different lanes, the mechanisms 400 are all alike and description of one will suffice for all.

Each rotary solenoid 404 operates a gate lifting arm 406 which carries a gate lifting roller 408 best seen in FIGS. 41 and 42. Since the rotary solenoids 404 are only momentarily actuated, the arm 406 mounts a permanent magnet 410 which can be brought into engagement with a companion magnet 412 mounted on the bracket 402. Thus, once the rotary solenoid 404 is energized for a period of time long enough to bring the arm 406 from its idle position, shown in phantom in FIG. 41 and at the right of FIG. 43, to its camming position, shown in full in FIG. 41 and in FIGS. 35 and 40 to 44, the permanent magnets 410 and 412 retain the arm 406 in its camming position after the solenoid 404 has been deenergized at the directory.

The gate readying lever 380 that moves with the sweep units has previously been described, and when the lever 380 has been turned clockwise, to the position shown in phantom at the right of FIG. 40, and in solid lines in FIGS. 43 and 43A, the lever 380 is in what may may be termed its lock-out position. As seen at the right of FIG. 40, at the upstream end of the upper reach of the sweep conveyor a cocking cam 416 is provided, which cam engages the roller 382 on the gate readying lever 380 and cocks the lever to its ready position, as illustrated in full lines in FIG. 40.

The operation of the entire sweep mechanism will now be reviewed but before this review is presented it is to be noted that a switch 420, FIG. 37, is provided for controlling the shutter opening mechanism 31a. When the low density bin is lowered, switch 420 is operated. A circuit, not shown and the details of which are not part of the present invention, locks out the shutter opening mechanism associated with the pair of low density bins that are in the process of being lowered. This prevents the shutter opening mechanisms from opening the shutter of the Y jackets and dropping flats into the low density bins while they are away from their normal or upper position.

OPERATION OF THE SWEEP MECHANISM

The operation of the sweep mechanism is illustrated diagrammatically in FIGS. 40 to 44A. As illustrated in phantom at the right of FIG. 40, a gate cam 46 is in its lower or lock-out position, as it approaches the start of the upper reach of the sweep conveyor. The roller 382 on the gate readying lever 380 has just entered a cam track 416, and the pin 386 of the gate cam is in the lock-out corner 388 (FIG. 43A) of the aperture 384 in the gate readying lever. As the sweep unit moves along the upper reach of the conveyor, the gate readying lever is turned counterclockwise (as viewed in FIG. 40) during which process the cam surface 390, that bounds one side of the aperture 384, lifts the gate cam 46 so that by the time that the roller on the gate readying lever 380 leaves the cocking cam 416 the lever 380 and the gate cam 46 will be in the position shown in full lines in FIG. 40. This is the hunting position of the gate cam. The pin 386 of the gate cam 46 will now rest in the hunting detent 392 of the aperture 384 in the gate readying lever.

With the gate cam in the hunting position, as illustrated in full lines in FIG. 40, the gate lifting cam track 374 of the cam 46 is in such a position that the roller 408 on the solenoid operated arm 406 is in the path of the approaching gate lifting cam track 374, provided that the solenoid 404 has been energized by the directory so as to lower the arm to the position shown in FIG. 40. This condition is shown in full lines in FIG. 41. As is also seen in FIG. 41, if the roller 408 has not been lowered by the solenoid 404 (as indicated in phantom in that figure) the roller 408 will be above the gate lifting cam track 374 on the gate cam 46 and hence will clear the track. As can be seen in FIG. 41, when the arm 406 and roller 408 are in their upper position, the roller 408 is not in the path of the bin lowering cam track 360 on the gate cam 46, because the cam track 360 does not project far enough to be engaged by the roller 408.

Referring to FIG. 42, the sweep unit has progressed far enough for the solenoid controlled roller 408 to have fully lifted the gate cam 46 by means of the gate lifting cam track 374, so that the gate cam is now in its upper, or bin lowering position. In this position, the bin lowering track 360 on cam 46 can engage the bin lowering roller 338 on the saddle 328 of the associated low density bin. Since the gate cam 46 cannot rotate any further about its pivot 344 when the cam is in its upper or bin lowering position, further advance of the sweep unit will cam the roller 338 of the associated low density bin down, as the roller 338 rides along the cam track 360. A position of the sweep unit is then reached wherein the bin lowering roller 338 leaves the track 360 on the gate cam 46 and enters the track 362, which latter track forms an extension of track 360. Track 362 is on the articulated cam section 47. This position of roller 338 is shown in phantom in FIG. 42.

Cam track section 362 on section 47 completes the lowering operation of the low density bin. In FIG. 43 the low density bin has reached its fully lowered position and the bin lowering roller 338 is about to ride along a straight track section 364 on the cam section 47, which holds the bin in its lowered position. The sweep rake 44 has almost reached the stack of flats F in the low density bin, ready to push the stack of flats out of the low density bin onto the sweep basket. Since the pivoted gate cam 46 is no longer in engagement with the bin lowering roller 338, the gate cam now falls by gravity to its lock-out position illustrated in FIG. 43. The spring 396 snaps the gate readying lever 380 clockwise as viewed in FIG. 43, and the pin 386 on the gate cam now rests in the lock-out corner 388 of the aperture 384 in the gate readying lever. In FIG. 43 the gate cam 46, which has been lowered to its lock-out position, is shown behind the next solenoid controlled gate lifting mechanism 400, that is, the mechanism that is associated with the low density bin to the left of the low density bin that has been lowered in FIG. 42. This mechanism 400, which is indicated in phantom in FIG. 43 for clarity, is also drawn with the roller 408 in its lower or bin lowering position, which would be the case in case the solenoid 404 had received a signal from the sweep gate programmer or from the height sensing unit calling for sweeping of the bin in question. However, it can be seen that if the left hand bin in FIG. 43 were to be lowered at this time it would be in interference with the stack of flats just being raked onto the sweep mechanism. Thus, as illustrated in FIG. 43, even if the roller 408 has been lowered to its bin lowering position, when the gate cam 46 is in its lock-out position the bin lowering roller 408 will be above the gate cam track 374. This is indicated in the broken horizontal lines in the figure.

Referring back to FIG. 42, where the bin lowering process has just started and with the bin lowering roller 338 entering the bin lowering track 360 on the gate cam 46, it can be seen that the remotely controlled cam raising roller 408 is about to leave the gate raising track 374 on the gate cam 46. As soon as the gate cam raising roller 408 is cleared by cam track 374, it is necessary to restore the bin lowering roller 408 to its upper position, ready for another bin lowering cycle. This is accomplished by a reset kicker lug 376 mounted on the gate cam 46. As seen in FIG. 42, the reset lug 376 is about to engage the gate raising roller 408 when the latter is in its lowered position. Once the kicker lug 376 does engage roller 408, as illustrated in phantom in FIG. 43, the solenoid controlled arm 406 is raised to its upper position, ready for a signal that initiates another bin lowering cycle. As seen in FIG. 44, after the bin lowering roller 338 leaves the straight track section 366 of the track section 48, the roller enters the pivoted track section 49. This permits the reels 33 and the associated wires 33a to raise the associated low density bin and return it to its upper or flat receiving position. As seen in FIG. 44A, when the bin lowering roller 338 rides clear of the track 358 on the pivoted track section 49, the pivoted track section 49 drops to its lower position so that it will clear successive saddles and bin lowering rollers 338.

The operation of the rakes of the sweep mechanism is illustrated diagrammatically in FIGS. 38 and 39. In FIG. 38 a low density bin has almost been lowered to its sweep position, and the rake 44 of the sweep unit 14 involved in the operation is approaching the stack of flats F. In FIG. 39 the bin has been fully lowered, the rake 44 has passed through the slots 36 in the end wall of the low density bin, and is passing through the slots 34 in the bottom of the low density bin. The rake has engaged the stack of flats F and has started to push the stack of flats out of the low density bin. As motion of the sweep conveyor S continues, the rake 44 will move the flats onto the support bars of the sweep basket 40. The mechanisms for handling the stacks of flats F, after they have been deposited in the sweep baskets 40 of the sweep units 14, will now be described in detail.

THE DELIVERY CONVEYOR

The delivery conveyor D and its relation to the other elements of the system are shown in detail in FIGS. 45 and 48A. The delivery conveyor D includes a pair of platforms 422, one for each lane of the associated sweep conveyor S. Outboard side plates 424 are bolted to a platform 422, as are inboard side plates 426. The outboard side plates 424 are mounted on frame elements 428 and the inboard side plates 426 are mounted on element 430, as seen in FIG. 48. The input ends of platforms 422 are slotted at 432 to receive the thin bars 42 of the sweep baskets 40 that support the flats as they are being deposited on the delivery conveyor. The delivery ends of the platforms 422 are slotted at 434 to receive flat pickup fingers 436 forming part of the baskets 50 of the vertical stacker. This arrangement is illustrated diagrammatically in FIG. 47.

In order to transfer a stack of flats deposited on the delivery conveyor by the sweep basket to a position to be picked up by the basket 50 of the vertical stacker VS, a series of V belts is provided. As seen in FIGS. 46 and 48A, pulley mounting brackets 440 are associated with each of the fingers of the platforms 422 formed by the slots 432, 434 previously described. The V belts, indicated at 452 are trained about pulleys 442, 444 at the receiving and delivery ends of the delivery conveyor. A drive shaft 446 (FIG. 46) is provided which mounts driving pulleys 448. Idlers 450 are also provided for each of the V belts. The V belts 452 pass around conveyor pulleys 442 and 444, drive pulleys 448 and idler pulleys 450, as best seen in FIG. 46.

In order to drive the delivery conveyor D a motor 456 (FIG. 45) is provided, which drives a gear reducer unit having a drive shaft 458. A driving V belt 460 is trained around a drive pulley 462 (FIG. 48) on drive shaft 446 and on another pulley (hidden in FIG. 45) on the gear reducer shaft 458. As seen in FIGS. 46 and 48, each platform 422 is apertured at 464 to pass the beam of a lamp and photocell unit 466, 468 that form part of the control of the delivery conveyor, vertical stacker and the take-away conveyor, as will be described presently. Lamp and photocell units 481, 483 also form part of this control.

THE VERTICAL STACKER

The more important structural details of the vertical stacker VS appear in FIGS. 45 to 48. The frame of the vertical stacker contains a central box-like pillar member 472 which has cross webs 473 that are bolted to frame elements 474 (FIG. 48). The baskets 50 of the vertical stacker are supported on chains. Single wear plates 476 are mounted on the sides of pillar 472, and double wear plates 478 extend vertically along the midplane of the pillar 472. Associated with the double wear plates 478 are T-shaped chain retainer plates 480. Mounted at the lower end of pillar 472 are drive sprockets 482, and idler sprockets 484 are adjustably mounted at the upper end of pillar 472. Pairs of basket carrier chains 486 are trained around the sprockets and ride along the wear plates previously described.

The vertical stacker baskets 50 have end walls 488 from which project ears 490, 490a that are mounted on the chains 486. These ears are attached to the chains 486 by bolts 492. As seen in FIG. 46A, ears 490a are slotted at the bolt connections to provide accommodation for the difference in length between the spacing of bolts 492 when the chains are on a straight run and the chordal distance between those bolts as the chains pass around the sprockets 482 and 484.

In order to drive the vertical stacker, a drive motor 498 is provided (FIG. 45) which drives a gear reducer drive shaft 500. The drive sprocket 482 for the chains of the vertical stacker are driven from the gear reduction drive shaft 500 by a chain and sprocket drive 504 (FIG. 45), which is illustrated diagrammatically in that view.

The take-away conveyor TA is a substantial duplicate of the delivery conveyor D, and is mounted on the outside of the vertical stacker VS. The take-away conveyor TA is not illustrated in detail, but the major elements thereof appear in FIG. 45. These are given the same reference characters as those applied to the delivery conveyor D, with the letter "a" appended to the characters. The drive shaft 446a of the take-away conveyor TA and the drive pulley 448a are driven by a V belt drive 518 from the same gear reducer shaft 458 that drives the delivery conveyor D.

TIMING OF THE VERTICAL STACKER

The vertical stacker VS serves as a temporary storage conveyor and permits one operator to service several of the devices. It accepts stacks or bundles of mail which enter at infrequent intervals, and by indexing one pitch per stack provides temporary storage for a number of bundles of mail. The delivery conveyor D and take-away conveyor TA run continuously, but the vertical stacker conveyor VS is indexed and its motion is controlled by automatic interlocks that prevent jamming and interference. These operations are illustrated diagrammatically in FIGS. 49 to 52 but the details of the specific electric circuits that provide the interlocks with the motor and clutch drive unit 498, 500 are not illustrated because they do not form part of the present invention, and such details are routine matters of electrical wiring.

Referring to FIG. 49, a stack of flats F is in the process of being transferred from the sweep conveyor to the vertical stacker by the delivery conveyor D. The stack of flats has broken the beam of a lamp and photocell unit 481, 483. This sets a time delay (not shown) which insures that if the vertical stacker is moving, it will stop with a basket in a load receiving position. The flats then close a limit switch 479 during its process of transfer. This overrides any external control to the vertical stacker, and prevents jamming. As seen in FIG. 50, as the stack of flats reaches the vertical stacker it interrupts the beam of another lamp and photocell unit 466, 468. A time delay circuit, not illustrated, is associated with this unit and has a time constant long enough to permit the stack of flats to be fully deposited in the waiting basket 50 of the vertical stacker by the delivery conveyor D. After elapse of the predetermined time, which is sufficient to permit the stack of flats to fully enter the waiting basket 50 of the vertical stacker, the time delay circuit automatically indexes the vertical stacker one pitch. The very start of this indexing motion is illustrated in FIG. 51. After the vertical stacker travels one full basket pitch, it closes a limit switch 470, which is operated by a lug 471 on each basket. This stops indexing of the conveyor in the position shown in FIG. 52, with which a bundle of flats is automatically removed by the constantly running take-away conveyor TA. If the operator desires to remove bundles of flats from the vertical stacker in succession, he pushes a switch button (not shown) which causes the vertical stacker to begin an indexing operation. The operator controlled circuit and the photocell and limit switch circuits at the sweep and delivery conveyor are interlocked so that the operator cannot cause an indexing of the vertical stacker when the latter has stopped to a position wherein a basket 50 is awaiting delivery of a bundle of flats that is approaching from the delivery conveyor D.

SUMMARY OF MATRIX TRANSFER OPERATION

The construction and operation of the various elements of the system have been described in detail but no step-by-step detailed description of the matrix transfer operation has been presented. The diagrams of FIGS. 13 to 21 illustrate this operation in steps of one quarter pitch (jacket length) motion of the X conveyor. In the operation as illustrated, the Y conveyor runs at double speed, so that for each quarter pitch motion of the X conveyor, the Y conveyor moves one-half a pitch. In FIG. 13 an X jacket 10a partially overlies a matrix pan M, and contains a flat F. The X jacket rakes are omitted from the diagrams of FIGS. 13 to 21 for clarity. As is also seen in FIG. 13, a Y jacket 12a is adjacent to matrix pan M, and a downstream Y jacket 12b, which is actually the Y jacket that will receive the flat, is spaced a considerable distance from the matrix pan M. In FIG. 14, the X conveyor has advanced one quarter of a pitch and the Y jacket 12a has started to pass under the matrix pan M. In FIG. 15, the X conveyor has advanced another quarter pitch so that the flat F on the X jacket 10a is fully overlying the matrix pan, but it has not yet been brought against the matrix pan rake 26. The Y jacket 12a is now almost directly under the matrix pan and the Y jacket 12b which is the jacket that is destined to receive the flat is approaching the matrix pan. The directory will have lifted the rake 26 of the matrix pan M to cause the transfer of the flat from the X jacket to the matrix pan.

In FIG. 16, the flat F has engaged the rake 26 of the matrix pan and the X jacket 10a is moving through the rake 26 of the matrix pan, the rake restraining the flat F from further motion. The first Y jacket 12a is starting to emerge from under the matrix pan, and the Y jacket 12b will be the next Y jacket to pass under the matrix pan.

In FIG. 17, the X conveyor has moved another quarter pitch and one-half of the flat F is supported on the X jacket 10a and the other half is clear for falling on the matrix pan M. The Y jacket 12b is now closer to the matrix pan.

In FIG. 18, the X jacket 10a has moved almost entirely clear of the flat F, which flat will have almost completely dropped onto the matrix pan M. The Y jacket 12b is now partially under the matrix pan, but its rake 28 has not yet reached the pan.

In FIG. 19, the flat F has been fully deposited on the matrix pan M and the rake 28 of Y jacket 12b is close to the pan. In FIG. 20, the rake 28 on the Y jacket 12b has reached the flat F on the matrix pan. The next succeeding X jacket 10b is now starting to cross over the matrix pan but even if this jacket has a flat thereon, as illustrated in phantom, such flat has not yet reached the rake 26 of the matrix pan under consideration.

In FIG. 21, the X conveyor has moved another quarter pitch from the position shown in FIG. 20, and the Y conveyor has moved another half pitch. The rake 28 of the Y jacket 12b is in the process of sliding the flat F from the matrix pan so that it can fall into the Y jacket 12b, the shutter (not shown) being open. Thus it can be seen that this transfer from the X conveyor to the Y conveyor via a remotely controlled but stationary matrix pan is accomplished smoothly with the flats remaining substantially in their horizontal position, without danger of damaging or tearing the flats, and without danger of the flats catching or hanging up on any parts of the apparatus.

To give examples of typical operational speeds, but by way of example only, it has been found in practice that the X conveyors operate satisfactorily when moving at a linear speed of 27" per second and the Y conveyors when moving at a radial speed of 60" per second. This assumes a pitch (jacket) length of 16.5 inches for each X jacket pan and of 18 inches for each Y jacket.

Referring to FIGS. 13 to 21 again, it can be seen that if it is assumed that the X conveyor illustrated in these figures, is the first conveyor in the line, then by operating the Y conveyor at double speed and with a set of full pitch links 15 between each Y jacket, an empty Y jacket will be available for the second X conveyor in the line. This condition reduces the potential number of interferences that would result if it were attempted to assign flats from the X conveyors to the same Y jacket.

RECIRCULATION UNIT

A recirculation unit 519 is illustrated in FIGS. 53 and 54. One of these units is mounted near the end of each X conveyor, except the first X conveyor, and its function is to remove any flat that has not been dropped into a matrix pan due to the previously mentioned possible interference that might result when two X conveyors carry flats destined for the same Y jacket. No recirculation unit is necessary on the first X conveyor. The unit 519 includes a plurality of rakes 520 that are disposed near the end of the upper reach of the X conveyor, the rakes being mounted in fixed upright position on frame elements 522. A chute 524 receives the flats as they are raked out of the X conveyor jackets by rakes 520, with which the flats slide into a recirculation bin 526 for reprocessing or for any other disposition that may be desired.

MODIFIED FORM OF THE INVENTION

FIGS. 55 to 63 show in somewhat diagrammatic form a modified form of the invention. In this form, both reaches of the secondary, distributing, or Y conveyor are in the horizontal plane. This construction reduces the overall height of the apparatus. The horizontal disposition of both reaches of the modified conveyor Y2 relative to the other elements appears clearly in FIG. 55. In the modified form of the invention, the jackets of the X conveyors and the matrix pans are formed like the corresponding elements in the form just described in detail. Similarly, the low density bins LD and the high density bins (not shown), and the sweep conveyors S associated with the low density bins are like those previously described. As will be seen, the principal changes in the modified form of the invention reside in the horizontal disposition of both reaches of the distribution conveyor Y2, as previously mentioned. In addition, the Y jackets 12c and 12d are now rake-out jackets instead of being closed shutter jackets and, therefore, operate similarly to the X jackets 10. Thus, instead of employing shutter opening mechanisms at each bin to cause the flats to fall out of the Y jackets into the bins, a series of rake units 530 are provided at each of the bins. Rake units 530 operate mechanically in a manner like the mechanism that operates rakes 26 of the matrix pans, previously described, but are controlled by the directory as are the shutter opening mechanisms 31a of the other form of the invention. In the modified form of the invention, the lower or return reach of each X conveyor will run adjacent to the floor, and will pass under the lower reach of each sweep conveyor S.

The Y jackets 12c and 12d of the conveyor Y2 are basically constructed as are the X jackets 10 of the X conveyor. However, the rake mechanisms 28c and 28d of the Y jackets of the modified form of the invention are constructed very similarly to the rakes 28 of the previously described Y jackets. The Y jackets 12c and 12d, which alternate, are connected by center links 532 that mount staggered guide rollers 534, and drive lugs 535 (FIG. 59) for the gripper drive G4. The gripper mechanism is like those previously described and the details thereof do not form part of the present invention. It is driven by a drive shaft 535a which is synchronized with the other gripper drives by suitable drive mechanisms so that the Y conveyor Y2 travels, for example, at twice the pitch speed of the X conveyor. The staggered rollers 534 on the center links 532 ride in a central track 536 for laterally guiding the Y jackets of the modified form. The Y jackets also mount outboard side guide rollers 538 that ride in tracks 540 for vertically supporting the Y jackets. The bottom pans of the Y jackets 12c and 12d are slotted at 542 to receive the rakes of the jacket emtying mechanisms 530 associated with the various bins and remotely controlled by the directory.

As indicated in the diagram of FIG. 64, the rakes 28c of the Y jackets 12c have outboard rake raising arms 544. Only the rakes of the jackets are illustrated in this simplified diagram, for clarity. The rakes 28c are lowered by coil springs 546 (FIG. 57) in a manner similar to that described for the lowering of the rakes 28 of the Y jackets previously described. The rake raising arms 544 of the rakes 28c are formed to ride on tracks 548 (FIGS. 57 and 64) which may be termed the outboard rake raising tracks. These outboard tracks have entry cam sections 550 (FIG. 64) for raising the rakes, straight cam sections 551 for holding the rakes in their raised position, and exit cam sections 552 for permitting the rakes to lower at the end of the travel on the associated reach of the Y conveyor. The rakes are lowered to clear those of the jacket emptying mechanisms 530 when the latter receive a rake-out signal.

As also seen in FIG. 64, the Y jacket rakes 28c that are raised on one reach of the conveyor Y2, are lowered on the other reach and the reverse is true for rakes 28d. This is accomplished by a lateral reversal of the position of the rake raising arms, and by correspondingly positioning their associated tracks. Thus, rakes 28d for jackets 12d have inboard rake raising arms 554 and are lowered by rake lowering springs 556. The inboard rake raising arms 554 ride on an inboard rake raising track 558 disposed along the other reach of the conveyor Y2. Inboard tracks 558 have an entry rake lifting cam section 560 and an exit rake lowering cam section 562. The inboard rake operating tracks and cam sections are also illustrated in FIGS. 60 to 62, the operation of which is self-explanatory. Each of the Y jackets 12c, 12d are provided with reset cams 570 for resetting the rake mechanisms 530 associated with the various bins.

As seen in FIG. 63, the rake mechanisms 530 include a rake 572 which is constructed like the rake 26 associated with the matrix pans M previously described in detail in connection wth FIGS. 11 and 12 illustrating the other form of the invention. Rake resetting mechanism, including levers 574 (FIG. 63), are provided, which levers correspond to the reset levers 242, also previously described in connection with FIGS. 11 and 12. The latch and cam structure shown in those figures are also associated with the mechanisms 530 at the bins of the modified form, and hence their construction and operation need not be described in detail. As previously mentioned, these rake mechanisms 530 function mechanically in the same manner as do the directory controlled rake mechanisms 26 for the matrix pans of the previously described form of the invention. However, the rake mechanisms 530 for the various bins are remotely controlled from the directory in accordance with principles previously outlined for control of the shutter opening mechanisms 31a. As a result, in the modified form of the invention the flats are raked out of the Y jackets, instead of being dropped therefrom upon opening of a shutter when the Y jackets are in their inverted position over a designated bin.

OPERATION OF THE MODIFIED FORM OF THE INVENTION

The principles of operation of the modified form of the invention just described briefly are generally the same as those of the first described form. However, due to the rearrangement of the conveyor Y2 so that both reaches thereof are in the same horizontal plane, it is preferable to control the apparatus so that flats are raked into the Y jackets 12d from the matrix pans by rakes 28d on the near side of the apparatus, as viewed in the drawings, and are raked from the Y jackets 12d into bins on the opposite or far reach of the conveyor. When the rakes 28d are lowered on the opposite or remote reach of the Y2 conveyor, a selected rake 572 on one of the designated bin mechanisms 530 is free to be lifted and to rake through a Y jacket on that reach which has its rake lowered. The system is also controlled so that the rakes 28c of Y jackets 12c are all raised by their associated cam track 548 when the Y jackets are on the remote reach of the Y conveyor. This is the condition in which the rakes 28c of these jackets 12c comb the flats from the matrix pans above and on the remote of conveyor Y2 in the manner previously described. The rakes 28c of Y jackets 12c are, therefore, lowered on the near reach of the Y conveyor, so that the rake mechanisms 530 of the bins associated with this reach can clear the flats from the Y jackets 12c and drop them into their associated bins. This alternate raising of the rakes of the various Y jackets on each of the two reaches of the conveyor Y2 assists in reducing the possibilities of interference that might be caused by the assignment of flats from the downstream X conveyors to any individual Y jacket that might have received a flat from an upstream X conveyor.

Since the directions of travel of the two horizontal reaches of the conveyor Y2 of the modified form of the invention are opposite, the location of the delivery conveyors D and any associated storage conveyors or vertical stackers for each reach will be at opposite ends of the machine. This is illustrated diagrammatically in FIG. 55 wherein the location of a delivery conveyor D for the sweep conveyor S that serves the remote reach of the conveyor Y2 is shown on the near end of the apparatus. A similar conveyor will be provided for the other sweep conveyor S at the far end of the apparatus.

As indicated by the broken lines in FIG. 55, the X conveyors are not shown complete and the apparatus will also be extended to accommodate one or more conveyors Y2 for the low density bins LD as well as other conveyors Y2 (not illustrated) for high density bins, as in the previously described form of the invention.

Mention has been made of the fact that the memory device and the directory, which receive input and destination signals from the operator at each X conveyor, and which keep track of X and Y conveyor movements, can be designed to determine the number of X conveyor pitches to bring a flat to the matrix pan in the proper Y conveyor lane. The directory can also determine the number of Y conveyor pitches from the matrix pan in question to the destination bin represented by the initial coded signal input. The memory device for this function, could be a conventional analogue type device such as a pulse synchronized and signal receiving drum or tape, the details of which are not part of the apparatus of the present invention because the apparatus of the present invention can be signal controlled either from a directory or directly from operator selected signals.

It has also been mentioned that there is a mathematical possibility (except at the first X conveyor in the row of X conveyors) that flats for different destination bins in one lane of a Y conveyor could be transferred to the same Y jacket. In this regard, it has been stated that since the directory "knows" what flats are being sorted, and keeps track of them, the directory can override or lock out rake-out signals to any matrix pan, in cases wherein such signals would result in the transfer of two flats to one Y jacket. In addition to relying upon the directory to prevent occurrence of this event, which has been termed "interference," or alternatively to such a control system, the matrix pans downstream from the first X conveyor can easily be rendered self monitoring.

For example, and referring to FIG. 14, a photocell and lamp unit 580 could be provided for the upstream Y conveyors at a position wherein the presence of a flat F1 in the approaching Y jacket 12b, interrupts the rake lifting signal to the matrix pan and thereby causes the flat F to be carried past the Y conveyor and on to the recirculation bin. In this case, it is apparent that the bottoms of the Y jacket pans would be apertured to pass the photocell control beam when no flat F1 is in Y jacket 12b. When there is no flat in Y jacket 12b, there can be no interference, and the rake lifting signal to the nearest matrix pan M would not be locked out because the beam of photocell unit 580 is not broken. Transfer of the flat F into Y jacket 12b would then take place, as shown in the diagrams forming FIGS. 16-21.

Although the detailed description of the invention has referred to sorting apparatus and method of operating the same which are particularly useful for handling flat mail, it is contemplated that in its broader concepts the invention is not limited to the sorting of any particular type article. It is apparent that the parts could be dimensioned to sort articles that have dimensions other than those characteristic of flat mail.

The invention having thus been described what is believed to be new and is desired to be protected by Letters Patent is:

1. Apparatus for sorting articles comprising a plurality of parallel endless input conveyors, said input conveyors each having a series of article receiving pans, means connecting said pans in spaced relation along the input conveyor for accommodating downward passage of articles between adjacent pans; an endless distributing conveyor having a reach that crosses and extends beneath reaches of said input conveyors, said distributor conveyor having a series of jackets for receiving the articles, stationary matrix pans disposed between the intersections of said input and distributor conveyor reaches, means for raking articles from the input conveyor pans into the stationary matrix pans, means for raking articles from the stationary matrix pans into said jackets; a plurality of article destination bins disposed along each distributor conveyor; selectively operable jacket discharge means for emptying said jackets into selected destination bins; signal controlled means for selectively operating said matrix pan rake means and said jacket discharge means, and means for driving said conveyors continuously.

2. Apparatus for sorting articles comprising a plurality of parallel endless input conveyors, said input conveyors each having a series of article receiving pans, means connecting said pans in spaced relation along the input conveyor for accommodating downward passage of articles between adjacent pans; an endless distributing conveyor having a reach that crosses and extends beneath reaches of said input conveyors, said distributor conveyor having a series of jackets for receiving the articles, stationary matrix pans disposed between the intersections of said input and distributor conveyor reaches, means for raking articles from the input conveyor pans into the stationary matrix pans, means for raking articles from the stationary matrix pans into said jackets; a plurality of article destination bins disposed along each distributor conveyor, selectively operable jacket discharge means for emptying said jackets into selected destination bins; signal controlled means for selectively operating said matrix pan rake means and said jacket discharge means, a sweep conveyor having a reach passing under said bins, article carriers on said sweep conveyor including means for raking stacks of articles from said bins, and signal controlled means for causing selected bins to be raked by said sweep conveyor rake means.

3. Apparatus for sorting articles comprising a plurality of parallel endless input conveyors, said input conveyors each having a series of article receiving pans, means connecting said pans in spaced relation along the input conveyor for accommodating downward passage of articles between adjacent pans; an endless distributing conveyor having first and second co-planar reaches that cross and extend beneath reaches of said input conveyors, said distributor conveyor having a series of jackets for receiving the articles; stationary matrix pans disposed between the intersections of said input and distributor conveyor reaches, means for raking articles from the input conveyor pans into the stationary matrix pans, means for raking articles from the stationary matrix pans into alternate jackets on each of said co-planar reaches of said distributor conveyor; a plurality of article destination bins disposed along each distributor conveyor reach, selectively operable jacket discharge means for emptying alternate jackets in each co-planar reach into selected destination bins; and signal controlled means for selectively operating said matrix pan rake means and said jacket discharge means.

4. Apparatus for sorting articles comprising a plurality of parallel endless input conveyors, said input conveyors each having a series of article receiving pans, means connecting said pans in spaced relation along the input conveyor for accommodating downward passage of articles between adjacent pans; an endless distributing conveyor having first and second co-planar reaches that cross and extend beneath reaches of said input conveyors, said distributor conveyor having a series of jackets for receiving the articles; the bottoms of said jackets being slotted in their direction of motion, stationary matrix pans disposed between the intersections of said input and distributor conveyor reaches, means for raking articles from the input conveyor pans into the stationary matrix pans, means for raking articles from the stationary matrix pans into alternate jackets on each of said co-planar reaches of said distributor conveyor; a plurality of article destination bins disposed along each distributor conveyor reach, selectively operable rakes at said bins raking the flats from alternate jackets in each co-planar reach into selected destination bins; and signal controlled means for selectively operating said matrix pan rake means and said jacket discharge means.

5. Apparatus for sorting articles comprising a plurality of parallel endless input conveyors, said input conveyors each having a series of pans, said pans having bottoms that are slotted in their direction of motion, means connecting said pans in spaced relation along the input conveyor for accommodating downward passage of articles between adjacent pans; an endless distributing conveyor having a reach that crosses and extends beneath reaches of said input conveyors, said distributor conveyor having a series of jackets for receiving the articles, the jackets of said distributing conveyor having rake means mounted along their trailing edges; matrix pans disposed between the intersections of said input and distributor conveyor reaches, the bottoms of said matrix pans having slots that extend in the direction of motion of the distributor conveyor, said matrix pans having projectable and retractable rake means mounted along their downstream sides when considered relative to motion of said input conveyors, said matrix pan rake means, when projected, extending into the slots in said input conveyor pans as the later cross the matrix pans to rake articles from the input conveyor pans into the matrix pans; the rakes of said distributor conveyor jackets passing through the slots in the bottoms of said matrix pans to rake articles from the matrix pans into said jackets, a plurality of article destination bins disposed along each distributor conveyor, selectively operable jacket discharge means for emptying said jackets into selected destination bins, and signal controlled means for selectively operating said matrix pan rake means and said jacket discharge means.

6. Apparatus for sorting articles comprising a plurality of parallel endless input conveyors, input feed baskets for each input conveyor, said input feed baskets having slotted bottoms, said input conveyors each having a series of pans, rakes on the trailing edges of said pans for clearing articles from the associated input feed basket, said pans having bottoms that are slotted in their direction of motion, means connecting said pans in spaced relation along the input conveyor for accommodating downward passage of articles between adjacent pans; an endless distributing conveyor having a reach that crosses and extends beneath reaches of said input conveyors, said distributor conveyor having a series of jackets for receiving the articles, the jackets of said distributing conveyor having rake means mounted along their trailing edges; matrix pans disposed between the intersections of said input and distributor conveyor reaches, the bottoms of said matrix pans having slots that extend in the direction of motion of the distributor conveyor, said matrix pans having projectable and retractable rake means mounted along their downstream sides when considered relative to motion of said input conveyors, said matrix pan rake means, when projected, extending into the slots in said input conveyor pans as the latter crosses the matrix pans to rake articles from the input conveyor pans into the matrix pans; the rakes of said distributor conveyor jackets passing through the slots in the bottoms of said matrix pans to rake articles from the matrix pans into said jackets, a plurality of article destination bins disposed along each distributor conveyor, selectively operable jacket discharge means for emptying said jackets into selected destination bins, and signal controlled means for selectively operating said matrix pan rake means and said jacket discharge means.

7. Apparatus for sorting articles comprising a plurality of parallel endless input conveyors, said input conveyors each having a series of pans having bottoms that are slotted in their direction of motion, means connecting said pans in spaced relation along the input conveyor for accommodating passage of articles from the pans down between adjacent pans; an endless distributing conveyor having upper and lower reaches, said upper reach crossing and extending beneath a reach of said input conveyors, said distributor conveyor having a series of open topped jackets for receiving the articles, said jackets having shutters for closing their tops, said jackets having rake means mounted along their trailing edges; matrix pans disposed between the intersections of said input and distributor conveyor reaches, the bottoms of said matrix pans having slots that extend in the direction of motion of the distributor conveyors, said matrix pans having projectable and retractable rake means mounted along their downstream sides, when considered relative to motion of said input conveyors, said rake means when projected extending into the slots in said input conveyor pans as the latter cross the matrix pans to rake articles from the input conveyor pans into the matrix pans; the rakes of said distributor conveyor jackets passing through the slots in the bottom of said matrix pans to rake articles from the matrix pans into said jackets, means for closing said jacket shutters while the jackets are in the upper reach of said distributor conveyor, a plurality of article destination bins disposed beneath the lower reaches of said distributor conveyor, selectively operable means for opening the shutters of said jackets when the latter are over selected bins, and signal controlled means for selectively operating said matrix pan rake means and said jacket shutter opening means.

8. Apparatus for sorting articles comprising a plurality of parallel endless input conveyors, said input conveyors each having a series of pans, said pans having bottoms that are slotted in their direction of motion, means connecting said pans in spaced relation along the input conveyor for accommodating downward passage of articles between adjacent pans; an endless distributing conveyor having a reach that crosses and extends beneath reaches of said input conveyors, said distributor conveyor having a series of jackets for receiving the articles, the jackets of said distributing conveyor having rake means mounted along their trailing edges; matrix pans disposed between the intersections of said input and distributor conveyor reaches, the bottoms of said matrix pans having slots that extend in the direction of motion of the distributor conveyor, said matrix pans having projectable and retractable rake means mounted along their downstream sides when considered relative to motion of said input conveyors, said matrix pan rake means, when projected, extending into the slots in said input conveyor pans at the latter cross the matrix pans to rake articles from the input conveyor pans into the matrix pans; the rakes of said distributor conveyor jackets passing through the slots in the bottoms of said matrix pans to rake articles from the matrix pans into said jackets, a plurality of article destination bins disposed along each distributor conveyor, selectively operable jacket discharge means for emptying said jackets into selected destination bins, signal controlled means for selectively operating said matrix pan rake means and said jacket discharge means, a sweep conveyor having a reach that runs beneath said destination bins, said sweep conveyor including receptacle means for clearing articles from said destination bins, and signal controlled means for causing said receptacle means to clear the bins.

9. Apparatus for sorting flat flexible articles comprising a plurality of parallel endless input conveyors, said input conveyors each having a series of pans having bottoms that are slotted in their direction of motion, means connecting said pans in spaced relation along the input conveyor for accommodating passage of articles from the pans down between adjacent pans; an endless distributing conveyor having upper and lower reaches, said upper reach crossing and extending beneath a reach of said input conveyors, said distributor conveyor having a series of open topped jackets for receiving the articles, said jackets having shutters for closing their tops, said jackets having rake means mounted along their trailing edges; matrix pans disposed between the intersections of said input and distributor conveyor reaches, the bottoms of said matrix pans having slots that extend in the direction of motion of the distributor conveyors, said matrix pans having projectable and retractable rake means mounted along their downstream sides, when considered relative to motion of said input conveyors, said rake means when projected extending into the slots in said input conveyor pans as the latter cross the matrix pans to rake articles from the input conveyor pans into the matrix pans; the rakes of said distributor conveyor jackets passing through the slots in the bottoms of said matrix pans to rake articles from the matrix pans into said jackets, means for closing said jacket shutters while the jackets are in the upper reach of said distributor conveyor, a plurality of article destination bins disposed beneath the lower reaches of said distributor conveyor, signal controlled means for selectively operating said matrix pan rake means and said jacket shutter closing means, and selectively operable means for opening the shutters of said jackets when the latter are over selected bins.

10. Apparatus for sorting articles comprising a plurality of parallel endless input conveyors, said input conveyors each having a series of pans, said pans having bottoms that are slotted in their direction of motion, means connecting said pans in spaced relation along the input conveyor for accommodating downward passage of articles between adjacent pans; an endless distributing conveyor having a reach that crosses and extends beneath reaches of said input conveyors, said distributor conveyor having a series of jackets for receiving the articles, the jackets of said distributing conveyor having rake means mounted along their trailing edges; matrix pans disposed between the intersections of said input and distributor conveyor reaches, the bottoms of said matrix pans having slots that extend in the direction of motion of the distributor conveyor, said matrix pans having projectable and retractable rake means mounted along their downstream sides when considered relative to motion of said input conveyors, said matrix pan rake means, when projected, extending into the slots in said input conveyor pans as the latter cross the matrix pans to rake articles from the input conveyor pans into the matrix pans; the rakes of said distributor conveyor jackets passing through the slots in the bottoms of said matrix pans to rake articles from the matrix pans into said jackets, a plurality of article destination bins disposed along each distributor conveyor, selectively operable jacket discharge means for emptying said jackets into selected destination bins, signal controlled means for selectively operating said matrix pan rake means and said jacket discharge means, a sweep conveyor having a reach that runs beneath said destination bins, means mounting said bins for vertical motion into the path of said sweep conveyor reach, said bins being slotted in the direction of motion of said sweep conveyor reach, said sweep conveyor including receptacles and associated rakes for raking articles from said destination bins into the receptacles, bin camming means associated with the receptacles of said sweep conveyor for lowering bins before the sweep conveyor rakes engage articles in the bins, and signal controlled means for conditioning said bin camming means for a bin lowering operation.

11. Apparatus for sorting articles comprising a plurality of parallel endless input conveyors, said input conveyors each having a series of pans, said pans having bottoms that are slotted in their direction of motion, means connecting said pans in spaced relation along the input conveyor for accommodating downward passage of articles between adjacent pans; an endless distributing conveyor having a reach that crosses and extends beneath reaches of said input conveyors, said distributor conveyor having a series of jackets for receiving the articles, the jackets of said distributing conveyor having rake means mounted along their trailing edges; matrix pans disposed between the intersections of said input and distributor conveyor reaches, the bottoms of said matrix pans having slots that extend in the direction of motion of the distributor conveyor, said matrix pans having projectable and retractable rake means mounted along their downstream sides when considered relative to motion of said input conveyors, said matrix pan rake means, when projected, extending into the slots in said input conveyor pans as the latter cross the matrix pans to rake articles from the input conveyor pans into the matrix pans; means at said input conveyor pans for retracting said matrix conveyor rake means, the rakes of said distributor conveyor jackets passing through the slots in the bottoms of said matrix pans to rake articles from the matrix pans into said jackets, a plurality of article destination bins disposed along each distributor conveyor, selectively operable jacket discharge means for emptying said jackets into selected destination bins, means at said jackets for resetting said jacket discharge means, signal controlled means for selectively operating said matrix pan rake means and said jacket discharge means, sweep conveyors having reaches that run beneath said destination bins, said sweep conveyors including receptacle means for clearing articles from said destination bins, and signal controlled means for causing said receptacle means to clear the bins.

12. Apparatus for sorting articles comprising a plurality of parallel endless input conveyors, said input conveyors each having a series of pans, said pans having bottoms that are slotted in their direction of motion, means connecting the sides of said pans in spaced relation along the input conveyor for accommodating passage of articles from the pans down between said pan connecting means; an endless distributing conveyor having a reach that crosses and extends beneath said input conveyors, said distributor conveyor having a series of jackets for receiving the articles, means connecting said jackets at a spacing substantially equal to the length of the jackets, said jackets having rake means mounted along their trailing edges; matrix pans disposed between the intersections of said input and distributor conveyor reaches, the bottoms of said matrix pans having slots that extend in the direction of motion of the distributor conveyor, said matrix pans having projectable and retractable rake means mounted along their downstream sides, when considered relative to motion of said input conveyors, said rake means when projected extending into the slots in said input conveyor pans as the latter cross the matrix pans to rake articles from the input conveyor pans into the matrix pans; the rakes of said distributor conveyor jackets passing through the slots in the bottoms of said matrix pans to rake articles from the matrix pans into said jackets, means for driving said input conveyor at one speed and said distributor conveyor at substantially twice that speed, a plurality of article destination bins disposed along each distributor conveyor, selectively operable jacket discharge means for emptying said jackets into selected bins, and remotely controlled means for selectively operating said matrix pan rake means and said jacket discharge means.

13. Apparatus for handling articles comprising a first conveyor having a series of pans formed with bottoms that are slotted in their direction of motion, means connecting the sides of said pans in spaced relation along said first conveyor at a spacing substantially equal to the length of the pans for accommodating passage of articles from the pans down between said connecting means; a second conveyor having a reach that crosses and extends beneath said first conveyor, said second conveyor having a series of jackets for receiving the articles, said jackets having rake means mounted along their trailing edges; a matrix pan disposed between the intersection of said conveyor reaches, the bottom of said matrix pan having slots that extend in the direction of motion of said second conveyor, said matrix pan having projectable and retractable rake means mounted along its downstream side when considered relative to motion of said first conveyor, said matrix pan rake means when projected extending into the slots in said first conveyor pans as the latter cross the matrix pan to rake articles from said first conveyor pans into the matrix pan; the rakes of said jackets passing through the slots in the bottoms of said matrix pans to rake articles from the matrix pans into said jackets, and means for driving said conveyors continuously.

14. Apparatus for handling articles comprising a first conveyor having a series of pans formed with bottoms that are slotted in their direction of motion, means connecting the sides of said pans in spaced relation along said first conveyor at a spacing substantially equal to the length of the pans for accommodating passage of articles from the pans down between said connecting means; a second conveyor having a reach that crosses and extends beneath said first conveyor, said second conveyor having a series of jackets for receiving the articles, means connecting said jackets at a spacing substantially equal to the length of the jackets, said jackets having rake means mounted along their trailing edges; a matrix pan disposed between the intersection of said conveyor reaches, the bottom of said matrix pan having slots that extend in the direction of motion of said second conveyor, said matrix pan having projectable and retractable rake means mounted along its downstream side when considered relative to motion of said first conveyor, said matrix pan rake means when projected extending into the slots in said first conveyor pans as the latter cross the matrix pan to rake articles from said first conveyor pans into the matrix pan, the rakes of said jackets passing through the slots in the bottoms of said matrix pans to rake articles from the matrix pans into said jackets, and means for continuously driving said first conveyor at one speed and said second conveyor at substantially twice that speed.

15. Apparatus for handling articles comprising a first conveyor having a series of pans formed with bottoms that are slotted in their direction of motion, means connecting the sides of said pans in spaced relation along said first conveyor at a spacing substantially equal to the length of the pans for accommodating passage of articles from the pans down between said connecting means; a second conveyor having an article pick up reach that crosses and extends beneath said first conveyor, said second conveyor having a series of jackets for receiving the articles, means connecting said jackets at a spacing substantially equal to the length of the jackets, said jackets having rake means mounted along their trailing edges; a matrix pan disposed between the intersection of said conveyor reaches, the bottom of said matrix pan having slots that extend in the direction of motion of said second conveyor, said matrix pan having projectable and retractable rake means mounted along its downstream side when considered relative to motion of said first conveyor, said matrix pan rake means when projected extending into the slots in said first conveyor pans as the latter cross the matrix pan to rake articles from said first conveyor pans into the matrix pan, the rakes of said jackets on said pick up reach passing through the slots in the bottoms of all of the overlying matrix pans to rake articles from the matrix pans into said jackets, and means continuously driving said conveyors.

16. Apparatus for sorting articles comprising a plurality of parallel endless input conveyors, said input conveyors each having a series of article receiving pans, means connecting said pans in spaced relation along the input conveyor for accommodating downward passage of articles between adjacent pans; an endless distributing conveyor having a reach that crosses and extends beneath reaches of said input conveyors, said distributor conveyor having a series of jackets for receiving the articles, stationary matrix pans disposed between the intersections of said input and distributor conveyor reaches; means for raking articles from the input conveyor pans into the stationary matrix pans, means for raking articles from the stationary matrix pans into said jackets; a plurality of article destination bins disposed along each distributor conveyor, means mounting said bins for vertical reciprocation, selectively operable jacket discharge means for emptying said jackets into selected destination bins; signal controlled means for operating said matrix pan rake means and said jacket discharge means; a sweep conveyor having a reach passing under said bins, article carriers on said sweep conveyor including receptacles and rakes associated therewith for raking stacks of articles from said bins, cam means on said sweep conveyor at said receptacles for lowering said bins into the path of the associated rakes, and signal controlled means for conditioning said cam means to lower selected bins.

References Cited in the file of this patent

UNITED STATES PATENTS

| | | |
|---|---|---|
| 2,194,381 | Cadman | Mar. 19, 1940 |
| 2,670,087 | Stehlik | Feb. 23, 1954 |
| 2,843,278 | Oveflander | July 15, 1958 |
| 2,863,574 | Henig | Dec. 9, 1958 |
| 2,959,308 | Werner | Nov. 8, 1960 |
| 3,033,366 | Atanasoff | May 8, 1962 |